US008941724B2

(12) United States Patent
Ohno et al.

(10) Patent No.: US 8,941,724 B2
(45) Date of Patent: Jan. 27, 2015

(54) RECEIVER

(75) Inventors: Chiyo Ohno, Chigasaki (JP); Shuji Ishihara, Yokohama (JP); Manabu Sasamoto, Yokohama (JP); Hiroyuki Koreeda, Fujisawa (JP)

(73) Assignee: Hitachi Maxell Ltd., Osaka (JP)

( * ) Notice: Subject to any disclaimer, the term of this patent is extended or adjusted under 35 U.S.C. 154(b) by 739 days.

(21) Appl. No.: 13/248,458

(22) Filed: Sep. 29, 2011

(65) Prior Publication Data
US 2012/0120204 A1     May 17, 2012

(30) Foreign Application Priority Data

Oct. 1, 2010 (JP) ................................. 2010-223388
Oct. 1, 2010 (JP) ................................. 2010-223389

(51) Int. Cl.
*H04N 13/04* (2006.01)
*H04N 21/81* (2011.01)
(Continued)

(52) U.S. Cl.
CPC ....... *H04N 21/816* (2013.01); *H04N 21/25833* (2013.01); *H04N 21/26283* (2013.01); *H04N 21/4333* (2013.01); *H04N 21/4882* (2013.01)
USPC .................... 348/51; 348/42; 348/43; 348/56

(58) Field of Classification Search
CPC .......... H04N 13/0059; H04N 13/0066; H04N 21/816; H04N 13/007; H04N 13/0055; H04N 21/2362; H04N 21/4882; H04N 21/25833; H04N 21/26283; H04N 21/435; H04N 21/44008; H04N 21/4333; G06T 15/00
USPC ......................................... 348/42, 43, 51, 56
See application file for complete search history.

(56) References Cited

U.S. PATENT DOCUMENTS

| 8,370,873 B2 * | 2/2013 | Shintani ........................... 725/39 |
| 2007/0208718 A1 | 9/2007 | Javid et al. |

(Continued)

FOREIGN PATENT DOCUMENTS

| EP | 2 112 830 | 10/2009 |
| EP | 2 387 241 | 11/2011 |

(Continued)

OTHER PUBLICATIONS

JP Office Action for Japanese Application No. 2010-223388, issued on Dec. 10, 2013.

(Continued)

*Primary Examiner* — Sath V Perungavoor
*Assistant Examiner* — Nathnael Aynalem
(74) *Attorney, Agent, or Firm* — Antonelli, Terry, Stout & Kraus, LLP.

(57) ABSTRACT

A receiver enabling to receive 2D and 3D content from a content distributor, including a content list obtaining unit obtaining a list screen of content receivable from the content distributor, a content obtaining unit obtaining 2D or 3D content from the content distributor, a display unit displaying the list screen and reproduced screen of the content on an external or built-in monitor, and a function determining unit determining a function for viewing/listening to 3D and 2D content, wherein the content list obtaining unit determines if 3D content is visible/listenable and obtains a content list of only 2D content or both 2D and 3D content, in accordance with a result of determination, from the content distributor, and the display unit displays the content list obtained through the content list obtaining unit, thereby enabling the receiver of content to receive, memorize and/or output outside the content, being distributed from various networks.

11 Claims, 43 Drawing Sheets

(51) Int. Cl.
*H04N 21/258* (2011.01)
*H04N 21/262* (2011.01)
*H04N 21/433* (2011.01)
*H04N 21/488* (2011.01)

(56) References Cited

U.S. PATENT DOCUMENTS

| | | |
|---|---|---|
| 2009/0150934 A1 | 6/2009 | Kamen et al. |
| 2009/0220213 A1 | 9/2009 | Ogawa et al. |
| 2009/0300231 A1 | 12/2009 | Munetsugu |
| 2009/0317061 A1* | 12/2009 | Jung et al. ................ 386/95 |

FOREIGN PATENT DOCUMENTS

| | | |
|---|---|---|
| JP | 2003-032663 | 1/2003 |
| JP | 2010-213267 | 9/2010 |
| WO | WO 2004/100549 A1 | 11/2004 |

OTHER PUBLICATIONS

EP Office Action for European Application No. 11 183 287.9-1908, issued on Sep. 30, 2014.

* cited by examiner

FIG. 10

| 200 REPRODUCTION CONTROL METAFILE | | | |
|---|---|---|---|
| 210 | CONTENT CHARACTERISTIC PROPERTY INFORMATION (ERI) | CONTENT TITLE/REFERENCE ADDRESS/FILE NAME | 211 |
| | | CONTENT ENCRYPTION CLASS | 212 |
| | | CONTENT TIME LENGTH | 213 |
| | | VIDEO SIGNAL PROPERTY INFORMATION | 214 |
| | | AUDIO SIGNAL PROPERTY INFORMATION | 215 |
| 220 | LICENSE OBTAIN INFORMATION (LLI) | COPYRIGHT MANAGEMENT SERVER ADDRESS | 221 |
| | | ID OF SIGNATURE OBJECT ELEMENT | 222 |
| | | ID INFORMATION OF COPYRIGHT MANAGEMENT SYSTEM | 223 |
| | | LICENSE ID | 224 |
| | | USE CONDITION INFORMATION OF LICENSE | 225 |
| | | ID REFERENCE OF SIGNATURE OBJECT ELEMENT | 226 |
| | | PUBLIC KEY CERTIFICATE | 227 |
| 230 | NETWORK CONTROL INFORMATION (NCI) | STREAMING PROTOCOL INFORMATION | 231 |
| | | STREAMING SERVER FUNCTION INFORMATION | 232 |
| | | SPEED 1 OF SPEED-VARIABLE REPRODUCTION | 233 |
| | | KIND 1 OF SPEED-VARIABLE REPRODUCTION | 234 |
| | | SPEED 2 OF SPEED-VARIABLE REPRODUCTION | 235 |
| | | KIND 2 OF SPEED-VARIABLE REPRODUCTION | 236 |
| | | ⋮ | |

SEARCH RESULT

| [TITLE] | [SUPPLY] | [PURCHASE CONDITION] | | [OPERATION] | |
|---|---|---|---|---|---|
| MOVIE 1 | VOD/DL | ALREADY PURCHASED | [DETAILS] | | [DL VIEW/LISTEN] |
| MOVIE 2 | VOD/DL | ALREADY PURCHASED | [DETAILS] | [VOD VIEW/LISTEN] | [DL VIEW/LISTEN] |
| MOVIE 3 | VOD | NON-PURCHASED | [PURCHASE] | | |
| MOVIE 4 | VOD | FREE CHARGE | [DETAILS] | [VOD VIEW/LISTEN] | |
| MOVIE 5 | VOD/DL | ALREADY PURCHASED | [DETAILS] | | [DURING DL] |
| MOVIE 6 | DL | NON-PURCHASED | [PURCHASE] | | |
| MOVIE 7 | VOD/DL | ALREADY PURCHASED | [DETAILS] | [VOD VIEW/LISTEN] | [WAITING DL] |
| MOVIE 8 | VOD/DL | NON-PURCHASED | [PURCHASE] | | |

CONTENT PURCHASE

- 1201 — [TITLE] MOVIE 1
- 1202 — [DETAILS] THIS IS MASTERPIECE MOVIE.
- 1203 — [DIRECTOR] Tom Smith
- 1204 — [CAST] John Miller OTHERS
- 1205 — [GENRE] MOVIE-FOREIGN/COMEDIES
- 1206 — [VIEW/LISTEN PERIOD] LIMITLESS
- 1207 — [REPRODUCTION TIME]   [VIDEO/AUDIO]
           122 MINUTES    1080i/STEREO/ENGLISH CAPTION
- 1208 — [EXPORT] 2 TIMES (OUTPUT ADDRESS : BD/DVD/SD CARD)
- 1209 — [SUPPLY CONDITION]  ~~VOD~~  ☑ DOWNLOAD
- 1210 — [PRICE] 1,050 YEN

[PURCHASE]  [RETURN]
   1223      1224

FIG. 19

| | | | 1600 | | |
|---|---|---|---|---|---|
| | | LOCAL NAVIGATION | | | |
| [TITLE] | [DL CONDITION] | [PURCHASE CONDITION] | | [OPERATION] | |
| MOVIE 1 | DL COMPLETED | ALREADY PURCHASED | [DETAILS] | [VIEW/LISTEN] | [EXPORT] |
| MOVIE 2 | DURING DL (30%) | ALREADY PURCHASED | [DETAILS] | [VIEW/LISTEN] | :EXPORT: |
| MOVIE 3 | DL WAITING | NON-PURCHASED | [PURCHASE] | :VIEW/LISTEN: | :EXPORT: |
| MOVIE 4 | DL COMPLETED | FREE CHARGE | [DETAILS] | [VIEW/LISTEN] | |
| MOVIE 5 | DL ERROR | ALREADY PURCHASED | [DETAILS] | :VIEW/LISTEN: | :EXPORT: |
| MOVIE 6 | DL COMPLETED | NON-PURCHASED | [PURCHASE] | [VIEW/LISTEN] | [EXPORT] |
| MOVIE 7 | DL COMPLETED | ALREADY PURCHASED | [DETAILS] | :VIEW/LISTEN: | [EXPORT] |
| MOVIE 8 | DL COMPLETED | NON-PURCHASED | [PURCHASE] | | [EXPORT] |
| : | : | : | : | : | : |
| 1601 | 1602 | 1603 | 1604 | 1605 | 1606 |

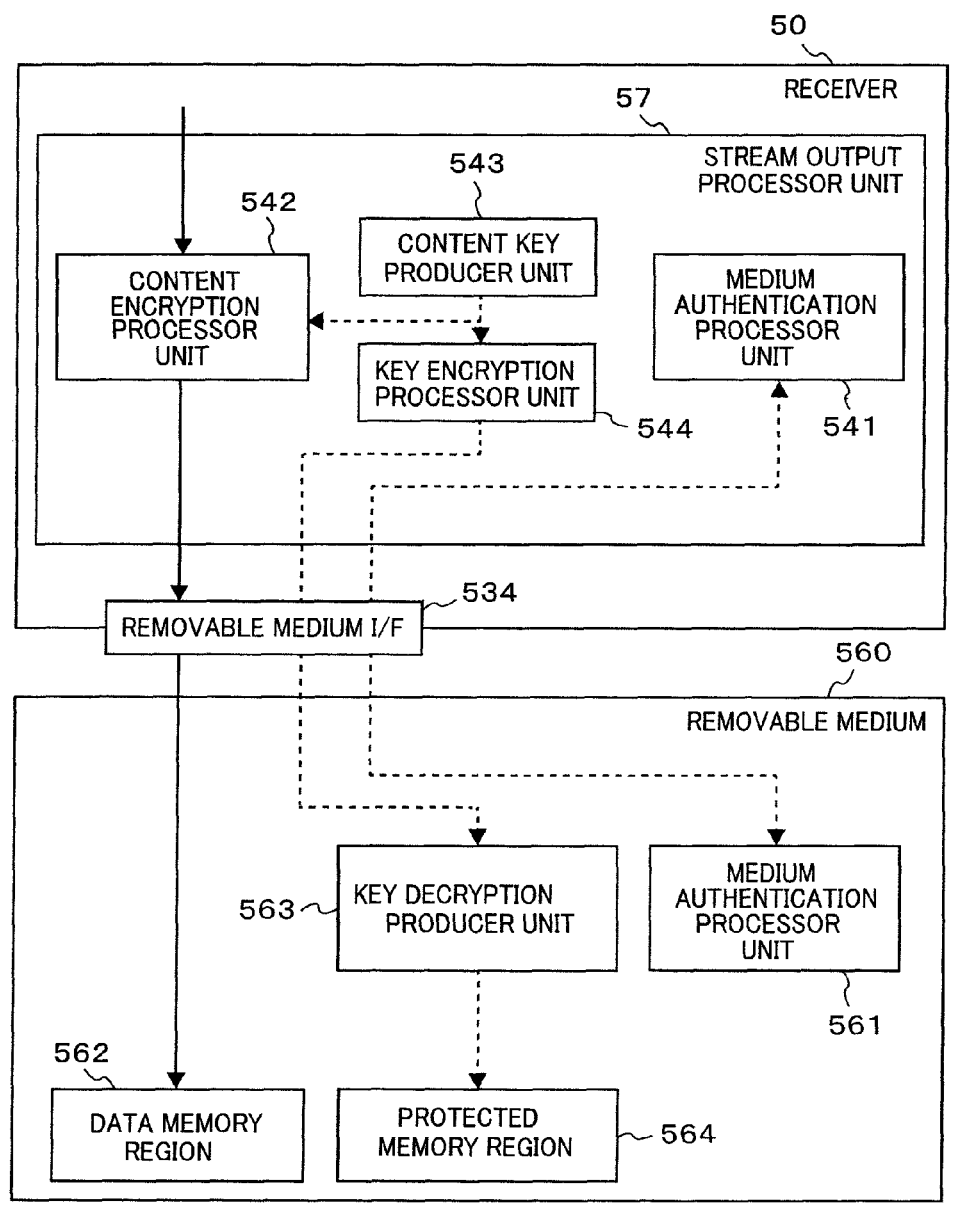

FIG. 34
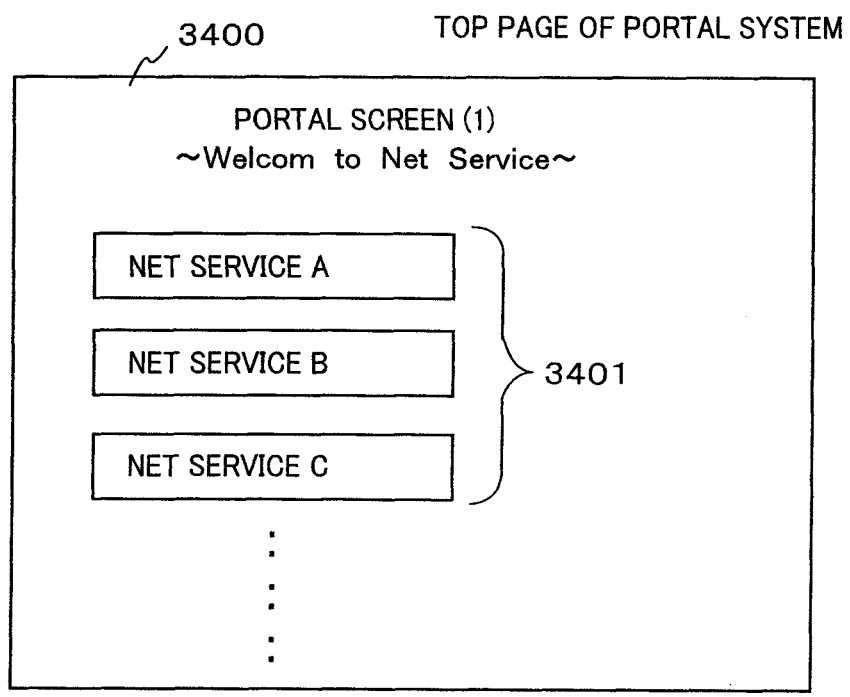
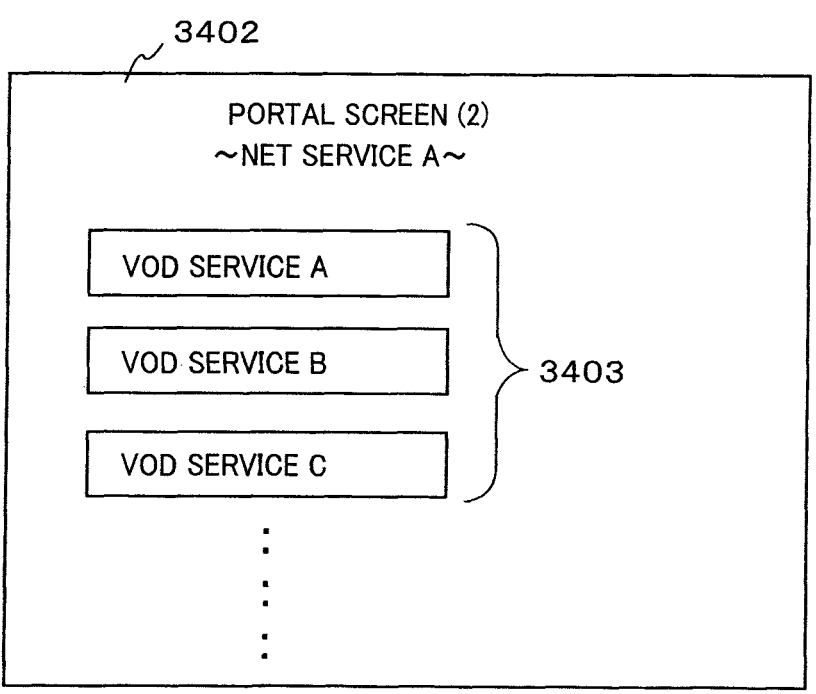

FIG. 36
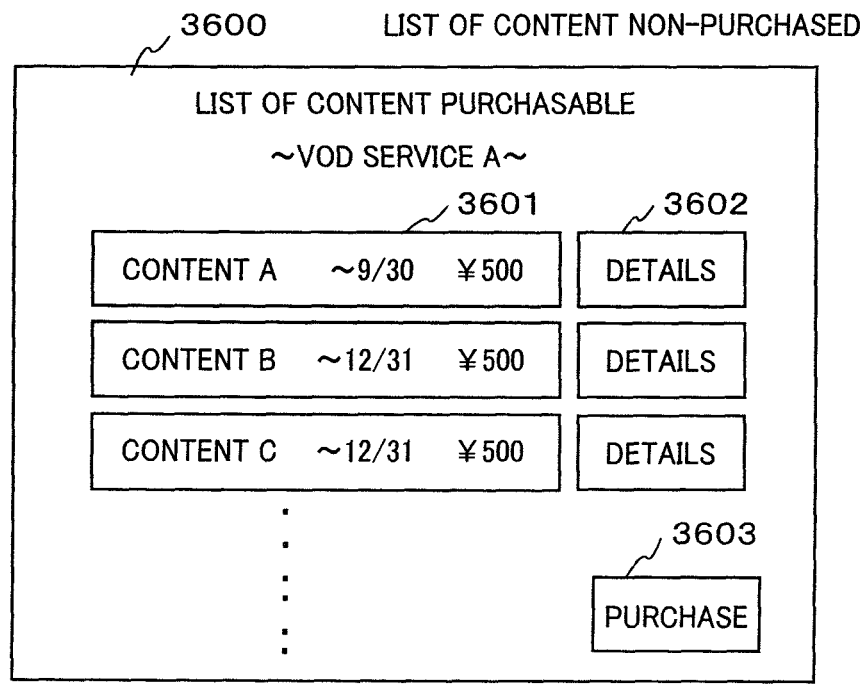
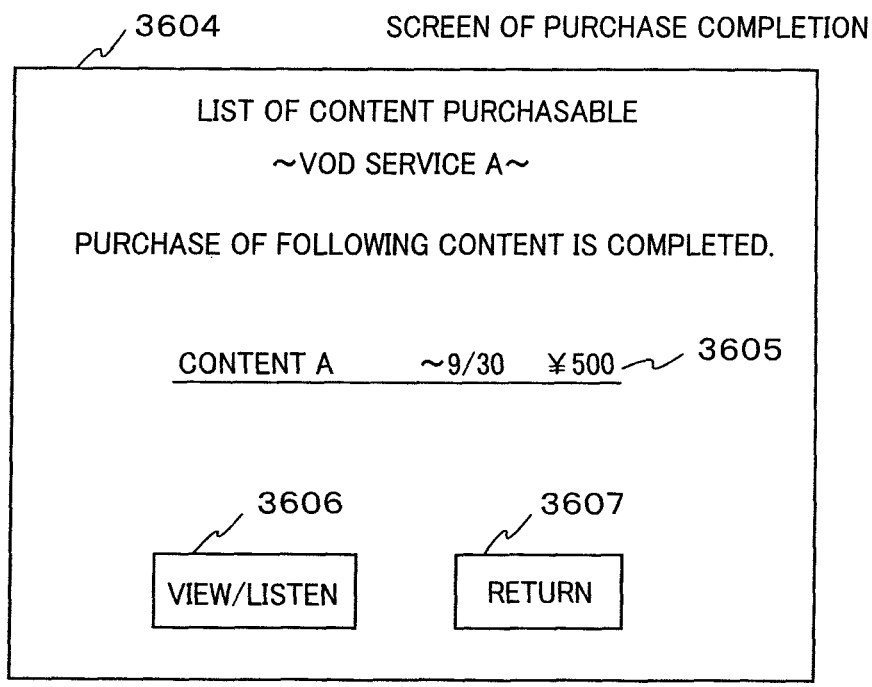

RECEIVER

This application relates to and claims priority from Japanese Patent Application No. 2010-223388 filed on Oct. 1, 2010, and Japanese Patent Application No. 2010-223389 filed on Oct. 1, 2010, the entire disclosures of which are incorporated herein by reference.

BACKGROUND OF THE INVENTION

The present invention relates to a receiver and a receiving method thereof, for receiving contents distributed from a distribution system, and it relates, in particular, to a method for distributing contents in a content transmitting system, which is constructed with a distribution system and a receiver.

As the background technology in the present technical field is already known International Publication No. 2004/100549 (Patent Document 1).

In this Patent Document is described an embodiment for achieving a distribution system, which is made up with a server for distributing contents and a receiver for downloading the contents from the server through the Internet, and thereby to reproduce it.

In this embodiment is shown an example, in which an Internet browser obtains a download control file (hereinafter, this will be called "a download control meta-file" in the present invention), describing the details to be executed when downloading the contents, from the server, and this file is interpreted by a download agent, and thereby executing the downloading.

SUMMARY OF THE INVENTION

An object of the present invention is for enabling receipt of the contents, which are distributed from various networks and are protected by the copyrights thereof, and thereby to be reproduced, within a receiver for contents.

For dissolving such drawbacks mentioned above, according to the present invention, there are adopted such the structures as will be mentioned in the claims, for example.

According to the present invention, although there are provided plural numbers of means for dissolving the drawbacks mentioned above; however, an example will be as follows, if picking one from them.

According to the present invention, it is possible to receive the contents, which are distributed from various networks and are protected by the copyrights thereof to be reproduced, within the receiver for contents.

BRIEF DESCRIPTION OF THE DRAWINGS

FIG. 10 shows an example of the structure of a reproduce control metafile;

FIG. 13 shows an example of a screen of a search result on the receiver;

FIG. 14 shows an example of a screen for content purchasing on the receiver;

FIG. 19 shows an example of a local navigation screen of the receiver;

FIG. 20 shows an example of the structure of an interface unit between the receiver and a removable medium;

FIG. 34 shows an example of a top screen;

FIG. 36 shows an example of a list screen of the content non-purchased;

DESCRIPTION OF THE PREFERRED EMBODIMENTS

Hereinafter, embodiments according to the present invention will be fully explained, by referring to the attached drawings.

Embodiment 1

In the present embodiment, explanation will be given on a receiver 50 for receiving contents and a distribution system 60, as an example thereof.

Figure 1:
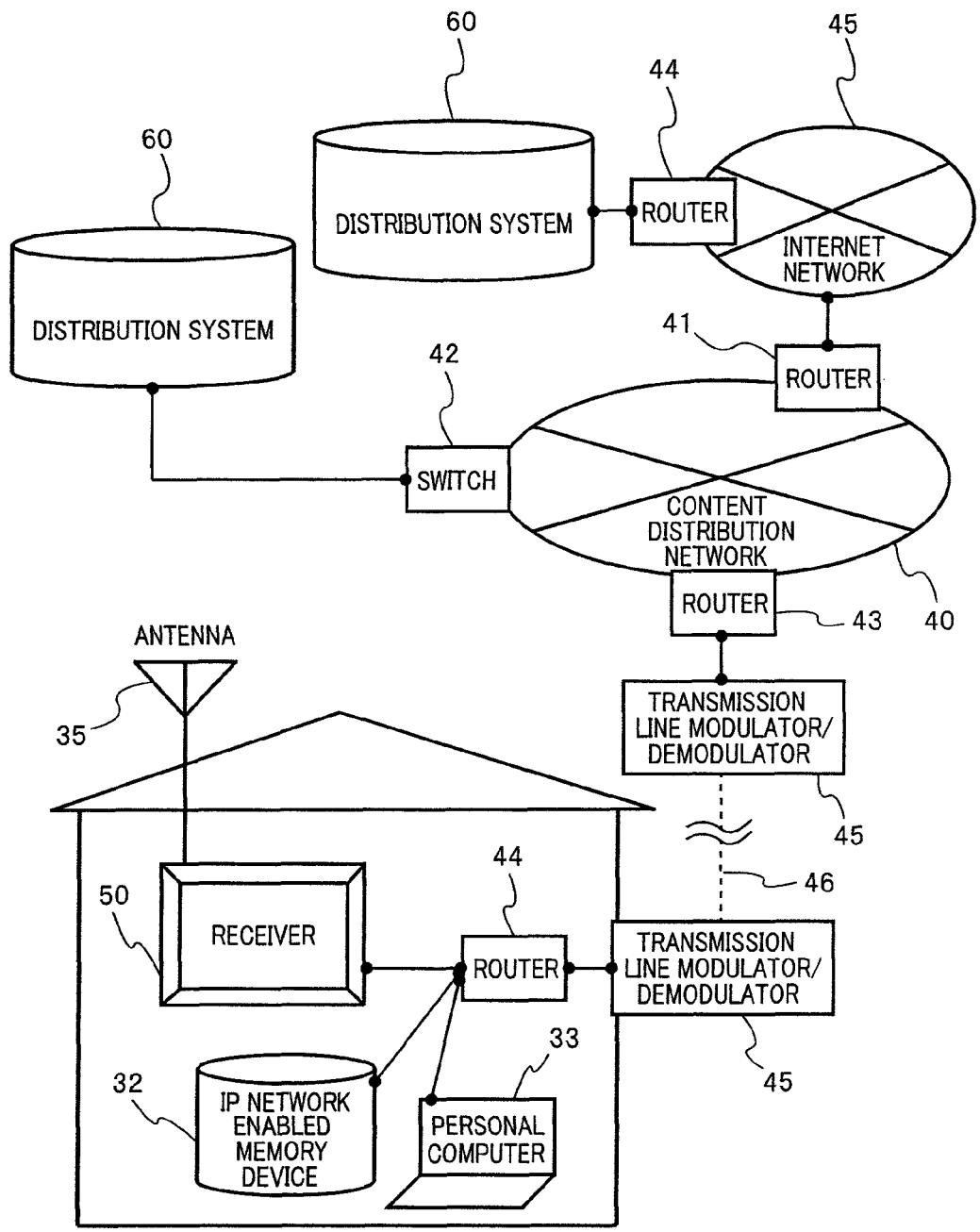
FIG. 1 shows an example of the structure of a content transmission system.

FIG. 1 shows an example of the structure of a content transmission system, into which the present invention is applied. A distribution network is constructed with a content distribution network 40, which is connected into a home through a router 43 and guarantees a network quality within the network, and an external Internet network 45, which is connected from the content distribution network 40. The distribution system 60 has a case where it is connected to the content distribution network 40 through a network switch 42, or a case where it is connected to the Internet network 45 through a router 44, by emphasizing versatility thereof.

For connecting the network into a home may be assumed various kinds of communication routes 46 or channels, such as, a coaxial cable, an optical fiber, an ADSL (Asymmetric Digital Subscriber Line) and a wireless communication, etc., and modulation/demodulation adopted to the respective communication routes may be conducted by a transmission route modulator/demodulator 45, to be converted into an IP network.

Within the home, the IP network, which is demodulated in a transmission route modulator/demodulator 46 and converted into a network interface, is connected with equipments within the home through a router 48.

As the equipments provide within the home can be assumed, such as, the receiver 50, or an IP network-enabled memory devices (e.g., Network Attached Storage) 32, a personal computer 33, and AV equipments connectable with the network, etc. The receiver 50 may have a function(s) for reproducing a broadcast received on an antenna 35 or storing it, in common therewith.

Figure 2:
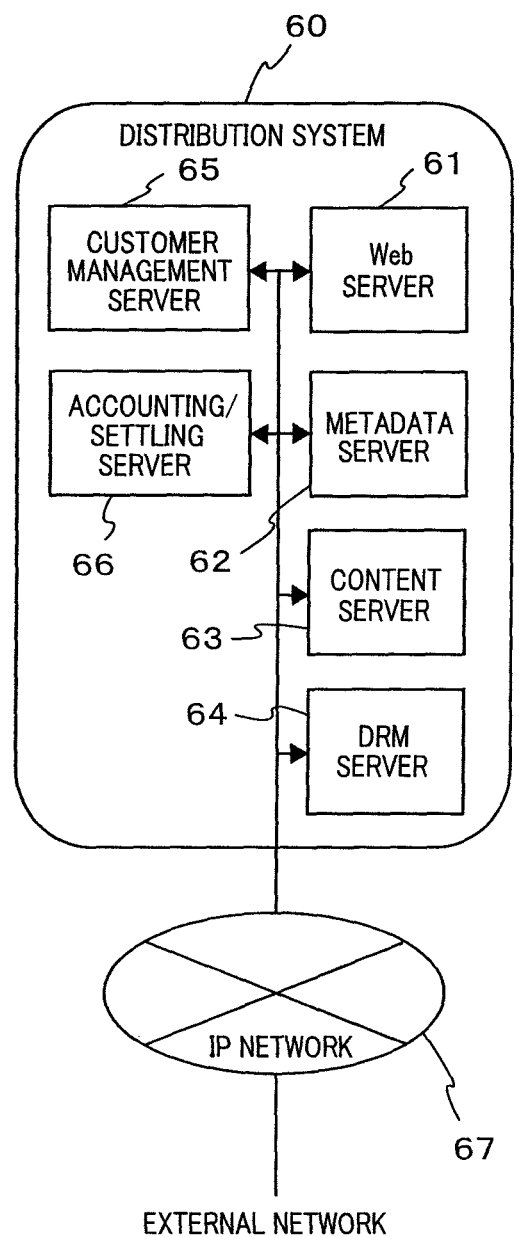
FIG. 2 shows an example of the structure of a distribution system.

FIG. 2 shows an example of the structure of the content distribution system 40.

The distribution system 60 for contents has a Web server 61 for distributing Web document 71, a metadata server 62 for distributing therein ECG metadata 400, which describes property information of content or the like, to be distributed, and/or reproduction control information 200, which describes information necessary for reproducing contents, a content server 63 for distributing a main part 75 of content, a DRM server 64 for distributing a license 300, which includes therein information of a key necessary for decrypting the content which is needed for the right to use or for use of the content, a customer management server 65 for managing customer information for distribution service, and an accounting/settling server 63 for conducting accounting and/or settling for the content by a customer, and so on.

Each of the servers is connected with the Internet network 45 shown in FIG. 1 or the content distribution network 40, through an IN network 67, while they are connected with each other through the IP network 67.

However, a part or all of the servers may be connected with the Internet network 45 or the content distribution network 40, directly, but not through the IP network 67, thereby to communicate with each other in the structure thereof.

However, in the structure thereof, each server owned by the distribution system 60 is shown as an expediential model, insistently, but in an actual distribution system, plural kinds of those servers may have a unified one as a substance thereof or some of those servers may be not used therein. Or, a server, such as the metadata server 62, for example, may be divided into several servers in the substance thereof, separately, for each kind of data in the substructure thereof. Each of servers is connected with the network, such as the Internet, etc., between other servers, respectively.

Figure 3:
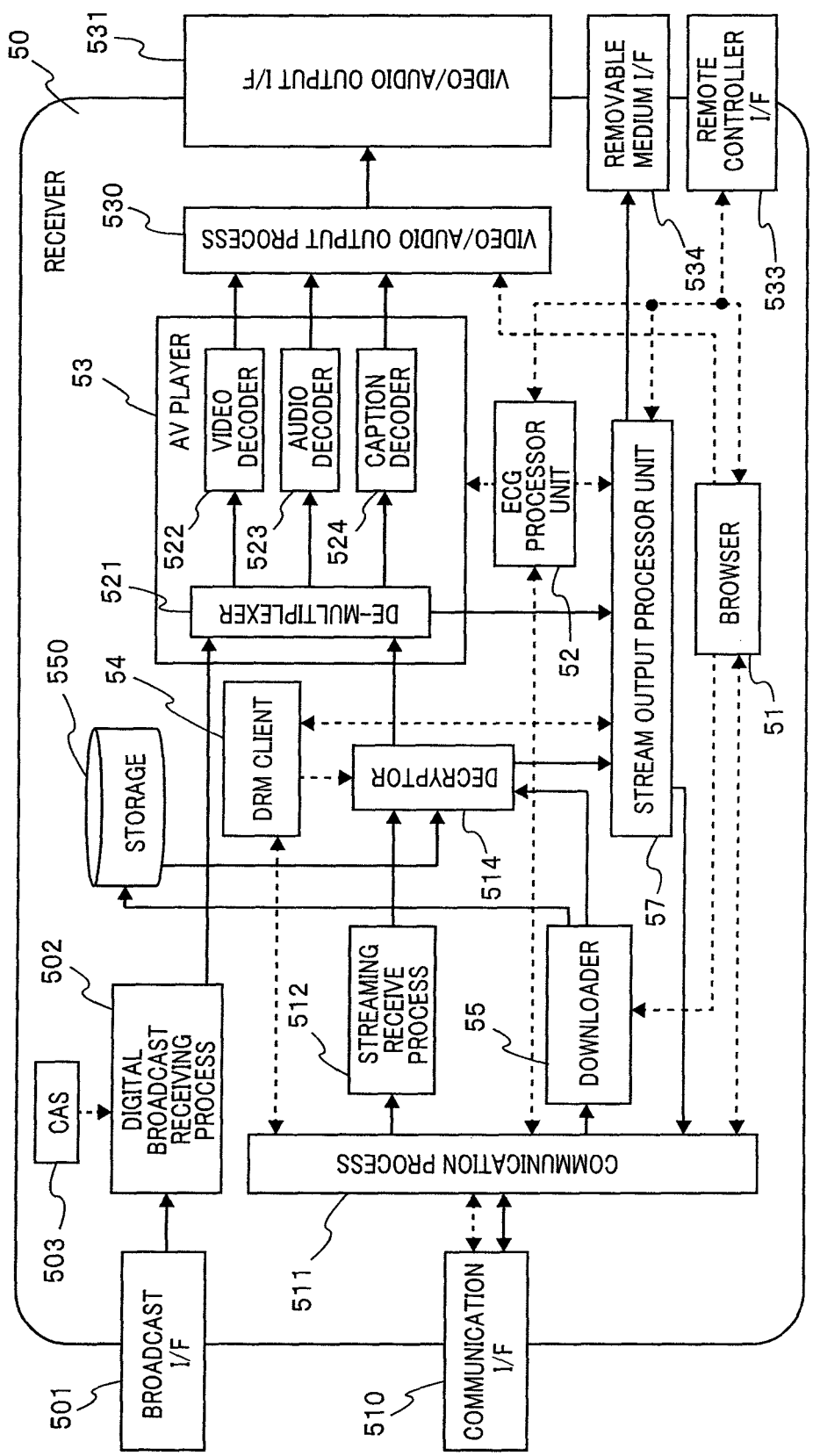
FIG. 3 shows an example of the structure of a receiver.

FIG. 3 shows an example of the structure of the receiver 50.

The receiver 50 is able to reproduce the content received or output it to a removable medium or a network, and further has storage 550 for storing contents therein. However, in the figure, an arrow of a solid line depicts a flow of content while an arrow of a broken line depicts a flow of control.

The receiver 50 executes physical connection to the IP network, and comprises a communication I/F (Interface) 510 for transmitting an IP (Internet Protocol) data packet, and a communication processor unit 511 for executing processes for various kinds of IP communication protocols, such as, a TCP (Transmission Control Protocol), a UDP (User Datagram Protocol), a DHCP (Dynamic Host Configuration Protocol), a DNS (Domain Name Server) protocol, and a HTTP (Hyper Text Transfer Protocol), etc., through the communication I/F 510.

A downloader 55 is a processor unit to execute a process for obtaining content and information relating to that content. A DRM client 54, managing the copy right of the content, provides a function to view/listen the content or control copying thereof, depending on a condition when purchasing the content. A decryptor 514 decrypts the content to be downloaded, upon basis of an instruction given from the DRM client 54. A stream output processor unit 57 outputs the content to a removable medium 560, which is connected with the receiver 50. Or, the stream output processor unit 57 outputs the content to network connecting equipment 570, which is connected with, through the communication processor unit 511 and the communication I/F 510.

The removable medium 560 is a memory medium, being accessible and detachable through a removable medium I/F 534, which is connected with a stream output processor unit 541.

The receiver 50 has a remote controller I/F 533 for use of operation thereof, with which it can be operated by a user in accordance with a remote control signal received.

Also, the receiver 50 has a possibility to have a function to receive a streaming distribution service of audio/video content on demand. In this instance, it comprises a stream receive processor unit 512 for executing real-time processing on the video/audio content, through the communication processor unit 511.

An AV player 53 decrypts the content downloaded, the content, a stream of which is distributed, or the content received on the air, and converts it into video and audio signals.

The AV player 53 has a de-multiplexer 521, in an inside thereof, and a processor unit thereof divides the content decrypted within the decryptor 514 into packets of video, audio and caption; thereby sending out the packets to a video decoder 522, an audio decoder 523 and a caption decoder 524, respectively. By means of those decoders 522, 523 and 524, the video, audio and caption information are decoded, respectively, and are converted into a unified video/audio signal, by means of a video/audio output processor unit 530. This video/audio signal is outputted from the receiver 50 into an outside, passing through a video/audio output I/F 531.

For this reason, for the user, it is possible to view/listen the content comprising the video/audio, by connecting a TV set or the like to the video/audio output I/F 531.

However, for the video/audio output processor unit 530 and the video/audio output I/F 531, although it is possible to consider an interface according to a HDMI (registered trademark) regulation, for processing the video/audio, integrally, to be outputted; but there can be assumed an instance where the video and the audio are processed, independently, to be outputted outside, such as, a video composite signal output and an analog audio output, for example.

Further, there may be a case where the receiver 50 has functions for receiving and recording of the digital broadcasting are in common. In such instance, the receiver 50 has a broadcast I/F 501 for inputting a broadcasted radio-wave, a digital broadcast receive processor unit 502 for decrypting the digital broadcast signal and thereby converting it into a video/audio stream, and a CAS (Conditional Access System) 503 for executing a process for copyright protection when decrypting the digital broadcast signal.

Within the receiver 50, it is possible to output the content received, directly, into the stream output processor unit 57, or output it to the removable medium 560, etc.

Also, the receiver 50 is able to store the content downloaded into the storage 550, once. In that instance, thereafter, the stream output processor unit 57 outputs the content obtained from the storage 550 to the removable medium 560, etc., through an operation of the receiver.

Even with the structure having the storage 550, it is also possible to execute either one of the processes; i.e., a process of exporting without reserving the content in the storage 550, or a process of exporting after storing the content in the storage 550 once.

In this instance, even if the receiver has the storage 550, such as, a HDD, etc., since it is possible to export the content downloaded into the removable medium 560 through the stream output processor unit 57, there is no necessity of storing the content in the storage 550, and there can be brought out an effect of enabling the downloading when a vacancy is small in the recoding capacity of the storage.

Also, in case when executing only a service for exporting into the removable medium, directly, not passing through the storage 550, in the receiver 50 shown in FIG. 3, it is possible to achieve a cheap receiver without installing the storage 550 therein.

Further, it is also possible for the DRM client 54 to obtain the license 300 from the DRM server 64, thereby to decrypt the content stored in the storage 550 by the decryptor 514, upon basis of the key 311, which is described in that license 300, in particular, when reproducing the content stored in the storage 550 or when exporting it to the removable medium, etc., after storing the content downloaded, as it is, in the storage 550, once, without decrypting it.

In case when reproducing the content, the decryptor 514 decrypts the content, and the de-multiplexer 521 divides it into packets of video, audio and caption data, respectively. The video decoder 522, the audio decoder 523 and the caption decoder 524 decode the video packet, the audio packet and the caption packet, respectively, which are divided. The video/audio output processor unit 530 outputs the video/audio decrypted into an outside through the video/audio output I/F 531. Through those processes, for the user, it is possible to view/listen the content.

When exporting the content, the decryptor 514 decrypts the content, and the stream output processor unit 541 outputs the composite content to the removable medium 560, etc.

However, the digital broadcast receive processor unit 502, the CAS 503, the communication processor unit 511, the streaming receive processor unit 512, the decryptor 514, the de-multiplexer 521, the video decoder 522, the audio decoder 523, the caption decoder 524, the video/audio output processor unit 530, the storage 550, the browser 51, the ECG processor unit 52, the AV player 53, and the stream output processor unit 57 can be achieved in the form of hardware, i.e., as a processor unit for processing a part or all of them, such as, by an integrated circuit, for example.

Also, all or part(s) of processes of the digital broadcast receive processor unit 502, the CAS program 503, the communication processing program 511, the streaming receive processing program 512, the decryptor program 514, the de-multiplexer program 521, the video decoder program 522, the audio decoder program 523, the caption decoder program 524, the video/audio output processing program 530, the storage 550, the browser program 51, the ECG processing program 52, the AV player program 53, the DRM client program 54, the download program 55, the local navigation program 56, the stream output processing program 57, and so on, which is/are stored in the memory device, such as, the storage 550 or a memory or the like, not shown in the figure, can be achieved in the form of software, by processing it/them with using a calculation processor provided in a central controller unit not shown in the figure, etc.

For the purpose of a brief explanation, with each process, which is achieved by executing each kind of program within the central controller unit or the like, the explanation was made mainly on each processor unit, which can be achieved by program. However, in case where each processor unit is achieved by the hardware, each process may be executed by the each processor unit thereof, mainly.

Figure 4:
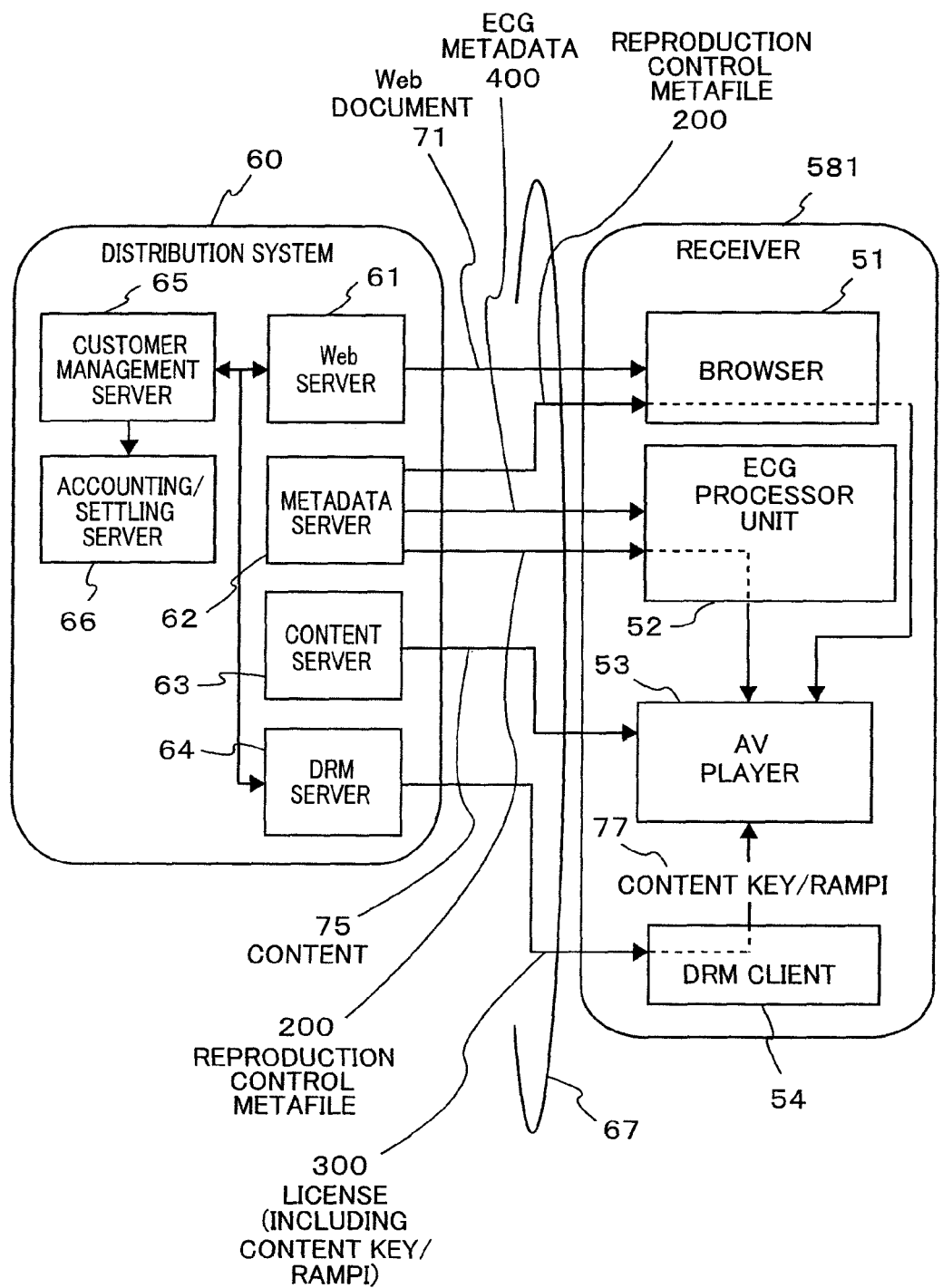
FIG. 4 shows a first example for showing the relationship between the receiver and the distribution system.
Figure 5:
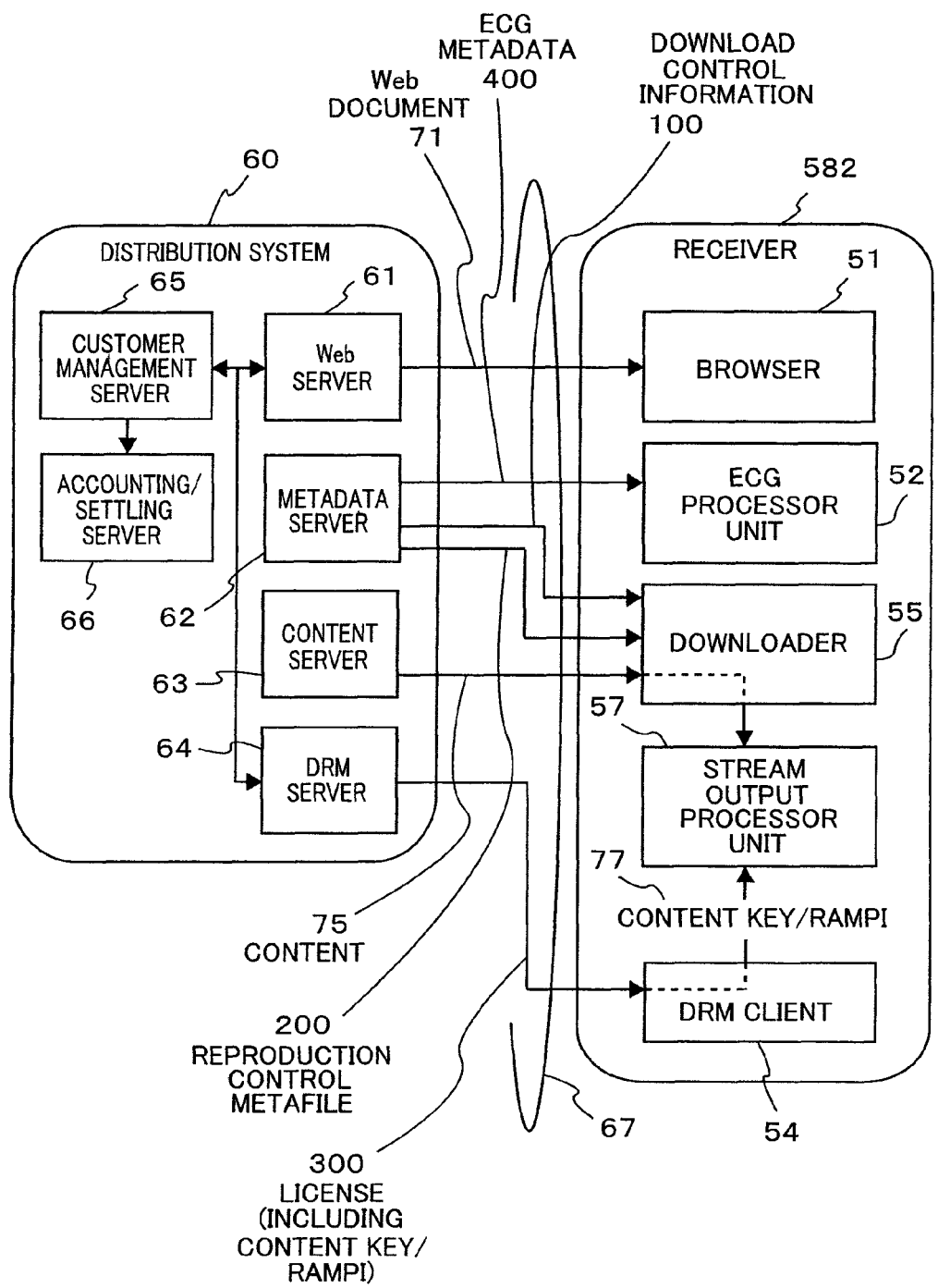
FIG. 5 shows a second example for showing the relationship between the receiver and the distribution system.

Next, explanation will be given on a relationship of giving/receiving of data in the content distribution service, between the receiver 50 of the system configuration shown in FIG. 3 and the distribution system for content shown in FIG. 2, by referring to FIGS. 4, 5 and 6. Further, although FIGS. 4 and 5 show only a part of blocks to be used in a flow of processes, from the receiver 50 shown in FIG. 3, but they may have other processor units, etc., of the receiver 50 shown in FIG. 3, or the structure described in the FIGS. 4 and 5 is not always necessary. A part thereof may be omitted.

A receiver 581 shown in FIG. 4 depicts a subset of blocks necessary for executing the giving/receiving of data between the streaming distribution system shown in FIG. 4, being extracted the receiver 50 shown in FIG. 3.

The distribution system 60 for content is made up with the Web server 61 for distributing the Web document 71, the metadata server 62 for distributing therein the ECG metadata 400, which describes the property information of the content or the like, to be distributed, and/or the reproduction control information 200, which describes the information necessary for reproducing the contents, the content server 63 for distributing the main part 75 of the content, the DRM server 64 for distributing the license 300, which includes therein information of the key necessary for decrypting the content which is needed for the right to use or for use of the content, the customer management server 65 for managing the customer information for distribution service, and the accounting/settling server 66 for conducting accounting and/or settling for the content by a customer, and so on.

As a transmission path or line for communicating the data mentioned above between the receiver 581 and the distribution system 60 is assumed the distribution network shown in FIG. 1.

In the case of FIG. 4, upon basis of display of the Web 71 received from the Web server 61 and operation on an operation device, such as, a remote controller, the browser 51 looks up a content 75 to be seen by the user and find it out. Or, as other than the method mentioned above, there may be provided a method; i.e., the ECG (Electric Content Guide) processor unit 52 of the receiver application shows the ECG metadata 400, which is obtained from the metadata server 62, to the user in the form of ECG, and thereby the user looks up the content to be seen by her/him from that ECG and find it out.

When the user selects the content to be seen by her/him and gives an instruction for reproducing the content on the Web document 71, the browser 51 obtains the reproduction control metafile 200, a reference address of which is described in the Web document 71, from the metadata server 62, and makes a request for reproduction to the AV player 53. Or, when the user makes the instruction for reproducing the content on the ECG, which is displayed by the ECG processor unit 52, the ECG processor unit 52 obtains the reproduction control metafile 200, the reference address of which is described in the ECG metadata 400, from the metadata server 62, and makes a request for reproduction to the AV player 53.

The AV player 53 obtains the content key, which is described in the license 300 of the content, and a signal output limit/copy control information, as well, which is called "RMPI" (Right Management and Protection Information), from the DRM client 54, in accordance with the details of the reproduction control metafile 200, and it sets the content key to the decryptor 514, while setting a condition for outputting the video/audio, etc., to the video/audio output I/F 531, in accordance with the RMPI, as well, and thereby executing the streaming reproduction of the content 75 distributed from the content server 63.

The DRM client program 54 holds the effective license 300 herein, and if there is a request from the AV player 53 and/or the stream output controller unit 57, it supplies the content key and the RMPI from the license 300 corresponding thereto. Or, if the license requested is not obtained yet, it obtains the license 300 necessary for reproduction of the content from the DRM server 64.

A receiver 582 shown in FIG. 5 depicts a subset of blocks necessary for executing the giving/receiving of data between the download distribution system, being extracted the receiver 50 shown in FIG. 3.

In the case of FIG. 5, also, upon basis of display of the Web 71 received from the Web server 61 and operation on an operation device, such as, a remote controller, the browser 51 looks up a content 75 to be seen by the user and find it out. Or, as other than the method mentioned above may be provided a method; i.e., the ECG (Electric Content Guide) processor unit 52 of the receiver application shows the ECG metadata 400, which is obtained from the metadata server 62, to the user in the form of ECG, and thereby the user looks up the content to be seen by her/him from that ECG and find it out.

When the user selects the content to be seen by her/him and gives an instruction for loading the content on the Web document 71, the browser 51 obtains the download control information 100, a reference address of which is described in the Web document 71, from the metadata server 62, and makes a request for executing the download to the downloader 55. Or, when the user makes the instruction for executing the download of content on the ECG, which is displayed by the ECG processor unit 52, the ECG processor unit 52 obtains the download control information 100, the reference address of which is described in the ECG metadata 400, from the metadata server 62, and makes a request for executing the download to the downloader 55.

The downloader 55 obtain a reproduction control metafile 200, and in accordance with the details thereof, it also obtains the content key, which is described in the license 300 of the content, and the signal output limit/copy control information, which is called RMPI (Right Management and Protection Information) from the DRM client 54, and thereby setting the content key to the decryptor 514 while setting an output condition of the video and the audio, etc., to the removable medium 560 and/or the network connecting equipment 570 at the destination of the export, in accordance with the RMPI, and it further downloads the content 75 to be distributed, from the content server 63, and thereby outputting the content decrypted to the stream output controller unit 57, i.e., executing the export process.

Figure 6:
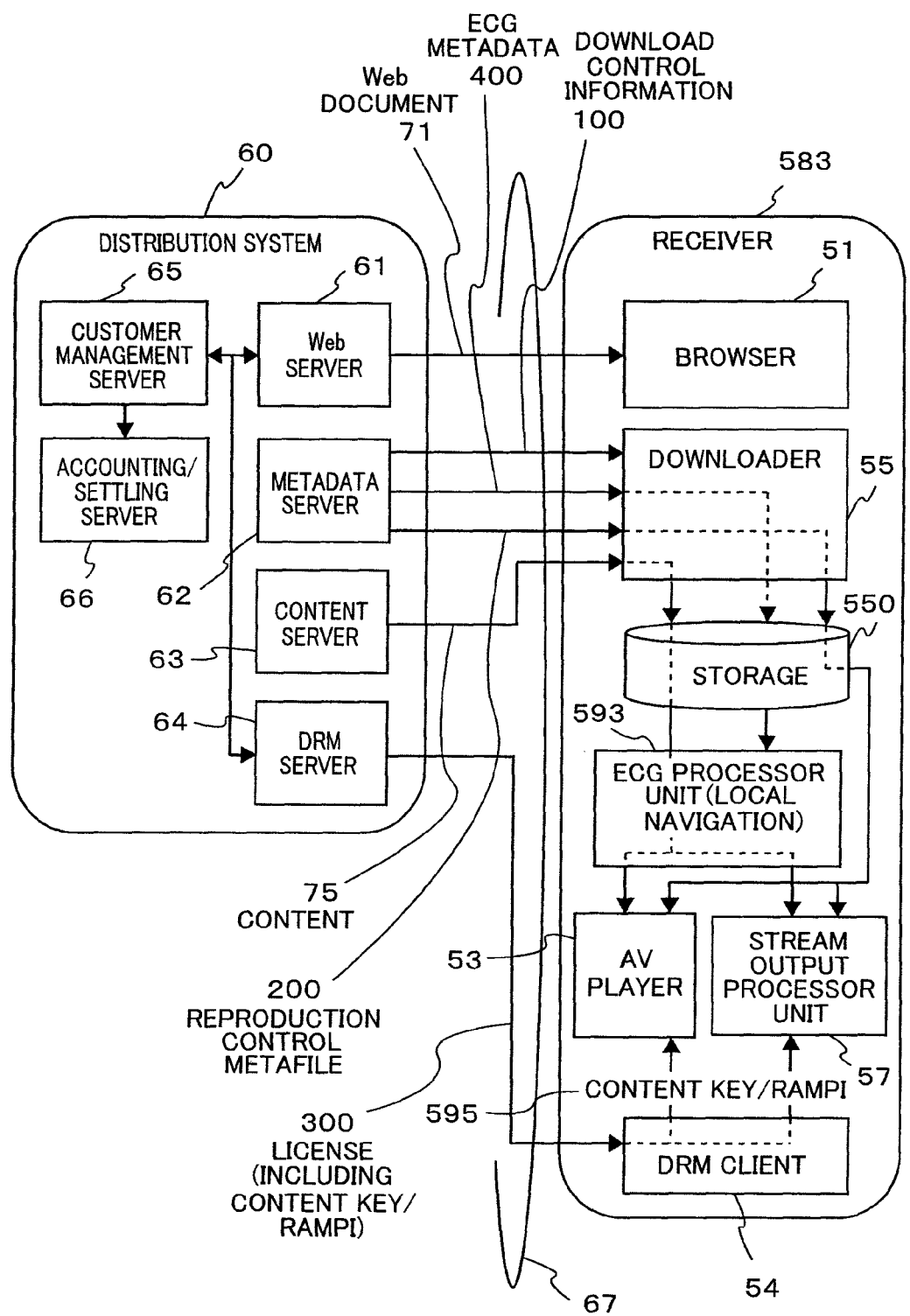
FIG. 6 shows a third example for showing the relationship between the receiver and the distribution system.

A receiver 583 shown in FIG. 6 is that, being described by extracting the blocks for giving/receiving data between the download distribution system through the storage 550, from the receiver 50 shown in FIG. 3.

In the case of FIG. 6, upon basis of display of the Web 71 received from the Web server 61 and operation on an operation device, such as, a remote controller, the browser 51 looks up a content 75 to be seen by the user and find it out. Or, not shown in the figure, but similar to that shown in FIG. 5, there may be provided a method; i.e., the ECG (Electric Content Guide) processor unit 52 of the receiver application shows the ECG metadata 400, which is obtained from the metadata server 62, to the user in the form of ECG, and thereby the user looks up the content to be seen by her/him from that ECG and find it out.

Upon receipt of the selection of content to be seen from the user, when the user gives an instruction for downloading the content on the Web document 71, the browser 51 obtains the download control information 100, the reference address of which is described in the Web document 71, from the metadata server 62, and makes a request for download to the downloader 55, The downloader 55 obtains the ECG metadata 400, the reproduction control metafile 200 and the content 75 of the content to be downloaded, and stocks or accumulates them into the storage 550.

The content 75 accumulated can be searched or selected, by means of an application, being called the local navigation 56, of the receiver, to be reproduced or exported.

When reproduction of content is instructed by the local navigation 56, the AV player 53 is started, so as to request the reproduction, while export of the content is instructed, the stream output controller unit 57 is started, so as to request the export process.

Next, explanation will be given on the details of the information, which the receiver processes therein.

Figure 7:
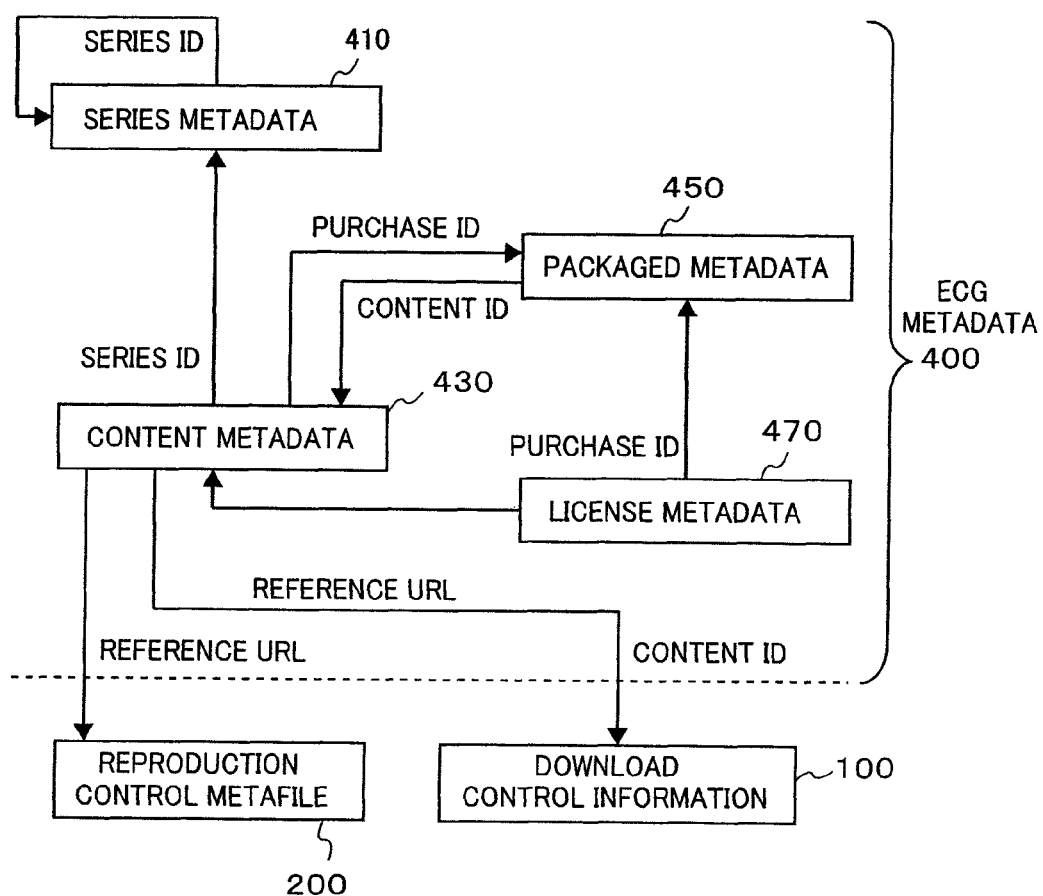
FIG. 7 shows a diagram for showing correlation of ECG metadata.

FIG. 7 is a view for showing a correlation of the ECG metadata, which is presented by the ECG processor unit 52 for the purpose of content search as ECG. The ECG metadata 400 is described in XML format.

The ECG metadata 400 is made up with content metadata 430 for describing the property information, such as, a title or an explanation of each of programs to be distributed, the video, the audio, and a genre, etc., series metadata 410 for grouping each program as a series of programs, thereby to make it manageable and searchable, and packaged metadata 450 for describing a purchase condition of the program and/or the grouping program therein. In the content metadata 430 can be described a group ID for uniquely identifying the group metadata 410, which that program belongs to, and the group metadata 410 can define a hierarchical group construction of a group by describing the group ID of the group metadata 410, which itself belongs to.

The license metadata 470 has a content ID for uniquely identifying the content metadata 430 of the program(s) available on that license, and a purchase ID for uniquely identifying the packaged metadata, which can be used as the purchase condition, and wherein the content metadata 430 and the packaged metadata 450 have the purchase IDs and the content IDs, each corresponding to each other. In case where the streaming reproduction, or the download, or both of them can be made on that content, the content metadata 430 can have reference information, to obtain the reproduction control information 200 for use the streaming reproduction and also the download control information 100 for use of download of the content.

Figure 8:
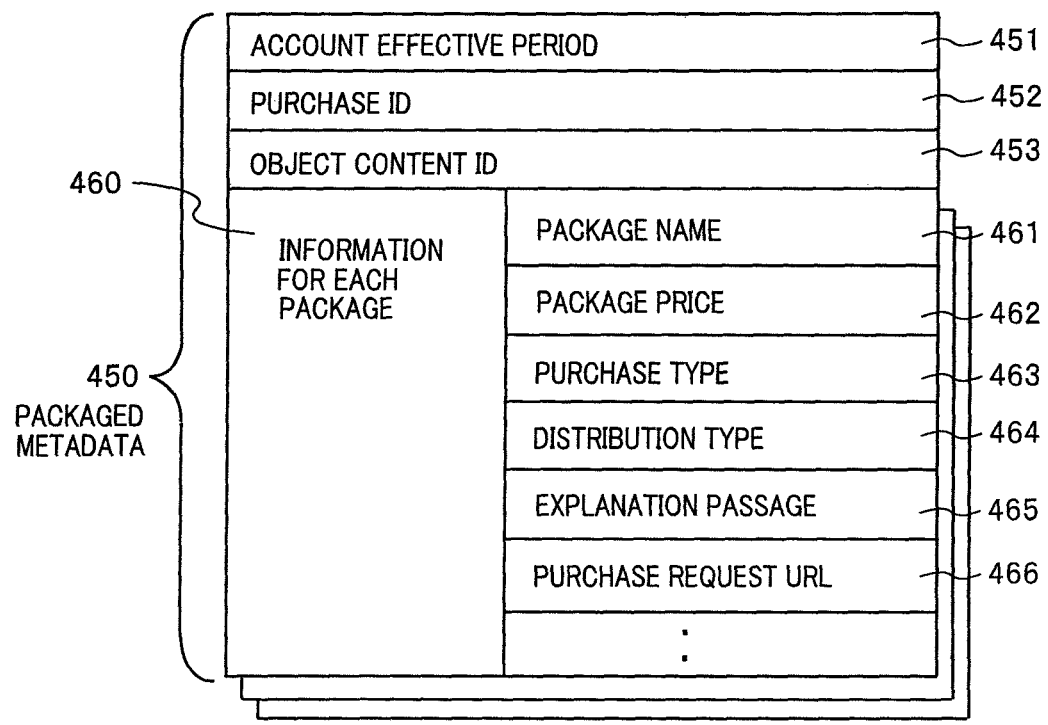
FIG. 8 shows an example of the structure of package metadata.

FIG. 8 shows an example of the structure of the packaged metadata 450, within the ECG metadata 400.

The packaged metadata 450 holds an account effective term 451 for describing date/time to start the accounting and date/time to end the accounting, a purchase ID 452 for uniquely identifying the packaged metadata 450, and an object content ID 453 for identifying the content to be a purchasing object of the packaged metadata 450.

The packaged metadata 450 can describe plural numbers of packages in one (1) piece of the packaged metadata, and has the following information about the respective packages.

A package name or title 461, a package price 462 and a passage of explanation 465 are information for presenting the details of the content to the user. A purchase type 463 is information for identifying a form of purchase of the package, such as, purchasing the package by a unit or purchasing in a bundle of the series thereof, or purchasing on a monthly contract, for example, and the distribution type 464 is information for identifying distribution manner, such as, to distribute the content through a streaming distribution, or through a download distribution, or through both of them, etc.

The purchase request URL 466 is information for describing an access address for the server to request a purchase transaction, upon basis of an operation for purchasing by the user.

Namely, the ECG processor unit 52 shows a lookup screen while referring to the content metadata 430 or the group metadata 410, and if finding out the content to be used, it shows the purchase condition of the content to the user by referring to the license metadata 470 of that content, so as to let her/him to execute the purchase operation in accordance with the packaged metadata 450. On the ECG shown by the ECG processor unit 52, if the streaming reproduction of content is instructed, the reproduction control information is obtained in accordance with the URL, which is described in the content metadata 430, and the AV player 53 executes the streaming reproduction in accordance with the details described in the reproduction control information 200.

On the ECG shown by the ECG processor unit 52, if the download of content is instructed, the download control information is obtained in accordance with the URL, which is described in the content metadata 430, and the downloader 55 execute the download of content in accordance with the details described in the download control information 100.

Figure 9:
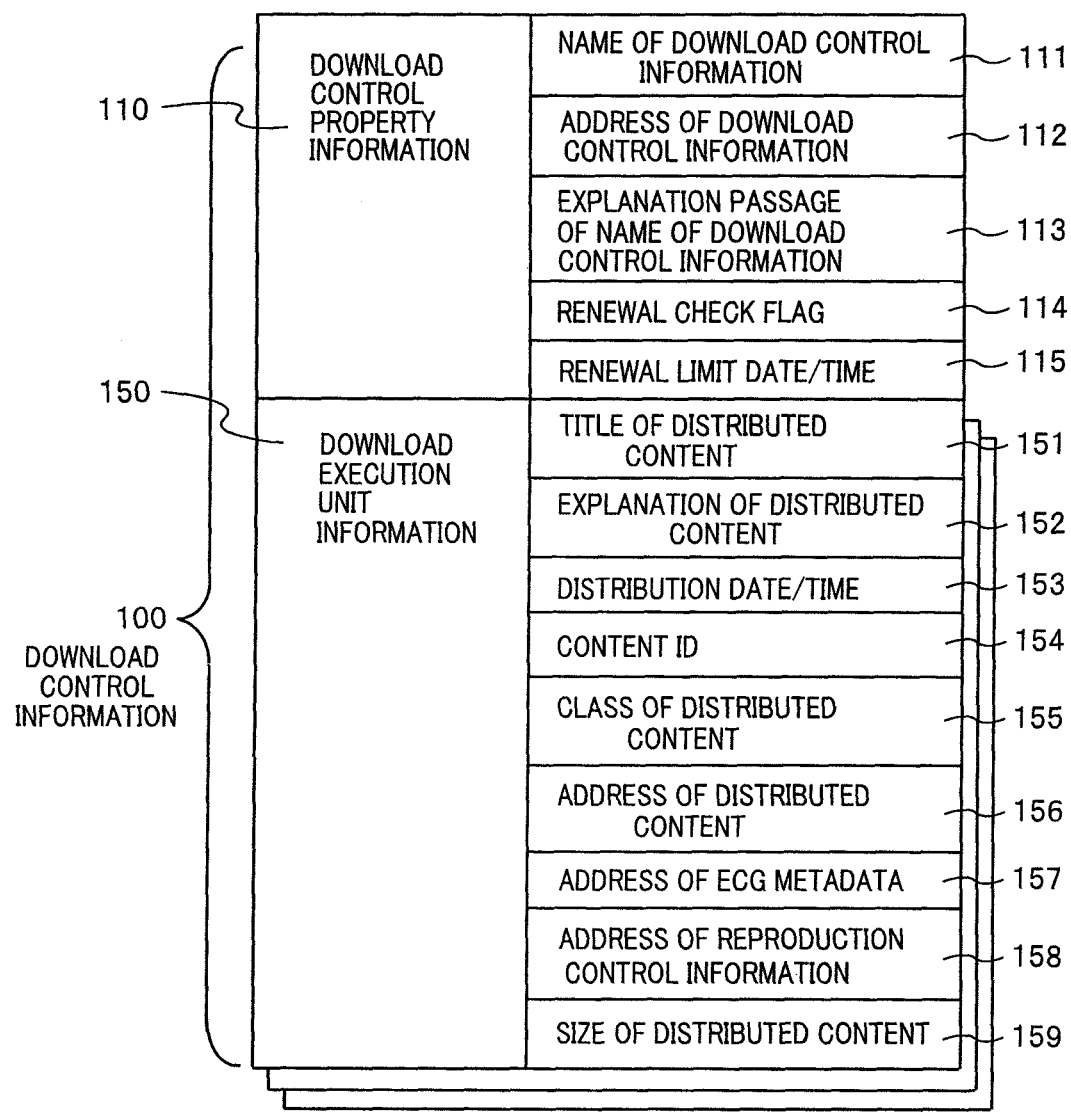
FIG. 9 shows an example of the structure of download control information.

FIG. 9 shows an example of the structure of the download control information 100. The download control information 100 includes download control property information 110, for describing the contents of the metafile itself, and one (1) or plural numbers of download execute unit information to be used in downloading the content.

The download control information 100 is described by, for example, RSS (RDF Site Summary or Really Simple Syndication). Though the download control information can be produce (or prepared) for plural numbers of arbitrary contents within a certain package, but it never step over plural numbers of packages.

Also, it is possible to prepare the plural numbers thereof for a certain package. However, in order to download all of the contents within the package, certainly, the download control information should be prepared. Since the download control information 100 may be renewed, sometimes, then the receiver check it at a constant period, and renews the difference therebetween. However, in case of the RSS, each content is identified, uniquely, by enclosure url.

The download control information 100 has the following information; i.e., a name or title 111 of the download control information, for showing a name or title of the corresponding download control information 100 (for example, a mane or title of download reservation, a filename, an ID, etc.), an address 112 of the download control information, for showing an address of the corresponding download control information 100 (for example, URL on the Internet of a website providing the download reservation. But, not limited to the URL, it may be others, such as, an address, etc. Hereinafter, the address means the same.), an explanation text 113 of the download control information, for showing an explanation of the corresponding download control information 100 (for example, an explanation about the download reservation or a language type, etc.), a renewal check flag 114, a renewal limit date/time 15, and so on.

The renewal check flag 114 is a flag for determining an necessity of a periodical check, on whether the details of the download control information 100 on the metadata server 62 is renewed or not, wherein it takes a value "renewal" for conducting the check or "single shot" for not conducting the check, periodically, after obtaining at first. The renewal limit date/time 15 is effective only when the renewal check flag 114 has "renewal", and it describes the date/time of the limit for continuing the check on the renewal of the download control information 100.

The renewal limit date/time 15 indicates a limit for observing the renewal of content. A unit of the limit (daily, hourly, or every minute, etc.) is arbitrary. It is also possible to takes a value "no limit", for indicating to continue the check, semi-permanently. Also, as other method(s) than that, if treating a special value of the renewal limit date/time 15 (for example, all thereof are "0") as the value indicating the "single shot" of the renewal check flag 114, it is possible to achieve the structure for omitting the renewal check flag 114 therefrom.

Plural numbers of download execute unit information 150 can be described in the download control information 100. For each content to be downloaded, the following information are stored; i.e., a title 151 of that content (it may be a program name or the like, or a filename or an ID, for example), an explanation text 152 of the distribution content, for the explanation of that content (characteristics and/or remarks, etc.), distribution date/time 153 for showing the date/time (may be a unit of day, or a unit of minute) for distributing that content, a content ID 154 of the distribution content, for uniquely identifying that content on the Internet, a classification 155 of the distribution content, an address 156 of the content for showing URL at a destination for obtaining the ECG metadata corresponding to that content, an address 157 of the ECG metadata for showing the URL at an destination for obtaining the ECG metadata corresponding to that content, an address 158 of the reproduction control information for showing the URL at an destination for obtaining the reproduction control information corresponding to that content, a size 159 of the distribution content, and so on.

A content ID identifier 154 is described with using a line of characters, which are defined by a schema, such as, "CRID:// authority/content_id", for example, wherein a part "authority" is a keyword for uniquely identifying a distributor of content on the network. In the present embodiment, operations are made by a domain name, which is managed as a unique name on the Internet, as the "authority".

The "content_id" after the "authority/" is an ID for identifying the content, uniquely, within the "authority", a format of a character line may be determined, freely. With such the operation/determination, it is possible to identify the content on the Internet, uniquely, by means of the content identifier 154, and to obtain the content targeted and the metadata relating thereto, by accessing them with using the content identifier 154 as the URL on the Internet.

The distribution date/time describes, generally, the date/time when the content is stored in the content server 63 or is opened to the public, however when the download control information 100 is distributed, there may be a case where the content is not yet opened to the public and a future date/time of when the distribution thereof is planned may be described therein. Also, in case where the detail of the content, which is renewed, once, in the distribution date/time 153 is described the date/time renewed.

The classification 155 of the distribution content describes therein a kind or sort of, such as, video, picture, music, program, multimedia data, etc., which are distributed from the server, for example. This may describe the classifications, such as, movie, news, sports, etc., by further classifying the video in more details, or a classic, a rock, a jazz, etc., by further classifying the music in more details thereof.

The metadata for use of the distribution content means attached information necessary for reproducing or executing the content, and as an example, it is genre or keyword information for use of content search, or if the content is video information, it is a thumbnail or chapter information, etc.

FIG. 10 shows an example of the structure of the reproduction control metafile 200. Explanation will be given on the structure of the reproduction control metafile 200, which can be obtained by referring to the download control information 100.

The reproduction control metafile 200 includes content characteristic property information 210, being the information of AV stream of the content itself, which is necessary when reproducing the content, license obtaining information 220, which is necessary when obtaining a content key for decrypting, etc., by accessing to the copyright management server so as to decrypting a code of the content decrypted, and three (3) pieces of XML documents of network control information 230, which are necessary for conducting the reproduction control in the case of a streaming VOD. However, the network control information 230 is not necessary in case of the download distribution.

The content characteristic property information 210 provides a filename and a reference address 211 of a main file of the content, distinction information 212 of if the content is encrypted or not, a time length 213 of the content, property information 214 of a video signal, such as, a resolution, scanning, an aspect ratio, etc., property information 215 of an audio signal, such as, distinction among stereo/monaural/multi-channel, etc.

The license obtain information 200 of content provides copyright management server address information 221, to which the license of the content targeted is obtained, classification information 223 of the copyright management method, a license ID 224 for showing a classification of protection extent or region, which is attached to the content, a value 222 and a reference address of an element of a signature object, for executing a server authentication between the copyright management server and the receiver as the client, condition information 225 for using the license, a public key certificate 227 necessary for verifying a certain signature, etc.

The network control information 230 describes therein, information 231 relating to a streaming protocol method, which is available, a special reproduction and/or a headword method 232 for the content, various kinds of streaming server function information, such as, if the reproduction interrupted temporally can be opened again or not, etc., information 233 indicating how a magnification is, for each stage, if speed-variable reproduction can be made at plural numbers of stages within the functions of the server, and information 234 of that reproduction method.

As the reproduction method, there can be assumed a method for distributing while preparing a stream for exclusive use the speed-variable reproduction on the server side and/or a method for achieving a high-speed reproduction, in a pseudo manner, by reproducing the stream at a normal speed while jumping over a still picture included therein, etc.

Figure 11:
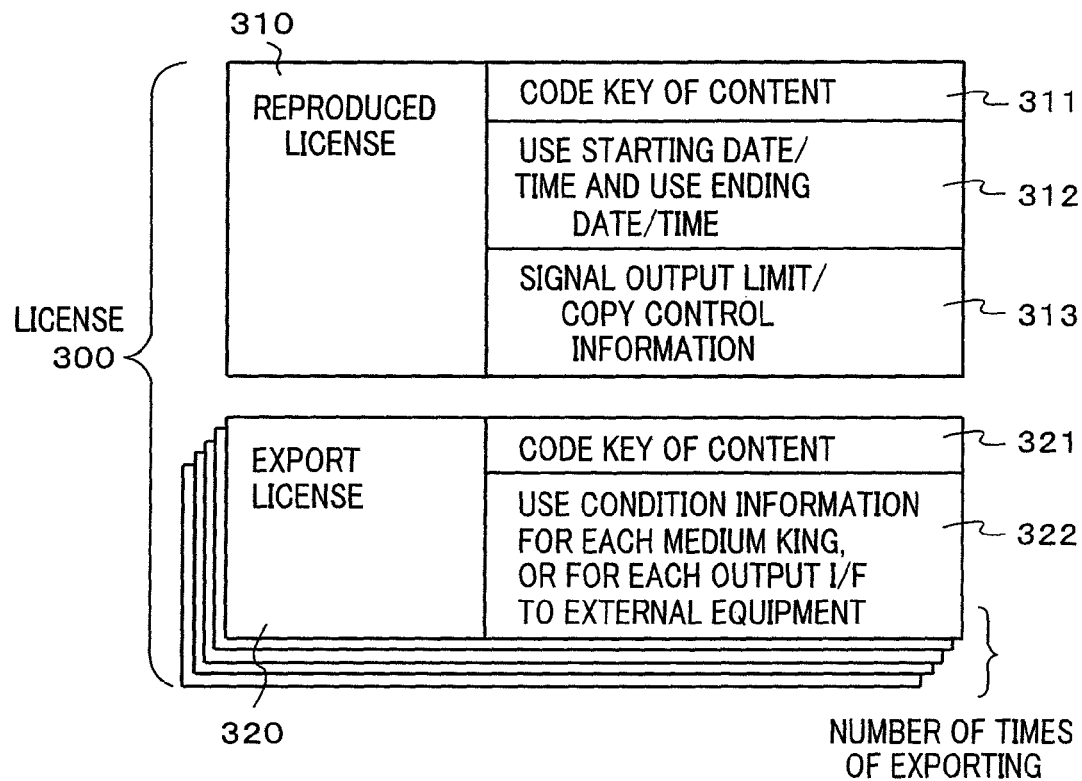
FIG. 11 shows an example of the structure of license.

FIG. 11 shows an example of the structure of the license 300. Explanation will be made on the structure of the license 300, which can be obtained by referring to the download control information 100, or which can be obtained when starting the reproduction of content or starting the export.

The license has a reproduction license 310, which describes therein a right for viewing/listening programs, and an export license 320, which describes a right for outputting the programs to an external medium or a network.

The license has code keys 311 and 321 of content, each being necessary for decrypting the content, and in case of the reproduction license 310, it has date/time for starting the use and date/time 312 for ending the use, and/or a signal output limit when reproducing and/or copy control information 313.

With the date/time for starting the use and date/time 312 for ending the use, designation of no limit can be made.

In the export license 320 can be designated using condition information 322, such as, a copy control or an analog output limit, etc., in case when outputting to the respective medium, for each medium (or a network), to which the export can be made.

With the export license 320, one (1) time of export can be made for one (1) piece of license, and in order to export one (1) set of the content by N times, N pieces of the export licenses 320 are distributed from the DRM server 64 to the receiver 50.

Next, explanation will be given on an example of the system configuration mentioned above and a user interface of a receiver application, which is achieved upon basis of the data structure mentioned above, by referring to FIGS. 12 through 19.

Figure 12:
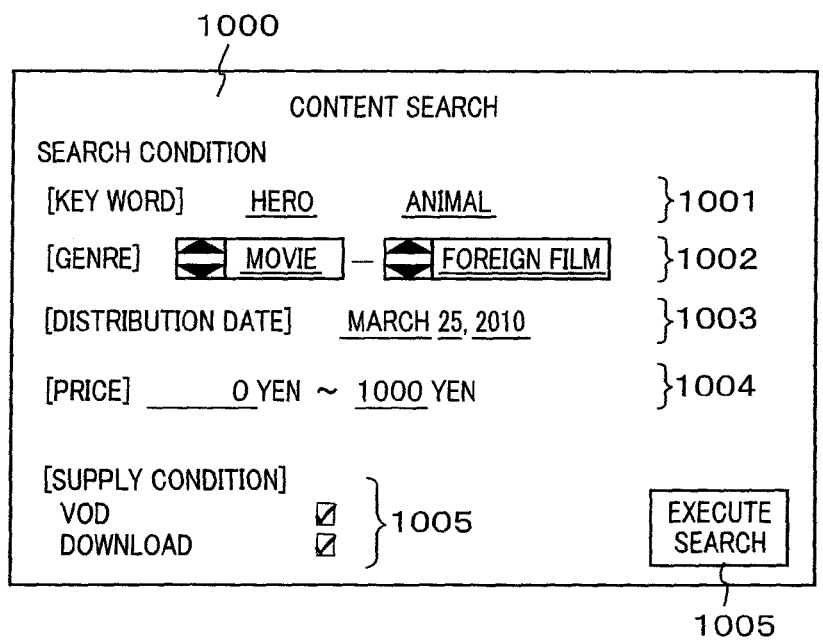
FIG. 12 shows an example of a screen of content search on the receiver.

FIG. 12 shows an example of a content search screen 1000 achieved within the ECG processor unit 52.

On this picture, which is started on this screen of a remote controller, there are prepared a keyword 1001, a genre 1002, a distribution date 1003, a price 1004, choices, such as, a providing form, and an input field, and when a search start 1005 is instructed, the ECG metadata 400 corresponding to the substance instructed by the user.

FIG. 13 shows an example of a display of a search result screen, which is presented by the ECG processor unit 52. In this example, a list of results of the search is displayed, wherein the followings are displayed: i.e., a title 1101, a providing form 1102, a purchase condition 1103, and in the form of an operating button for the content, a purchase or details 1104, a VOD view/listen 1105, a button 1106 relating to DL.

It is assumed that in a column of the providing form 1102 is displayed "VOD" if that content can be provided to the packaged metadata 450 only through the VOD distribution (e.g., the streaming distribution), "DL" if it can be provided only through the download distribution, or "VOD/DL" if can be provided through both of them. However, "VOD" means a Video On Demand.

In a column of the purchase condition 1103 is displayed the information, which is managed by the receiver, such as, a fact on if that content is already purchased or not, by the user, or it is charge-free content.

With a button of the purchase or details 1104, a "purchase" button is displayed if that content is not yet purchased, or a "details" button is displayed if the content is already purchased or there is no necessity of purchase since it is charge-free.

A "VOD" button 1105 is displayed only when that content can be viewed/listened through the VOD (e.g., the streaming), and if this button is selected, then the VOD view/listen is started.

The button 1106 relating to DL is displayed only for the content, which can be downloaded, but depending on the condition, for example, for the content, which is not downloaded yet, an inoperable "DL waiting" button is displayed, which is changed to a "during DL" when the download is started and is changed to "DL view/listen" when the download is completed, while the content that is already downloaded can be viewed/listened when selecting the "DL view/listen" button. However, even if in the condition of "during LD", there may be provided a receiver for brining the content to be viewable if it is buffered up to a certain degree.

FIG. 14 shows an example of a content purchase screen 1200, which is displayed by the ECG processor unit 52. This content purchase screen 1200 is displayed when the "purchase" button is selected on the search result screen 1100.

A title 1201 necessary for purchasing the content, a substance 1202, a director 1203, performers 1204, a genre 1205, a view limit 1206, information 1207 relating reproduction time and/or vide and audio, information 1208 relating a number of times for enabling the export, choices 1209 of providing form or condition, and a price 1210, etc., are presented upon basis of the ECG metadata 400, and if the providing form or condition 1209 is selectable, it is possible to select one of "VOD" or "download" or both of them.

In the example shown in FIG. 14, where "VOD" is presented to be invalid by a delete line, it is displayed that "download" is effective. And it is also displayed by a checkmark that the user selects the "download".

After selecting, upon selection of a "purchase" button 1223, purchase transaction of content is generated between the distribution system.

While it is assumed, when a "return" button 1224 is selected, the screen turns back to the search result screen 110.

Figure 15:
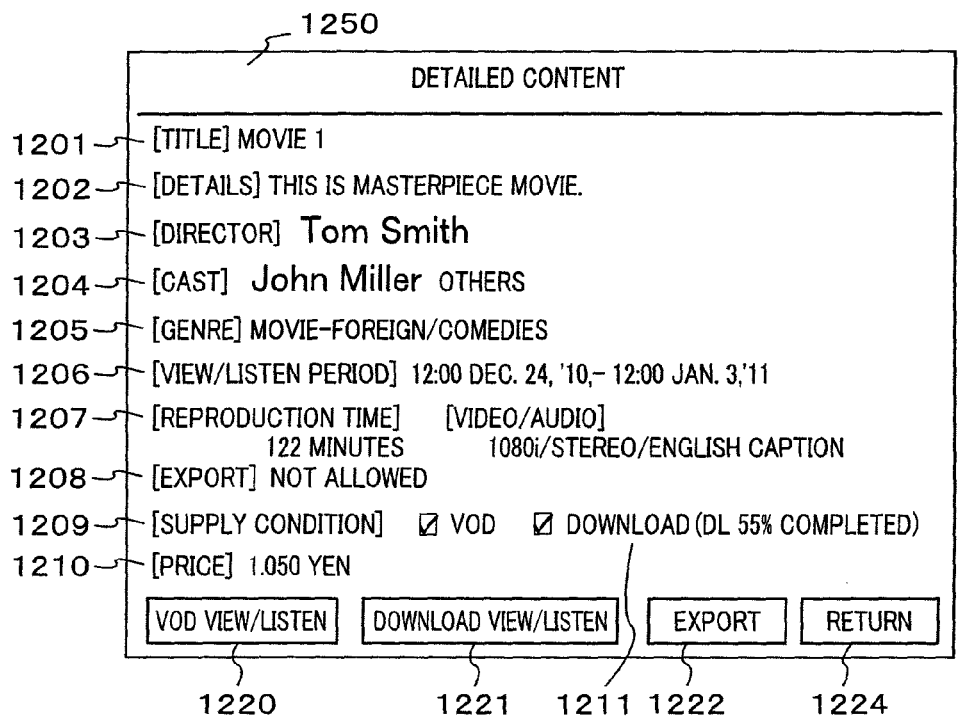
FIG. 15 shows an example of a screen for displaying details of content on the receiver.

FIG. 15 shows an example of a content details screen 1250, which is displayed by the ECG processor unit 52. After purchase of the content, when selection is made on a "details" button on the search result screen 1100, the content details screen 1250 is displayed.

This screen is almost similar to that of the content purchase screen 1200, in the information to be displayed thereon; however, because of a reason of after purchasing, there is no "purchase" button 1223, but in the place thereof, the buttons are displayed thereon, such as, indicating "VOD view/listen" 1220, "download view/listen" 1221 and "export" 1222, for example, and each of the buttons, a function of which is effective to, comes to be effective, and thereby enabling the operation thereof.

Also, in the column of the providing form or condition 1209, no selection can be made, because of completion of purchasing, there is displayed only the providing form or condition of the content purchased, while there may be cases where a progress condition 1211 is displayed for the content, on which the download view/listen can be made.

Figure 16:
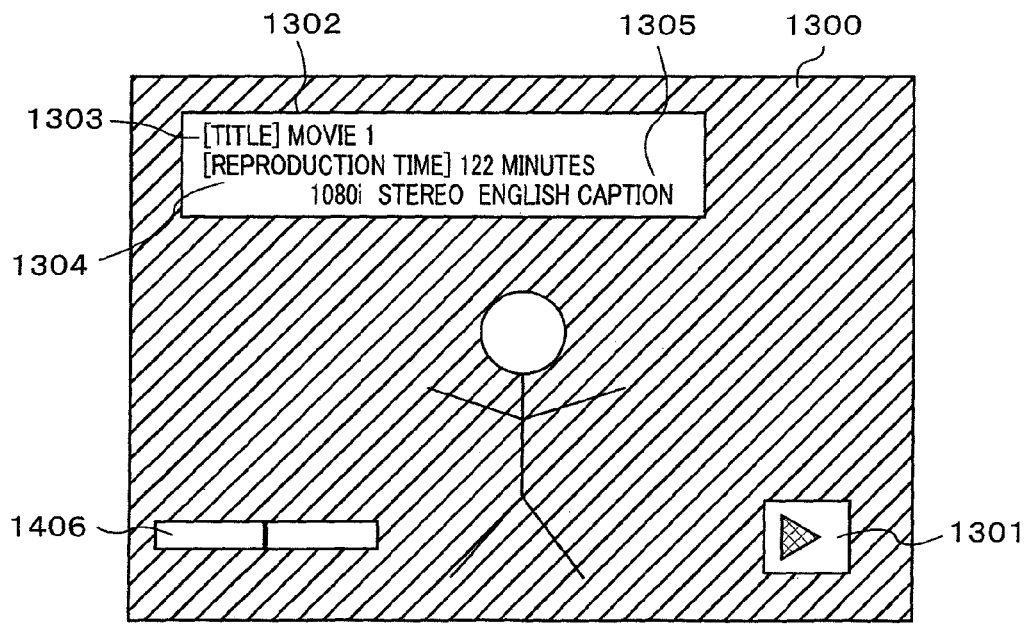
FIG. 16 shows an example of a screen of reproduced content on the receiver.

FIG. 16 shows an example of a content reproduction screen 1300, which is displayed by the ECG processor unit 52. When the VOD view/listen or the download view/listen is selected, on the search result screen 1100 for content or the content details screen 1250, the content reproduction screen 1300 is shown or presented.

On the content reproduction screen 1300 are displayed, upon basis of the reproduction control information 200, a title banner 1302, a title 13003 of content, reproduction time 1304, and detailed information 1305 of video/audio, and also an icon display 1301 may be made on an operating content, depending on an operation through the remote controller or the like, or there may be may that conducting a display 1406 of a present reproducing position, during the entire of reproduction time, depending on the receiver.

Figure 17:
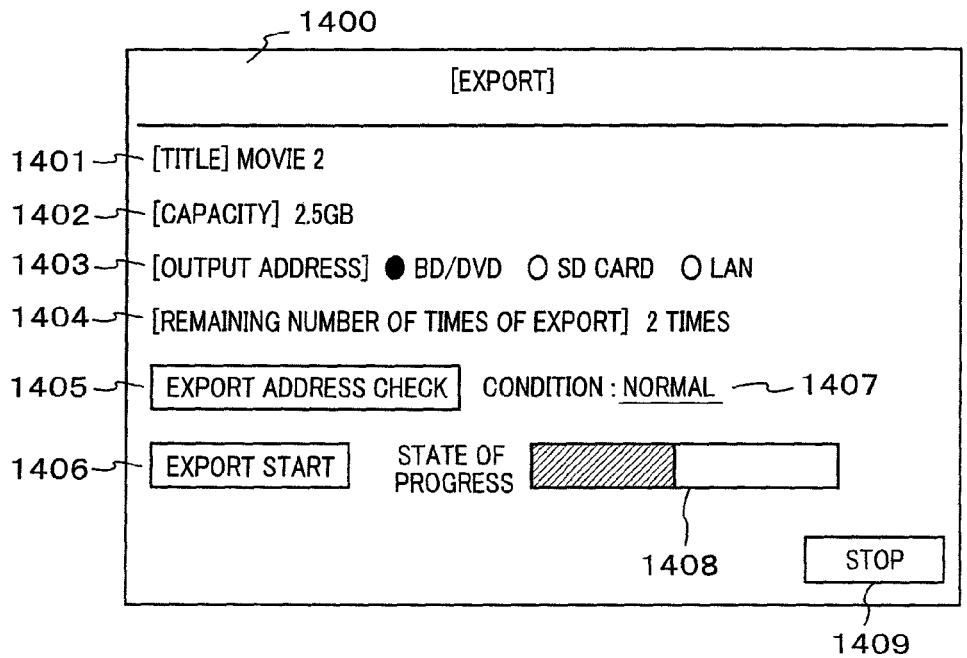
FIG. 17 shows an example of en export screen of the receiver.

FIG. 17 shows an example of the export screen 1400, which is displayed by the ECG processor unit 52. When the export is instructed on the content details screen 1250, this export screen 1400 is presented or shown.

On this screen, upon basis of the ECG metadata 400, after displaying a title 1401 of the content and a capacity 1402, etc., there are displayed choices 1403 of allowable output addresses and a remaining number of times 1404 of the export, which is managed by the receiver.

When the user selects the output address and selects an "export address check" button 1405, checking is made on if the content to be exported can be recorded or not into a medium at the export address, and if it is possible, "normal" is displayed, while displaying a result of that in a condition column 1407 if it is impossible.

Also when an "export start" button 1406 is selected, similar to that when the "export address check" button 1405 is selected, previous check is made, and if there is a problem, the reason thereof is displayed in the condition column 1407; however, in case of the "export start" button 1406, the export is started if it is normal.

A progressing state of the export is displayed as a progress condition 1406, and it is assumed that, if the export is completed, the export screen is displayed, subtracting the remaining number of time 1404 by "1" time.

When the user wishes to stop the export before completing it, so as to return to the content details screen 1250, she/he selects a "stop" button.

The screens of the ECG are produced within the ECG processor unit 52, in such the manners as mentioned above.

As other embodiment, it is also possible to conduct those from the search of content up to reproduction thereof, presenting the Web document 71 obtained from the Web server 61, not by means of the ECG processor unit 52, but by means of the browser 51.

Figure 18:
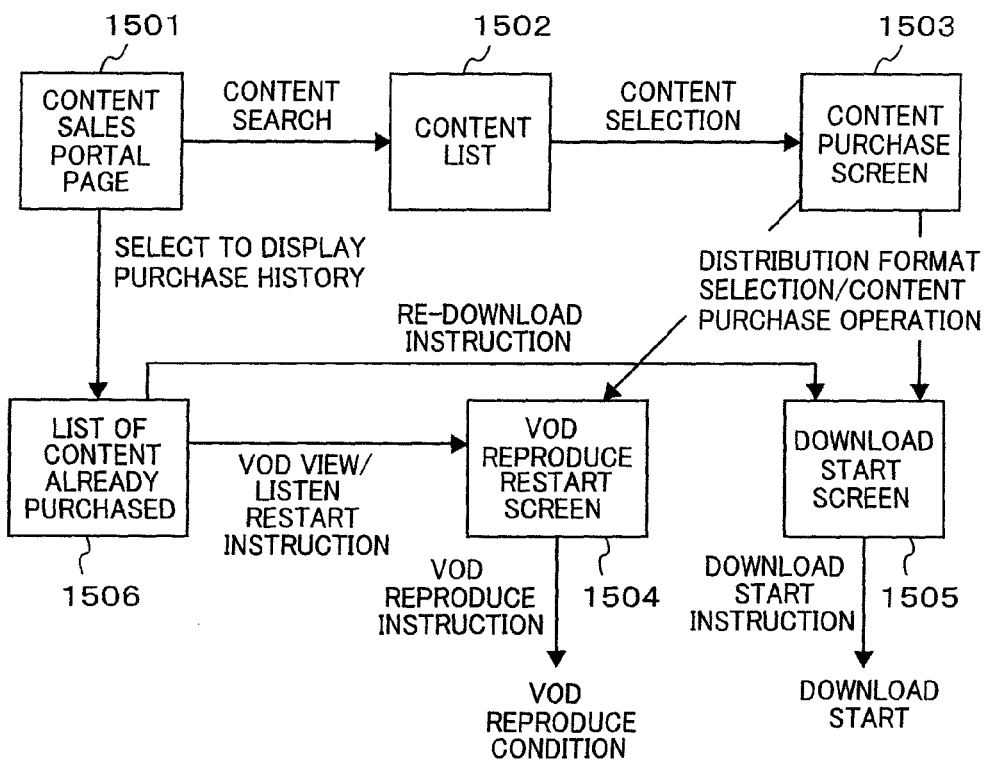
FIG. 18 shows an example of shifting of the Web content on a browser of the receiver.

FIG. 18 shows an example of transition of the Web document 71, which is presented on the browser 51.

Upon receipt of selection of a homepage or a bookmark when starting the browser 51, the browser 51 displays a content sale portal page 1501 at first. Herein, if an instruction for searching the content is made, the browser 51 displays a content list page 1502 of the search result, and if a content is selected from the search result, a content purchase page 1503 is displayed.

When the purchase through VOD is selected by selecting the distribution form for purchasing the content, on the content purchase screen 1503, the browser 51 displays a VOD reproduction start page 1504, and if the VOD reproduction is instructed, it displays the content reproduction screen shown in FIG. 16, by referring to the reproduction control metafile 200.

Or, when selection is made on the purchase through downloading on the content purchase screen 1503, the browser 51 displays a download start page 1505, and if an instruction for starting download is made, it starts download of the content on a background, upon basis of the download control information 100.

FIG. 19 shows a local navigation screen 1600, which is displayed by the browser 51. The content to be distributed through the download is displayed under the local navigation screen 1600.

On this screen, the content(s), on which the download instruction is made, and/or the content(s), which is/are downloaded are displayed in the form of a list thereof, wherein a title 1601, a download condition 1602 and a purchase condition of the content are displayed, as well as, a "purchase" or "details" button 1604, as an operation button for the content, and also a "view/listen" button 1605 is displayed for the content, which can be viewed/listened under the purchase condition, and an "export" button 1606 for the content, which can be exported.

In a download condition column 1602 is display the condition, such as, "DL waiting" under a condition of being downloaded at a glance, although the download was instructed thereto, "during DL" for starting the download and displaying a state of progress thereof, "DL completion" indicating that the download is completed, and "DL error" indicating that an error occurs during the download and is interrupted, for example, etc.

In a purchase condition column 1603 is displayed the condition, such as, not purchased yet, already purchased, charge-free, etc.

Regarding buttons, the "purchase" button is displayed for the content, which is not purchased yet, while the "details" button is displayed for the content, which is already purchased. The view/listen button comes to be effective when the download is completed or when a buffering thereof proceeds to such a degree that reproduction can be, even during downloading, and it comes to be selectable. Also, when the content comes into a condition where it can be exported, the display of the "export" button 1606 changes into an effective one, and it can be selected.

When selecting the "view/listen" button 1605, the screen is shifted into the content view/listen screen 1300, and when selecting the "export" button 1606, it is shifted into the export screen 1400.

With those mentioned above, it is possible to conduct from the search of content up to the reproduction of content on the Web site.

Next, detailed explanation will be given on a process of the export, by referring to FIGS. 20 and 21.

FIG. 20 shows an example of the structure of an interface unit between the receiver and the removable medium. As such removable medium can be assumed a removable HDD for the like, for example, an iVDR (registered trademark), etc. However, it should not be limited to the iVDR.

In the figure, an arrow of solid line depicts a flow of the content while an arrow of broken line a flow of the control.

In FIG. 20 is shown an example of the structure of the stream output processor unit 57 for executing the export process to the removal medium 560 having a copyright protection function. The stream output processor unit 57 of the receiver 50 is constructed with a medium authentication processor unit 541 for executing authentication between the removable medium, a content key producer unit 543 for producing a code key for encrypting the content to be transmitted to the medium, a content encrypting processor unit 542 for encrypting the content upon basis of the content key, and a key encryption processor unit 544 for encrypting the content key produced, to be transferred to the removable medium.

The content to be inputted into the content coding processor unit 542 is inputted from the decryptor 514 of the receiver 50 or the de-multiplexer 521.

However, all or part(s) of the medium authentication processor unit 541, the content key producer unit 543, the content encrypting processor unit 542 and/or the key encrypting processor unit 544, which is/are described in FIG. 20, can be achieved in the form of hardware, for example, by making it/them as a processor unit(s) for executing the respective process(es) as an integrated circuit(s). And also, all or part(s) of the medium authentication processing program 541, the content key producing program 543, the content encrypting processing program 542 and/or the key encrypting processor unit 544, and so on, which is/are stored in the storage 550 or a memorizing device, such as, the memory not shown in the figure, can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

Through the removable medium I/F 534, the information indicating the content key received and the using condition of content (a number of time of copying, an available period) is memorized into a protected memory area or region 564, from/into which writing/reading can be made by only a medium authentication processor unit 561 for executing the authentication, mutually, with the medium authentication processor unit 541 of the receiver 50, a key decrypting processor unit 563 for taking out the content key by receiving and decrypting that content key encrypted, or the reliable receiver 50, which is already authenticated mutually, corresponding to the content.

Herein, the number of times of copying indicates a number at which the content recorded can be copied further, and if assuming that this number is "M", by adding the main body of the original content thereto, "M+1" pieces of contents can be used. The available period indicates a period for using the content on the removable medium or the like, and the following description methods can be applied:

(1) a relative time from a time point when the content is written into the removable medium or the like;

(2) a relative time from a time point when an access is made onto the content at first, on the removable medium; and (3) absolute date/time for starting use and date/time for ending use (either one can be omitted, and the omitted starting date/time and the ending date/time are considered to have no limit).

Further, all or part(s) of the medium authentication processor unit 561 and/or the key decrypting processor unit 563, which is/are described in FIG. 20, can be achieved in the form of hardware; i.e., as a processor unit for processing a part or all of them, such as, by an integrated circuit, for example. Also, all of part(s) of the medium authentication processing program 561 and/or the key decrypting processing program 563, which is/are stored in the storage 550 or a memorizing device, such as, the memory not shown in the figure, can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

The content encrypted within the medium encrypting processor unit 542 is stored in a data memory region 562, through the removable medium I/F 534.

In the medium authentication processor unit 541, there can be considered two (2) cases, i.e., when authenticating a reliability of the removable medium 560, and when authenticating both of the removable medium 560 and the receiver 50 having the removable medium I/F 534.

When the receiver 50, which is authenticated mutually, reads out the content stored in the removable medium 560, the content key of that content is read out from the protected memory region 564, and the content encrypted, which is read out from the data memory region 562, is decrypted within the receiver 50, with using the content key, and thereby being available.

Figure 21:
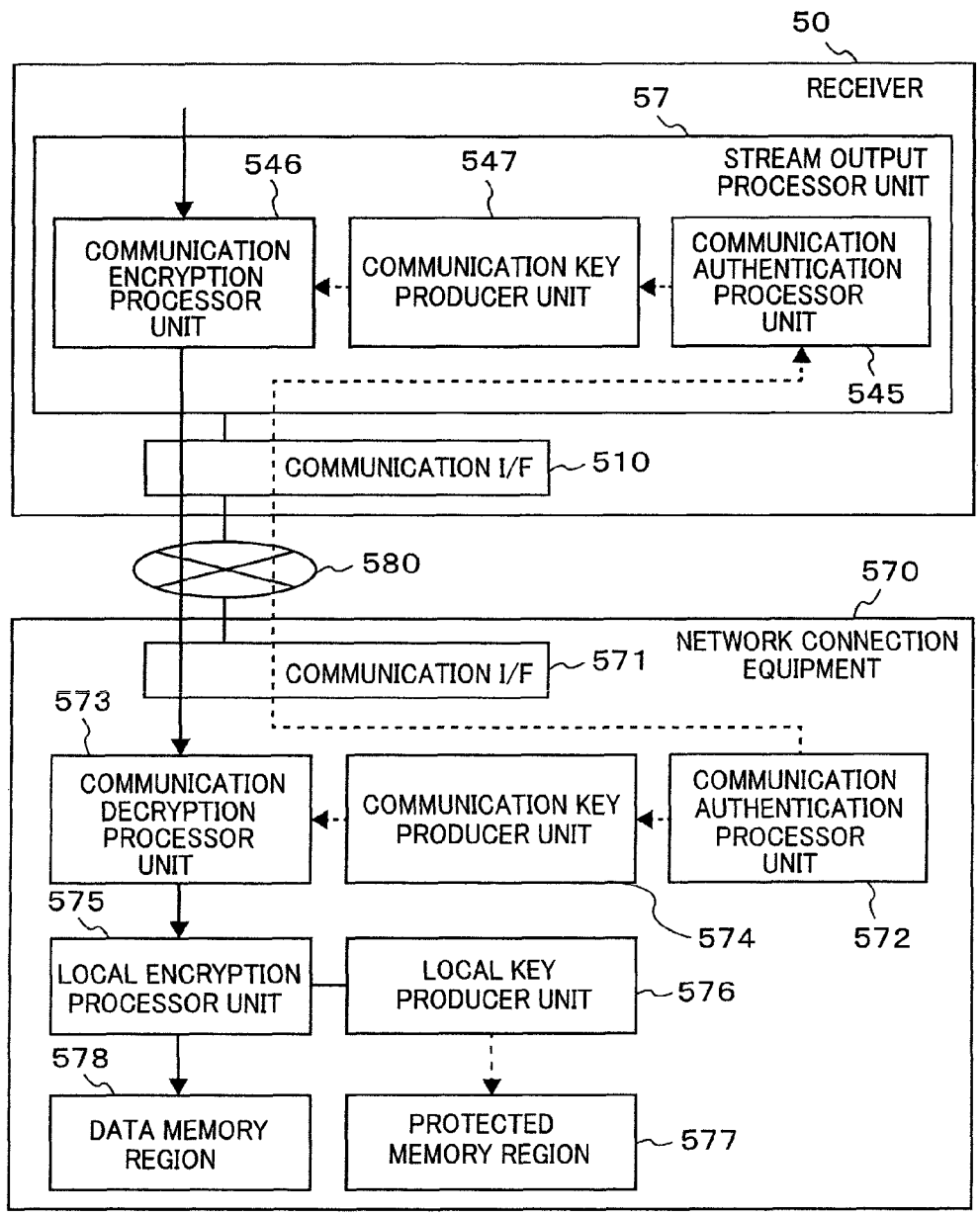
FIG. 21 shows an example of the structure of an interface unit between the receiver and network connection equipment.

FIG. 21 shows an example of the structure of an interface unit between the receiver and the network connection equipment. In this FIG. 21 is shown an example of the structure of the stream output processor unit 57 for executing an export process through the network having the copyright protection function. In this instance, the stream output controller unit 57 of the receiver 50 comprises a communication authentication processor unit 545 for authenticating between the network connection equipment, mutually, a communication key producer unit 547 for procuring a communication key for encrypting the content, upon basis of a common key, which is exchanged when authenticating, and a communication encrypting processor unit 546 for encrypting the content upon basis of the communication key produced and thereby sending out it through the communication I/F 510.

However, all or part(s) of the communication authentication processor unit 545, the communication encrypting processor unit 546 and/or the communication key producer unit 547, which is/are described in FIG. 21, can be achieved in the form of hardware, for example, by making it/them as a processor unit(s) for executing the respective process(es)) as an integrated circuit(s). Also, all or part(s) of the communication authentication processing program 545, the communication encrypting processing program 546 and/or the communication key producing program 547, which is/are stored in the storage 550 or a memorizing device, such as, the memory not shown in the figure, can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

The network connection equipment, being connected to the network 580 through the communication I/F 571, executes communication between the receiver 50.

A communication authentication processor unit 572 executed authentication between the communication authentication processor unit 545 of the receiver 50. A communication key producer unit 574 produces a communication key for decrypting the content, upon basis of the common key, which is exchanged when authenticating. A communication decrypting processor unit 573 decrypts the content, which is received through the communication I/F 510, upon basis of the communication key produced.

The content decrypted within the communication decrypting processor unit 573, in an example shown in FIG. 21, is decrypted by a local coding processor unit 575 in accordance with the encrypting method of the network connection equipment 570, and is stored in a data memory region 578, which the network connection equipment 570 has. The code key in this instance is produced within a local key producer unit 576, and the information, indicating a local key corresponding to that content and the using condition (a number of times of copying, and an available period) of the content, is stored in a protected memory region 577, to which only reliable device and/or software can access.

However, all or part(s) of the communication decrypting processor unit 573, the communication key producer unit 574, the local encrypting processor unit 575 and/or the local key producer unit 576, which is/are described in FIG. 21, can be achieved in the form of hardware, for example, by making it/them as a processor unit(s) for executing the respective process(es)) as an integrated circuit(s). And also, all or part(s) of the communication decrypting processor unit 573, the communication key producing program 574, the local encryption processing program 575 and/or the local key producing program 576, which is/are stored in the data memory region 578 or the protected memory region 577 or in a memory region not shown in the figure, can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

However, in the example shown in FIG. 21, although it is the case where the network connection equipment 570 has the data memory region 578, unique to the equipment, but the network connection equipment 570 may have such removable I/F 534, which the receiver 50 shown in FIG. 20 has, and have such configuration that the content received through the network is transferred to the removable medium 560 through the removable I/F 534. The configuration of the network connection equipment 570, in that instance, may be in conformity with that of the receiver 50 shown in FIG. 20.

Explanation will be given on an example of processing conducted by the receiver, in particular, the case of the receiver enabling the content distribution, by referring to FIGS. 22 through 25.

Figure 22:
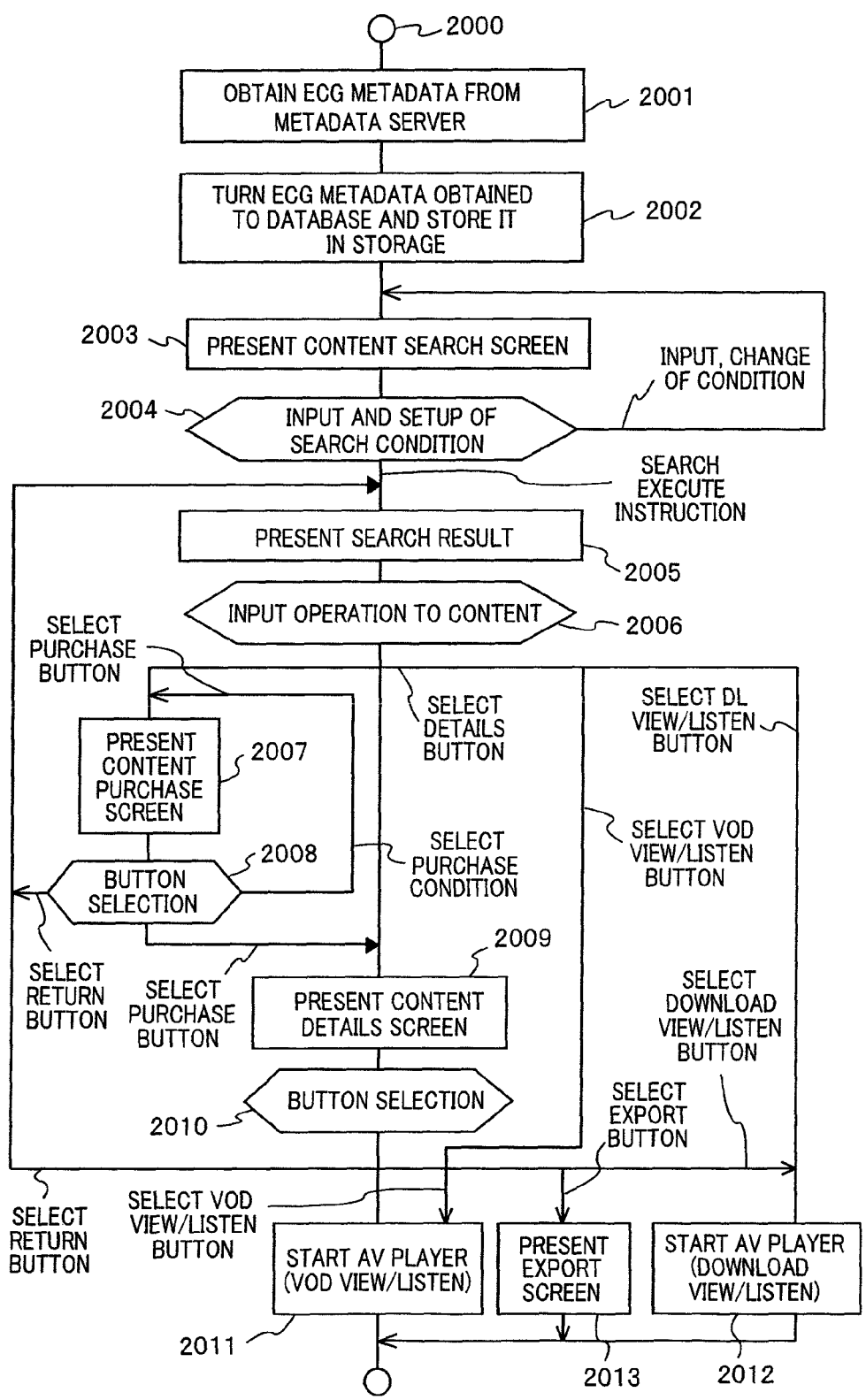
FIG. 22 shows an example of a flowchart of processes within an ECG processor unit.

FIG. 22 shows an example of a processing flowchart of the ECG processor unit 52.

The ECG processor unit 52 obtains the ECG metadata from the metadata server (S2001: "S" indicates a step), and after changing the ECG metadata obtained into such a form of database that data processing can be made easily thereon, it stores it in a storage (S2002), and further presents a content search screen 1000 (S2003).

Herein, inputting and/or setting up a search condition (S2004), if the search is instructed to be executed, a search result screen 1100 is presented. On this screen, an operation with respect to the content is accepted (S2006), and if "purchase button" is selected, the ECG processor unit 52 display a content purchase screen 1200 (S2007). When the user selects the purchase condition and the purchase button (S2008), the ECG processor unit 52 display a content detail display screen 1250 (S2009). The content detail display screen 1250 can be displayed by selecting the "details" button on the search result screen 1100.

When the user selects the "VOD view/listen" on the search result screen 1100, the AV player is started, so as to start the VOD view/listen (S2011). When "DL view/listen" is selected, the AV player is started, so as to start the download view/listen (S2012).

On the content detail display screen 1250, if the "VOD" button is selected through the operation by the user, the AV player starts, and the VOD view/listen is started (S2011). If the "DL view/listen" button is selected, the AV player starts, and the download view/listen is started (S2012), while the "export" button is selected, the display is shifted into an export screen 1400 (S2013).

Figure 23:
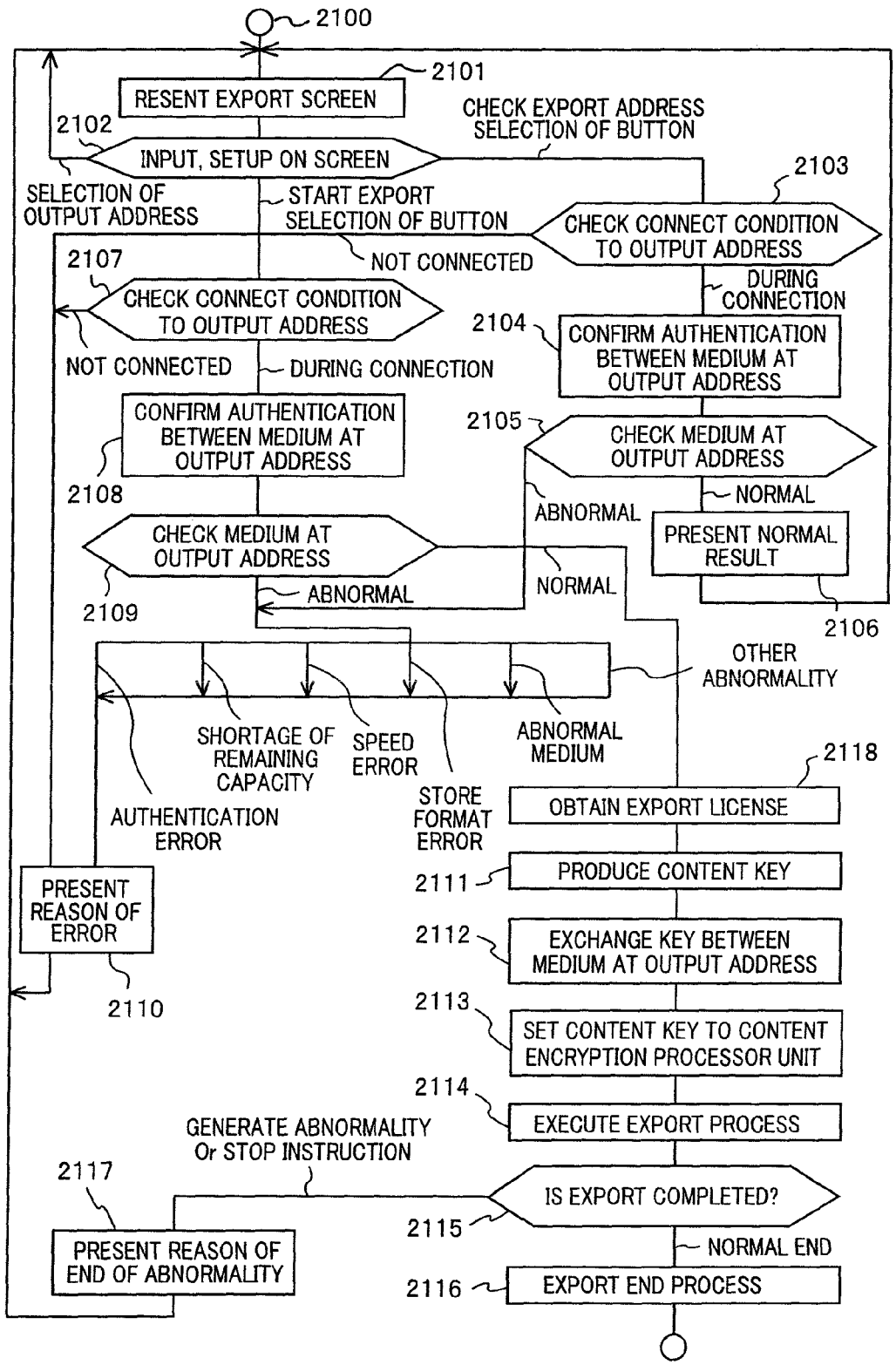
FIG. 23 shows an example of a flowchart of processes for exporting to the removable medium, within a stream output processor unit.

FIG. 23 shows an example of a process flow in the stream output processor unit 57 when exporting the content to the removable medium 560, on the export screen 1400.

After presenting the export screen 1400 (S2101), if the user selects an output address and then selects an "export address check" button through operation made on the screen (S2102), the stream output processor unit 57 checks on if the removable medium 560 is connected or not, to the output address (S2103). If connection is not made, then it presents an error message for indicating non-connection (S2110).

If connection is made, next, the medium authentication processor unit 541 confirms the authentication between the removable medium 560 at the output address (S2104), and executes a check on the removable medium 560 in details thereof (S2105). Herein, if there is no abnormality for writing the content therein, a result for showing "normal" is displayed (S2106); on the contrary, if there is abnormality, a cause of error is displayed (S2110), the process turns back into an operation receiving condition of the export screen (S2102).

As an error in this time can be considered the followings, caused due to various reasons; such as, an authentication error due to the reason on side of the removable medium 560 or the receiver 50, an error due to shortage of capacity remaining necessary for writing the content therein, a speed error on the removable medium 560 not satisfying the speed necessary for reproducing the content therefrom, a saving format error when a file format defined in the removable medium 560 is not conformity with that for storing the content, an abnormality in writing on the removable medium 560, etc., for example.

When an "export start" button is selected on the export screen 1400, the stream output processor unit 57 checks, if the removable medium 560 is connected or not, to the output address (S2107). If not connected, an error message indication non-connection is presented (S2110). If connected, the stream output processor unit 57, next, confirms the authentication with the removable medium 560 at the output address (S2108), and checks the details of the removable medium 560 at the output address (S2109). Herein, if there is the abnormality for writing the content, the reason of that error is presented (S2110), and the process turns back to the operation receiving condition on the export screen (S2102). If there is no abnormality, it is shifted into the export process.

In the export processing, first of all, the DRM client 54 obtains the export license 320 from the DRM server 64 (S2118), then next, the content key producer unit 543 produces the content key (S2111). The key encrypting processor unit 544 encrypts that key, and then it exchanges the key between the removable medium 560 at the output address (S2112). Also, the content key producer unit 543 sets the content key to the content encrypting processor 542 (S2113). The content encrypting processor 542 execute the export processing to the removable medium 560 (S2114).

When the export is completed (S2115), in an export completing process (S2116), the medium authentication processor unit 561 executes processes, such as, reservation of the content key and/or the condition information for using the content onto the removable medium 560, or renewal of the file management information, etc., for example, i.e., bringing the removable medium 560 into such a condition that other receiver(s) can make the writing thereon. Before completion of the export, if an instruction to interrupt by the user or an abnormality of the removable medium 560 is generated, i.e., if the export is not completed normally, then the reason(s) of that abnormal ending is presented (S2117), and the process turns back to presentation of the export screen (S2101).

Figure 24:
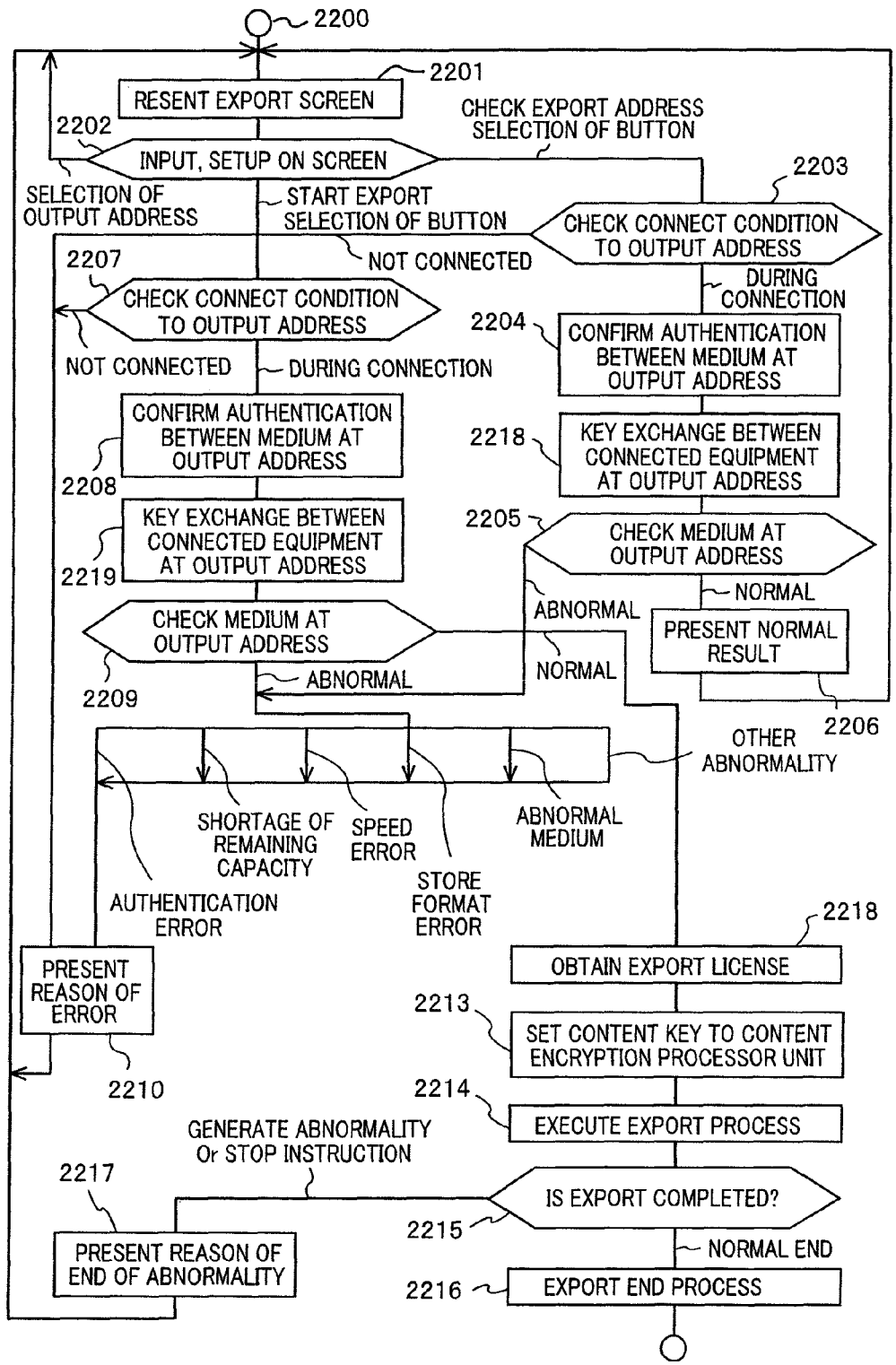
FIG. 24 shows an example a flowchart of processes for exporting to the network connection equipment, within the stream output processor unit.

FIG. 24 shows an example of a process flow within the stream output processor unit 57, when it conduct the export to the network connection equipment 570.

After presenting the export screen 1400 (S2201), if the output address is selected and then an "export address check" button is selected, the communication authentication processor unit 545 checks if the network connection equipment 570 is connected or not, to the output address (S2203). If not connected, an error message indication non-connection is presented (S2210). If connected, then next, the communication authentication processor unit 545 confirms the authentication between the network connection equipment 570 at the output address (S2204), and checks the details of the network connection equipment 570 (S2105). Herein, if there is no abnormality for writing the content therein, a result of normality is presented (S2106), but if there is the abnormality, the reason of the error is presented (S2110), and the process turns back to the operation receiving condition on the export screen (S2102).

Also, as the error in this case, in a similar manner when exporting to the removable medium 560, there can be considered the followings; such as, an authentication error due to the reason on side of the removable medium 560 or the receiver 50, an error due to shortage of capacity remaining necessary for writing the content therein, a speed error on the removable medium 560 not satisfying the speed necessary for reproducing the content therefrom, a saving format error when a file format defined in the removable medium 560 is not conformity with that for storing the content, an abnormality in writing on the removable medium 560, etc., for example.

If the "export start" button is selected on the export screen 1400, the communication authentication processor unit 545 checks, if the removable medium 560 is connected to the output address, or not (S2207). If not connected, an error message indication non-connection is presented (S2210). If connected, the communication authentication processor unit 545, next, confirms the authentication with the removable medium 560 at the output address (S2208), and checks the details of the removable medium 560 at the output address (S2209). Herein, if there is the abnormality for writing the content, the reason of that error is presented (S2210), and the process turns back to the operation receiving condition on the export screen (S2202), or if there is no abnormality, it is shifted into the export process.

In the export processing, first of all, the DRM client 54 obtains the export license 320 from the DRM server 64 (S2218), then next, the communication authentication processor unit 545 sets the communication key which is produced upon basis of the key exchanged when authenticating mutually, to the communication encrypting processor unit 546 (S2213), and the communication encrypting processor unit 546 executes the export process to the network connection equipment 570 (S2214).

When the export is completed, in an export completing process (S2216) is executed the processes, such as, closing of a communication session, etc. Before completion of the export, if an instruction to interrupt by the user or an abnormality of the removable medium 560 is generated, i.e., if the export is not completed normally, then the reason(s) of that abnormal ending is presented (S2217), and the process turns back to presentation of the export screen (S2201).

Figure 25:
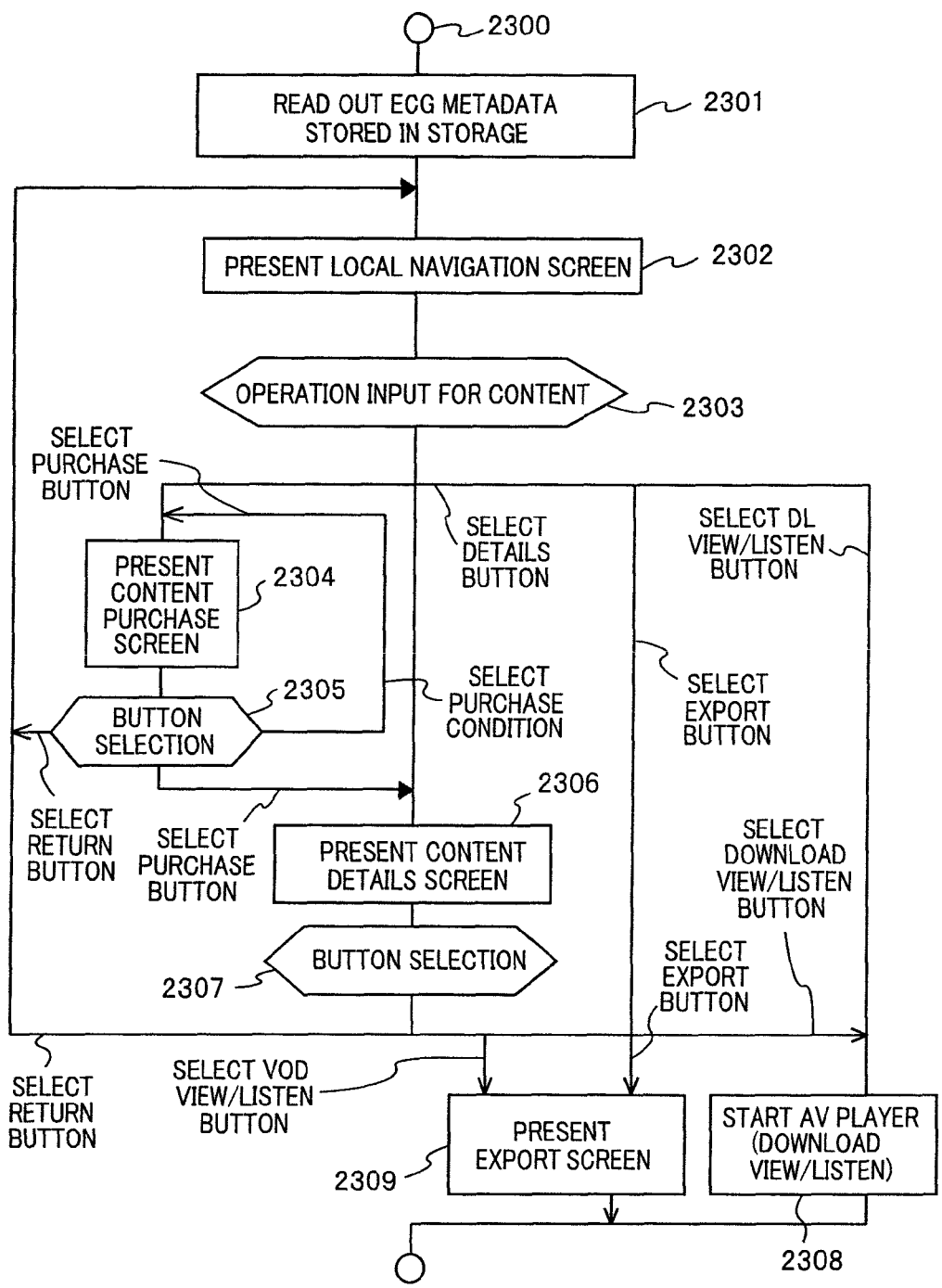
FIG. 25 shows an example of processes within the local navigation.

FIG. 25 shows an example of a process flow within the ECG processor unit on the local navigation screen 1600 shown in FIG. 19.

On the local navigation screen 1600, the ECG processor unit 52 reads out the content for the download distribution, which is stored in a memory unit not shown in the figure (S2301), and presents the local navigation screen 1600 upon basis of that information (S2302).

Under this condition, upon receiving the operation made by the user (S2303), if a "purchase" button is selected, the ECG processor unit 52 displays the content purchase screen 1200 (S2304). On this screen, the user selects the purchase condition, and if the purchase button is selected (S2305), then the ECG processor unit 52 displays the content details display screen 1250 (S2306). The content detail display screen 1250 can be displayed through selection of the "details" button on the local navigation screen 1600.

When the "view/listen" button is selected on the local navigation screen 1600, the ECG processor unit 52 starts the AV player 53, thereby to start the download view/listen (S2308), while if the "export" button is selected, the screen is shifted into the export screen 1400 (S2309).

Even on the content details display screen, when the "view/listen" button is selected by the operation of the user (S2307), the AV player 53 is started, and thereby starting the download view/listen (S2308), while if the "export" button is selected, the screen is shifted into the export screen 1400 (S2309).

With the embodiment explained in the above, the receiver 50 obtains the content from the distribution system 60, which is connected by the network, through the ECG, which is displayed by the ECG processor unit 52, or the Web screen displayed by the browser 51, or the local navigation 1600, and thereby enabling the view/listen thereof.

However, in FIGS. 22 and 25, the explanation was made on the case where the content is viewed/listened or exported on the content search screen, which is produced by the ECG processor unit 52, or the local navigation screen; however, the present invention should not limited to this. Thus, the browser 51 may produce the content search screen and/or the local navigation screen, thereby to conduct the similar processing, or the AV player 53 may produce the content search screen and/or the local navigation screen, thereby to conduct the similar processing.

Figure 26:
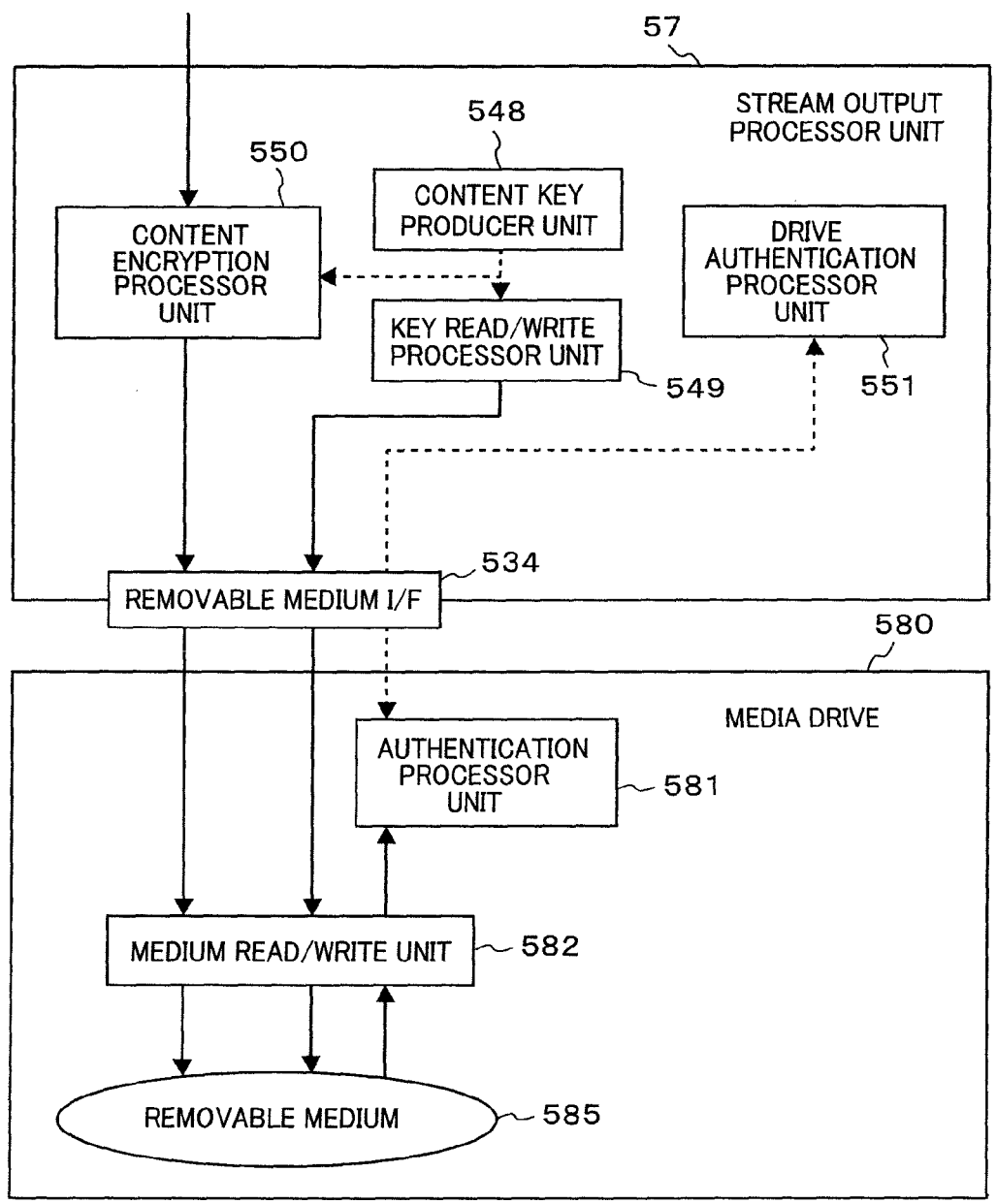
FIG. 26 shows an example of other structure of an interface unit between the receiver and the removable medium.
Figure 27:
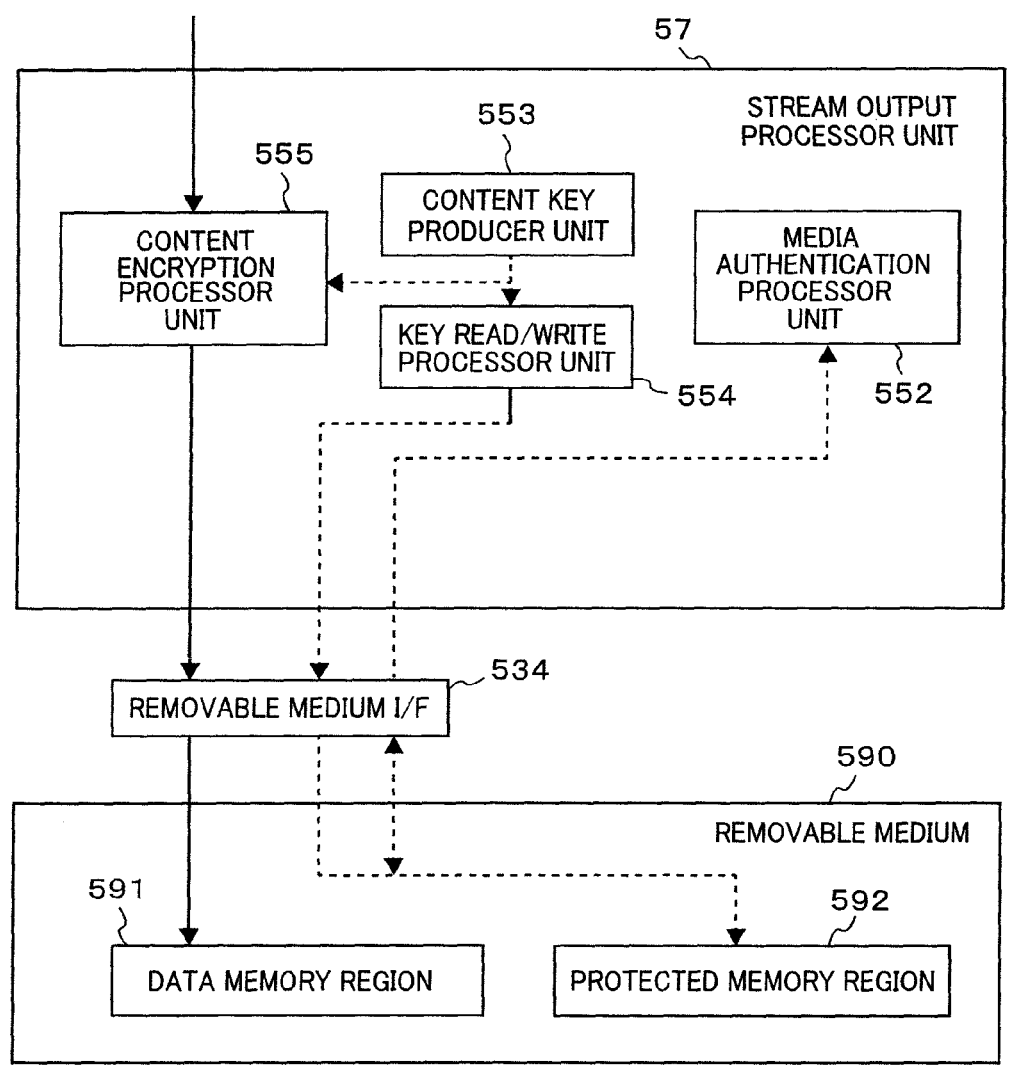
FIG. 27 shows an example of further other structure of an interface unit between the receiver and the removable medium.

Other example of the removable medium to be used by the receiver 50 is shown in FIGS. 26 and 27.

FIG. 26 shows an example of the case where the removable medium is an optical disc medium, wherein to the removable medium I/F 534 is connected a media drive 580, and into the media drive 580 is inserted a removable medium 585, and therefore it is possible to execute write-in through a medium read/write unit 582.

The stream output processor unit 57 is constructed with a drive authentication processor unit 551, a content key producer unit 548, a key within-in processor unit 549, and the content encrypting processor unit 550.

When inserting a removable medium 585 having the copyright protection function into the media drive 580, though it is possible to write the content, the copyright of which is protected, therein, but the stream output controller unit 57 of the receiver 50 executes the authentication process on if the removable medium 585 and the media drive 580 support the copyright protection or not, between an authentication processor unit 581, which the media drive 580 has therein, and the drive authentication processor unit 551.

After establishing the authentication, a key produced by the content key producer unit 548 is set to the content encrypting processor unit 550, and wherein the content is encrypted and is written into the removable medium 585, while through a key read/write processor unit 549, a media key used for encrypting the removable medium 585 and the information indicating the condition for using the content (e.g., a number of times of copying, an available period) are written therein.

However, all or part(s) of the drive authentication processor unit 551, the content key producer unit 548, the content encrypting processor unit 550 and/or the key within-in processor unit 549, which is/are described in FIG. 26, can be achieved in the form of hardware, for example, by making it/them as a processor unit(s) for executing the respective process(es) as an integrated circuit(s). And also, all or part(s) of the drive authentication processing program 551, the content key producing program 548, the content encryption processing program 550 and/or the key within-in processing program 549, which is/are stored in the storage 550 or the memorizing device(s) not shown in the figure, such as, the memory, etc., can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

Also, all or part(s) of the medium read/write unit 582 and/or the authentication processor unit 581, which is/are described in FIG. 26, can be achieved in the form of hardware, for example, by making it/them as a processor unit(s) for executing the respective process(es)) as an integrated circuit(s). And also, all or part(s) of the medium reading/writing program 582 and/or the authentication processing program 581, etc., which is/are stored in a memory region not shown in the figure, can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

FIG. 27 shows an example of case where the removable medium is a memory card, wherein at the removable medium I/F 534 is connected a direct removable medium 590.

The stream output processor unit 57 is constructed with a drive authentication processor unit 552, a content key producer unit 553, a key read/write processor unit 554 and a content encrypting processor unit 555.

The direct removable medium 590 is constructed with a common data memory region 591 and a protected memory region 592 for holding a key for encrypting data therein, wherein the drive authentication processor unit 552 determines on if the removable medium 590 supports the copyright protection or not, depending on presence/absence of the protected memory region 555, and after establishing the authentication, the key produced by the content key producer unit 553 is set to the content encrypting processor unit 555, so that the content is encrypted and written into the data memory region 591 of the removable medium 590, and thereby memorizing the information indicating the media key used and the condition for using the content (e.g., a number of times of copying, an valuable period), via the key read/write processor unit 554, to the protected memory region 529.

However, all or part(s) of the drive authentication processor unit 552, the content key producer unit 553, the content encrypting processor unit 555 and/or the key read/write processor unit 554, which is/are described in FIG. 27, can be achieved in the form of hardware, for example, by making it/them as a processor unit(s) for executing the respective process(es) as an integrated circuit(s). And also, all or part(s) of the drive authentication processing program 552, the content key producing program 553, the content encryption processing program 555 and/or the key read/write processing program 554, etc., which is/are stored in the storage 550 or the memorizing device (S) not shown in the figure, such as, the memory, etc., can be achieved in the form of software, by processing it/them within the calculation processor, such as, a central processor unit or the like, not shown in the figure.

For the purpose of brief explanation, the explanation was made on the processes, which can be achieved by various kinds of programs, respectively, mainly for each processor unit when is achieved by executing each program within the central processor unit or the like. However, if each processor unit is achieved in the form of hardware, each processor unit executes each process for that, mainly.

With such embodiment as was mentioned above, the receiver 50 is able to export the content 75 received, the copyright of which is protected, for various kinds or configurations of the removable media.

Embodiment 2

In the present embodiment, explanation will be given of an example of the distribution server for providing a VOD (Video On Demand) service through the streaming, and the receiver for receiving the service. The explanation will be made, mainly, on the receiver, in present embodiment, i.e., it is preferable to be applied in the receiver, but should not be inhibited from being applied other(s) that the receiver. Also, there is no need of adopting all of the constituent elements, but they are rather selectable.

<System>

Figure 28:
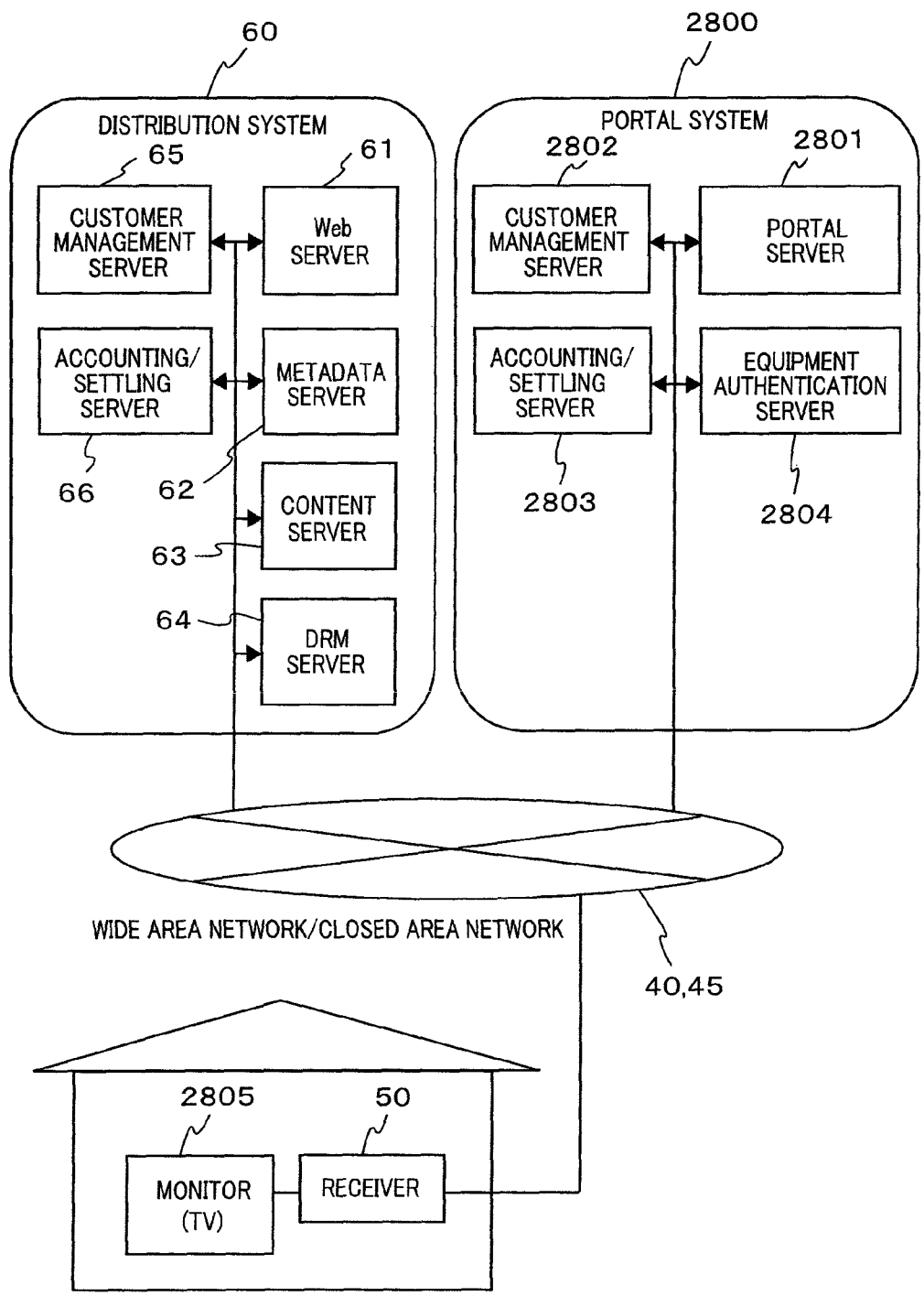
FIG. 28 shows an example of the structure of a content distribution system.

FIG. 28 shows a block diagram for showing an example of the structure of the content distribution system. That system is constructed with, the distribution system 60, a portal system 2800, the receiver 50, a monitor (e.g., a display device) 2805, and wide-area network/closed-area network (including the content distribution network 40 and the Internet network 45 shown in FIG. 1).

The structure of the distribution server 60 includes, similar to that shown in FIG. 2, the Web server 61, for distributing the data of Web format, such as, a service menu screen, a content navigation screen and/or a sub-window screen including an operation button, etc., for example, to the receiver 50, the metadata server 62 for distributing the ECG metadata 400, which described the property information of the content therein, and/or the reproduction control information 200, which described the information necessary for reproduction of the content therein, the content server 63 for distributing 2D/3D content (including the streaming distribution and/or the download distribution), the DRM server 64 for distributing the license, including the right of use of the content and the information necessary for use thereof, e.g., that of the key necessary for decrypting, the customer management server 65 for managing the customer information for the distribution service, the accounting/settling server 66 for conducting charging and/or accounting of the content by the customer, and so on.

However, each of the servers, which the distribution system 60 has, is only an expediential model, but in an actual distribution system, it may be constructed to have a server, which unifying or integrating plural numbers of servers, in the substantial or physical body thereof, or on the contrary, it is also possible to build up the substantial or physical server, by dividing that server being used for distribution of plural numbers of screens and/or data, like the Web server 61 or the metadata server 62, for example, separately into those for use of types thereof, such as, service and data.

The portal system 2800 is assumed to be used by the receiver 50 being able to receive various services, such as, content distribution or shopping via the network, a television telephone, etc., so as to use those services, as a primary connecting address (e.g., an entrance for use), so that it performs introduction/mediation to various service systems, including the distribution system 60 therein. The structure of the present system includes a portal server 2801, a customer management server 2802, an accounting/settling server 2803 and an authentication server 2804, etc.

The portal server 2801 distributes the data of Web format, such as, a service navigation screen and/or a content navigation screen, for example, to the receiver 50, when the receiver 50 starts the browser 51 for using the network service.

The customer management server 2802, similar to the customer management server 65, manages the customer information of the customers, who use the service provided by the present portal system 2800. Also, it executes authentication for a portal member in cooperation with the authentication server 2804, which will be mentioned later.

The accounting/settling server 2803, similar to the charging/accounting server 66, executes the accounting and/or settling for use of the service by the user.

The authentication server 2804 executes an equipment authentication on the receiver 50, which accesses to the present portal system 2800, and thereby confirms that it is the accessible and proper the receiver.

Herein, the present portal system 2800 may be provided by a service provider, which provides the distribution system 60, or may be operated by a service providing company of a third party or a receiver manufacturer by itself.

Also, the portal server 2801 and the Web server 61, the customer management server 2802 and the customer management server 65, and the accounting/settling server 2803 and the accounting/settling server 66 may have such structure that each has a unified server, respectively, as a substantial or physical body.

Also, the authentication server 2804 may be configured in such that it can be shared between the portal system 2800 and the distribution system 60, or may be configured in such that the distribution system 60 can obtain the information of the authentication server 2804.

<Receiver>

The receiver 50 may have the structure similar to that shown in FIG. 3, or may have such structure as the receiver 581 shown in FIG. 4, the receiver 582 shown in FIG. 5, or the receiver 583 shown in FIG. 6 has, depending on necessity thereof. The receiver 50 is connected with a monitor 2805 through the video/audio I/F 531, and displays the Web screen and/or content received by the receiver 50 on the monitor 2805. The monitor 2805 may be a television set, a personal computer, a mobile terminal, a liquid crystal projector, etc., as far as it has a means for displaying. Also, the monitor 2805 may be connected through the communication I/F 510 of the receiver 50.

Figure 29:
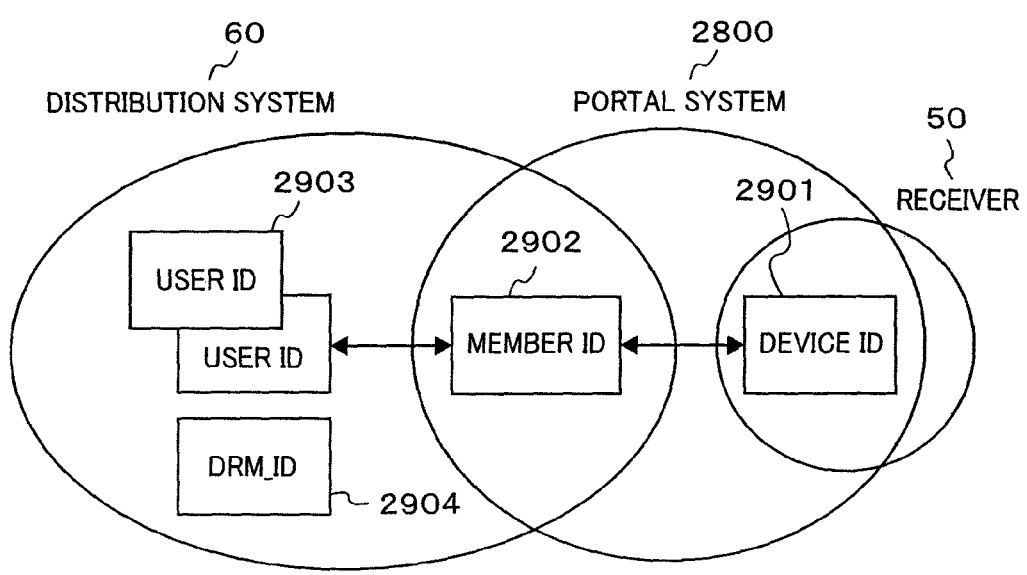
FIG. 29 shows an example of the configuration of customer information.

FIG. 29 shows an example of the configuration of the customer information, which is managed by the content distribution system and the portal system. A relationship of each kind of ID shown in the figure is an example for explaining the present embodiment, but it never restricts the use of the each kind of ID in actual services.

The portal system 2800 manages the customers with using an device ID 2901 and a member ID 2902.

The device ID 2901 is an ID inherent to the receiver 50, and is an ID, which the authentication server 2804 identifies, uniquely, through the equipment authentication. This ID may be issued by the portal system 2800, or in the place thereof may be used that, which the receiver 50 produces by combining one (1) or more number(s) of information, in accordance with a predetermined rule, such as, a model name or a serial number of the receiver 50, a MAC address, etc., for example.

In case where the portal system issues the device ID 2901, in particular, when the receiver 50 accesses to the portal system 2800 first time, terminal information, such as, a manufacturer name, the model name, the manufacturing serial number, the MAC address, etc., which are held/managed by the browser 51 of the receiver 50 in advance, is transmitted to the portal system 2800. The terminal information managed by the browser 51 is secure information, which is described when the product is shipped from a factory, and may be made in such a manner to be protected from being changed by the user. The portal system 2800 requests the authentication server 2804 to register that information relating to the receiver 50 therein.

Responding to that, the authentication server 2804 determines if there is the receiver indicated by that information or not, within an equipment list (e.g., the manufacturer name, the model name, yes/no of loading the streaming and/or download, etc.), which is held in advance therein, and if there is not, it replies a failure of registration back to the portal system 2800. Or, if there is, it produces the device ID 2901, which can be identified uniquely, and registers that information and that device ID 2901, and further replies a success of registration together with that device ID 2901 back to the portal system 2800. The portal system 2800 transmits the details of that reply to the receiver 50. The receiver 50, only when the registration is succeeded, records the device ID 2901 received within the storage 550, thereby to user the equipment authentication thereafter.

On the other hand, in case where the receiver 50 issues the device ID 2901, in particular, when accessing the portal system 2800 first time, it produces the device ID 2901 from the information held by the browser 51, such as, the manufacturer name, the model name, the manufacturing serial number, the MAC address, etc., in accordance with a predetermined rule, and transmits the device ID 2901 and those information to the portal system 2800.

The portal system 2800 requests the authentication server 2804 to register the details received therein.

Responding to that, the authentication server 2804 determines if there is the receiver indicated by that information is or not, within the equipment list mentioned above, holding them in advance, and if there is not, it replies the failure of registration back to the portal system 2800. Or if there is, it registers the details received therein, and replies the success of registration (the device ID 2901 may be included therein) back to the portal system 2800.

The portal system 2800 transmits the details of that replay to the portal system 2800. The receiver 50, only when the registration is succeeded, records the device ID 2901 received within the storage 550.

The member ID 2901 is an ID for identifying a member who uses various kinds of services, which are provided by the portal system 2800, and is also an ID, which is issued by the customer management server 2802 of the portal system 2800. It is assumed that the device ID 2901 and the member ID 2902 are related with 1 to n ("n" is 1 or more than that).

The distribution system 60 manages the customer with using the member ID 2902, the user ID 2903, a DRM_ID 2904. As the member ID 2902 is used the ID, which is issued by the portal system 2800. The user ID 2903 is an ID, which is issued, independently, by the distribution system 60 to members, such as, a main user ID or a sub user ID, etc. The DRM_ID is an ID for identifying the DRM client of the receiver 50, and it is used when reproducing the content, which is distributed by the distribution system 60, on the receiver 50.

Next, explanation will be made on steps or processes during from when the user makes an access from the receiver 50 to the portal system 2800 up to when she/he enjoys the content distribution service, which the distribution system 60 provides. However, when transmitting/receiving the information necessary the protection thereof, such as, customer information or the license 300 of content, etc., at least, on the network, such as, the wide-area network/closed-area network, etc., it is assumed that security of the communication network is kept with using the existing technologies, such as, SSL (Secure Socket Layer) and TLS (Transport Layer Security), etc.

<Steps to Access to Distribution System>

Figure 30:
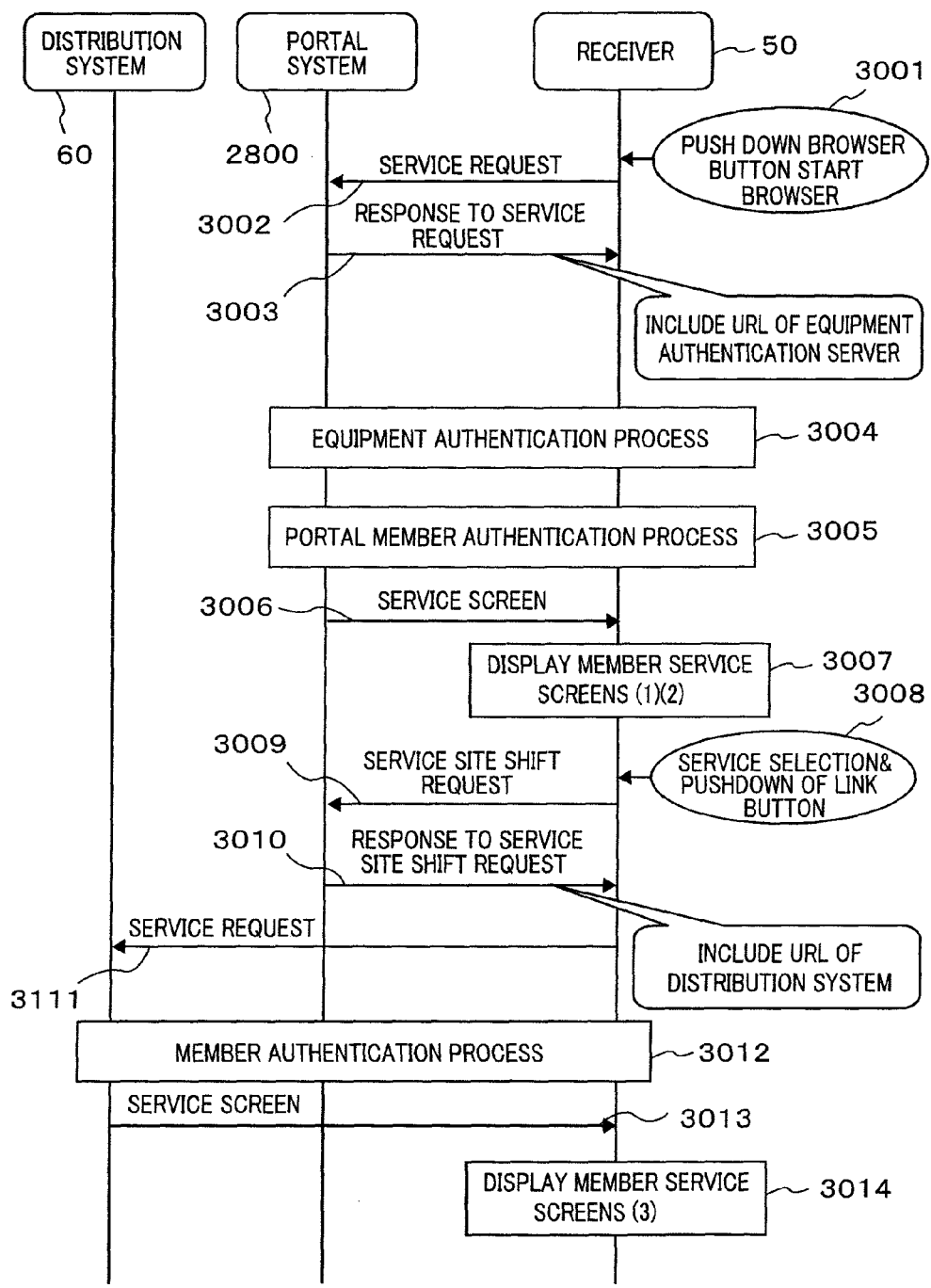
FIG. 30 shows an example of a flowchart for processing an access to a portal system and the content distribution system.

FIG. 30 shows steps from the time when access is made from the receiver 50 to the portal server 2800 up to the time when access is made to a site of the distribution system 60.

The user, in order to use the various services, which are provided by the portal system 2800 or the distribution system 60, starts the Web browser with using a "browser button" on the remote controller of the receiver 50 or an operating button on the main body thereof, etc. (S3001: "S" indicates a step).

Responding to this instruction, the receiver 50 starts up the browser 51, and issues a service request to the portal server 2801 of the portal system 2800, i.e., the primary connecting address, which is registered in advance. In this instance, the browser 51 may transmits the service request, with attaching affiliated information therewith, such as, Cookie relating to the portal system 2800, which is held by the accesses (to the portal system 2800) up to the last time, etc.

Responding to the service request, the portal server 2801 of the portal system 2800 transmits, as well as, a reply to that request, the information for shifting to a site (page) for executing the equipment authentication (i.e., URL or script) to the receiver 50 (S3003).

The browser 51 of the receiver 50 accesses to the site for executing the authentication process on the equipment received, i.e., the authentication server 2804 of the portal system 2800, and thereby executing the predetermined equipment authentication processes between both of them. Herein, the device ID 2901 mentioned above is included in an equipment authentication request, which the receiver 50 issues to the authentication server 2804; however, there may be also included the information relating to other receiver(s) 50 (e.g., a name for identifying a manufacturer or a model, version information, etc.)

Thereafter, the authentication server 2804 transmits a result of the equipment authentication process and also a redirect request to the portal server 2801, to be accessed next. In this instance, the authentication server 2804 may set up the Cookie, including the result of the equipment authentication and/or the device ID 2901, the date/time when executing the equipment authentication, an accessing condition, etc., to the receiver 50 (S3004).

The receiver 50 succeeding the equipment authentication process 3004 accesses to the portal server 2801, depending on the redirect request received from the authentication server 2804. In that instance, the result of equipment authentication and/or the details of Cookie, which is/are obtained from the authentication server 2804, are informed to the portal server 2801.

The portal server 2801 issues a portal member authentication request to the customer management server 2802, accompanying the result of the equipment authentication therewith. The customer management server 2802 confirms the details of the result of the equipment authentication, thereby determining on if the receiver 50 is the portal member or not, in accordance with predetermined processes, and it inform that result thereof to the portal server 2801.

Herein, the portal server 2801 may issue the portal member authentication request to the customer server 2802, including the device ID 2901 in addition to the result of the equipment authentication, and the customer server 2802 may determines on if the member ID 2902 is registered or not, with using the device ID 2901 (S3005).

If determining the receiver 50 to be the portal member from the result of the decision received from the customer server 2801 (i.e., if the member ID can be obtained), the portal server 2801 produces a member page corresponding to that member ID, and transmits it to the receiver 50.

FIG. 34 shows an example of a top screen that the portal system produces. A screen 3400 is an example of a navigation screen of the network service, which is displayed at first when the user starts the browser 51 so as to use the network service on the receiver 50 and it has sorts of network services 3401 (for example, a VOD service, a net-shopping service, a maintenance service, etc.), which the portal system 2800 can provide or mediate. On the member page, which the portal server 2801 produces, there are included data necessary for displaying the screen 3400 with using the existing Web cord, such as, HTML (Hyper Text Markup Language) or Java (registered trademark), Script, etc.

For example, there are described the substance of the process(es) to be executed, when the user selects a desired service, and URL (Uniform Resource Locator) for use in shifting the screen. However, in the embodiments, which will be described hereinafter, including the present embodiment, it is assumed that the screen and/or information, which is/are produced by the distribution system 60 and provided to the receiver 50, are described by the existing Web code mentioned above (S3006).

The browser 51 of the receiver 50 receiving the member page displays the screen 3400 on an external or built-in monitor 2805. Among those, if the user selects "net service A" (for example, VOD service), for example, a screen 3402 for selecting a link address, which provides the service described on the member page is displayed (S3007).

On the screen 3402 displayed, if the user selects the link address to the distribution system 60, which she/he wishes to use (S3008), the browser 51 of the receiver 50 issues a request for shifting to the link address selected, towards the portal server 2801 (3009).

The portal server 2801 receiving the shift request transmits the information (e.g., the script including the URL and/or the member ID 2902, etc.) necessary for shifting to the link address selected, toward the receiver 50 (S3010).

The browser 51 of the receiver 50, receiving the information for shifting to the link address selected, transmits an access request to a predetermined URL (i.e., the Web server 61 of the distribution system 60), by using the member ID 2902 received as an argument, upon basis of the information (S3011).

The Web server 61 of the distribution system 60, receiving the access request, requests the member authentication process to the customer management server 65, with using the member ID 2902 received. The customer management server 65 determines if the receiver 50 is the member or not, in accordance with a predetermined authentication procedure, upon basis of the member ID 2902, and informs a result thereof to the Web server 61 (S3012).

Herein, in the result of the member authentication may be added information relating to that member (e.g., name and/or information of user's preference, etc.), together with presence/absence of registration of the member ID 2902 in the customer management server 65, when succeeding in the member authentication.

The Web server 61 receiving the result of the member authentication produces a member page upon basis of the information included in that result, and transmits it to the receiver 50.

Figure 35:
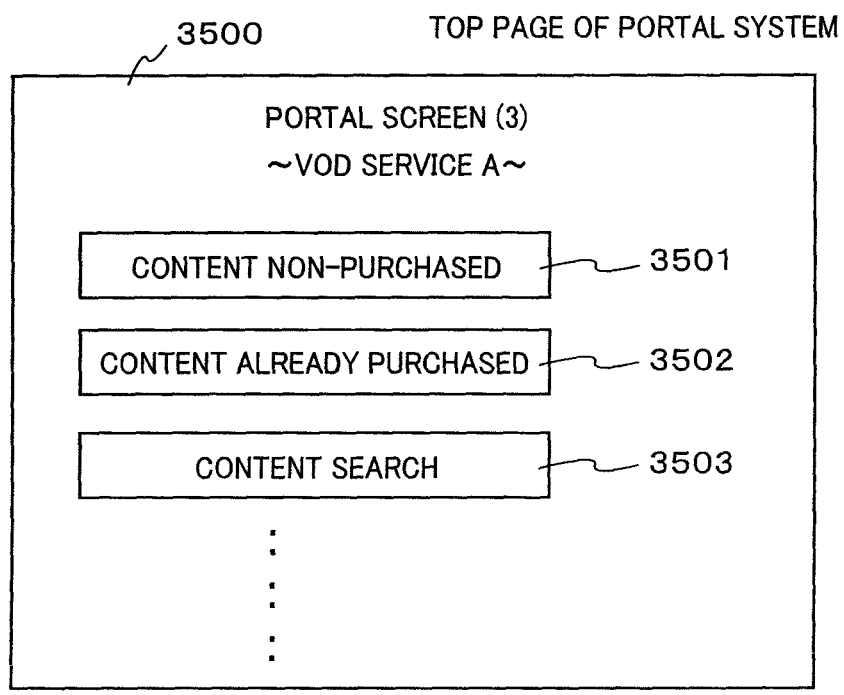
FIG. 35 shows an example of other top screen.

FIG. 35 shows an example of a top screen that the content distribution system produces. A screen 3500 is an example of menu screen for the VOD service, which is provided by the distribution system 60, and it is made up with a "non-purchased content" 3501 for displaying a list of the content(s), which is/are not purchased yet and purchasable by the receiver 50, a "purchased content" 3502 for display a list of the content(s), which is/are already purchased, and a "content search" 3503 for looking up an arbitrary content. On that member page, there are included data for displaying the screen 3500 and script for dealing with that data, URL to be shifted into when the user selects anyone of 3501 to 3503 on that screen, and so on (S3013).

The browser 51 of the receiver 50 receiving the member page displays the screen 3500 on the external or built-in monitor 2805 (S3014).

With the steps mentioned above, for the user it is possible to access to the site of the distribution system 60 from the browser 51 of the receiver 50.

<Steps to Purchase Content>

Figure 31:
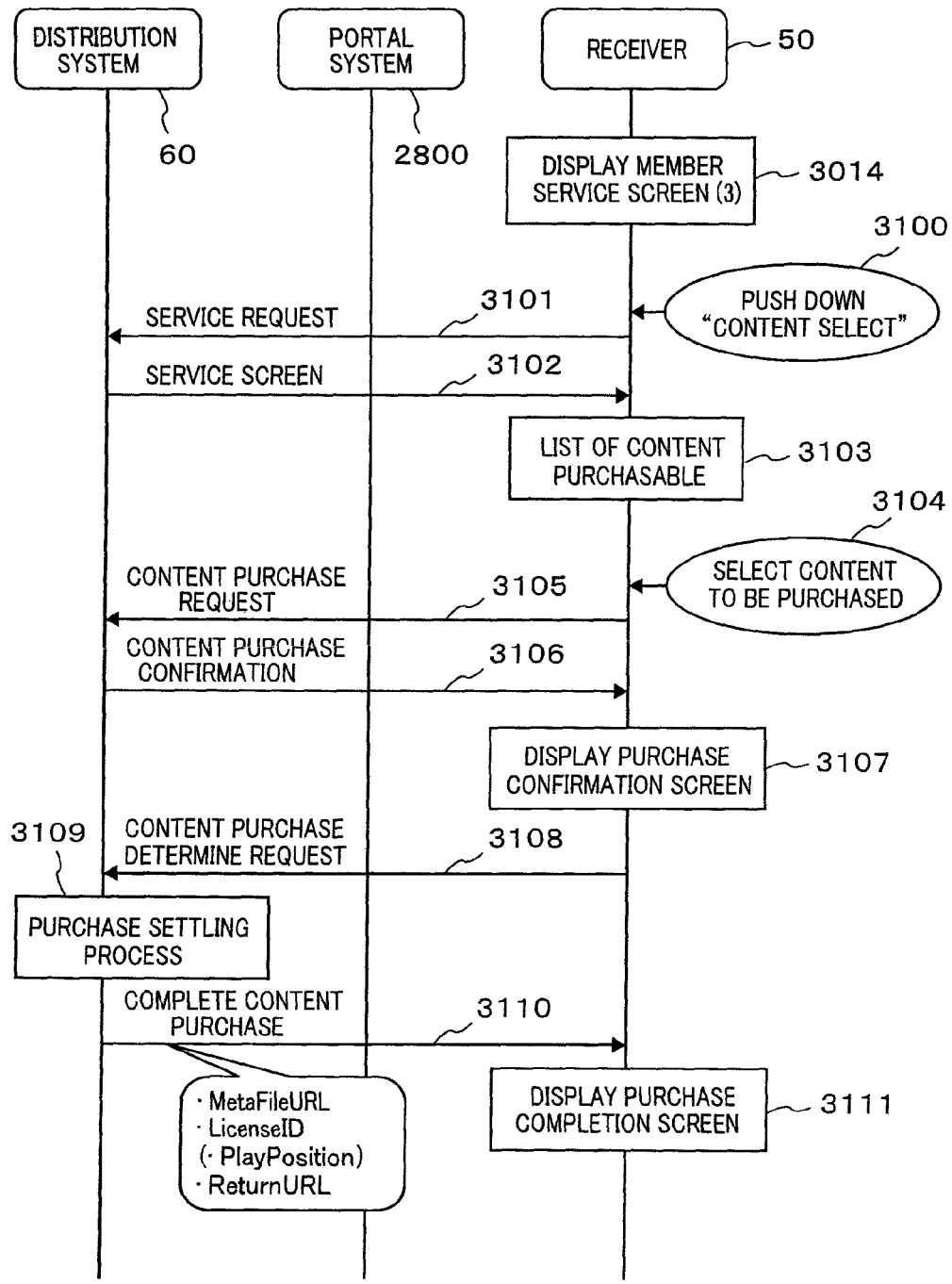
FIG. 31 shows an example of a flowchart for processing a purchase of content.

FIG. 31 shows an example of a processing flowchart where the receiver purchases content from the distribution system.

When the user selects the "non-purchased content" 3501 on the screen 3500, which is displayed on the monitor 2805 through the browser 51 of the receiver 50 (S3100), the browser 51 issues a request for obtaining service necessary for displaying a screen of the list of content(s), which the receiver 50 has not purchased yet and can purchase, to the Web server 61 of the distribution system 60 (S3101).

Responding to this, the Web server 61 of the distribution system 60 executes the equipment determination on the receiver 50, upon basis of the member ID 2902 of the receiver, and obtains the information of the content(s), which the receiver 50 has not purchased yet and can purchase, so as to produce a list screen of the content(s) not yet purchased, and thereby transmits it.

A screen shown in FIG. 36 is an example of the screen of non-purchased content list, which is produced by the distribution system 60. The screen 3600 is made up with the information (e.g., a content name, a time limit purchasable, a purchase price) 3601, relating to the content, which the receiver 50 can purchase, a button 3602 for displaying the detailed information relating to that content, and a button 3603 for indicating the purchase.

In the screen of the content list are included data for displaying the screen 3600 and script for dealing with that data, URL to be shifted into when the user selects the details button 3602 or the purchase button 3603 at her/his desire on the screen, and so on (S3102).

Herein, as the equipment determination of the receiver 50, there is a method, in which the Web server 61 obtains the information relating to the receiver 50 with using the member ID 2902, for the portal system 2800, or a method of sharing the authentication server 2804 between the customer management server 65 of the distribution system 60 and the customer management server 2802 of the portal system 2800, or a method of obtaining the information relating to the receiver 50 in the step 3011/3012 or in the step 3101 shown in FIG. 30.

The browser 51 of the receiver 50 receiving the content information displays the screen 3600 on the external or built-in monitor 2805 (S3103).

The user selects content 3601, which she/he wishes to purchase, on the screen 3600 displayed, and pushes down the purchase button 3603 (S3104).

Responding to this, the browser 51 of the receiver 50 issues a purchase request of the content, which the user instructs to the Web server 61 of the distribution system 60 with using the URL included in the content list screen (S3105).

The Web server 61 receiving the purchase request transmits a purchase confirmation screen for processing the purchasing process towards the receiver 50 (S3106).

The browser 51 of the receiver 50 receiving the purchase confirmation screen displays that screen on the monitor 2805.

The user confirms a purchasing rule and/or a purchasing process, which is/are displayed on that screen, and after inputting a user name/password depending on the necessity thereof, she/he pushes down a purchase confirmation button. Responding to this, the browser 51 issues a purchase decision request (this may includes the inputted user name and/or the password, therein), towards the Web server 61 (S3108).

The Web server 61 of the distribution system 60 receiving the purchase decision request executes a purchasing process and an accounting process between the customer management server 65 and the accounting/settling server 66.

The customer management server 65, after completing the purchasing/accounting processes, informs the Web server 61 of the completion of purchasing. The Web server 61 receiving the purchase completion information produces a license (e.g., contract date/time and a license ID, etc.) for the content that is purchased, between the customer management server 65, and correlates that license and the member ID 2902, and the DRM_ID 2904 (S3109).

After completing all of the purchasing processes, the Web server 61 produces a purchase completion screen and transmits it to the receiver 50. The screen 3604 shown in FIG. 36 is shown an example of that purchase completion screen. The screen 3604 is made up with information 3605 of the content, on which the purchasing is completed, a button 3606 for use of viewing/listening that content, and a button 3607 for turning back to the screen 3600 or the screen 3500.

A Web code of that screen may includes, in addition to the data for displaying the screen 3604 and the script for dealing with that data, a dealing address of the reproduction control metafile 200 of the content purchased (e.g., URL of the metadata server 62 or MetaFile URL), the license ID (LicenseID) and/or an accessing address after completion of viewing/listening (ReturnURL), etc.

The browser 51 of the receiver 50 receiving the purchase completion screen displays the screen 3604 on the monitor 2805 (S3111). Herein, if the user selects the view/listen button 3606 on the screen 3604, the browser 51 starts the viewing/listening with using the information, such as, MetaFileURL and/or PlayPosition, etc., which is/are included in the screen 3604, in accordance with the procedure of S3209-S3214, which will be explained hereinafter.

<Procedure to Start Content View/Listen>

Figure 32:
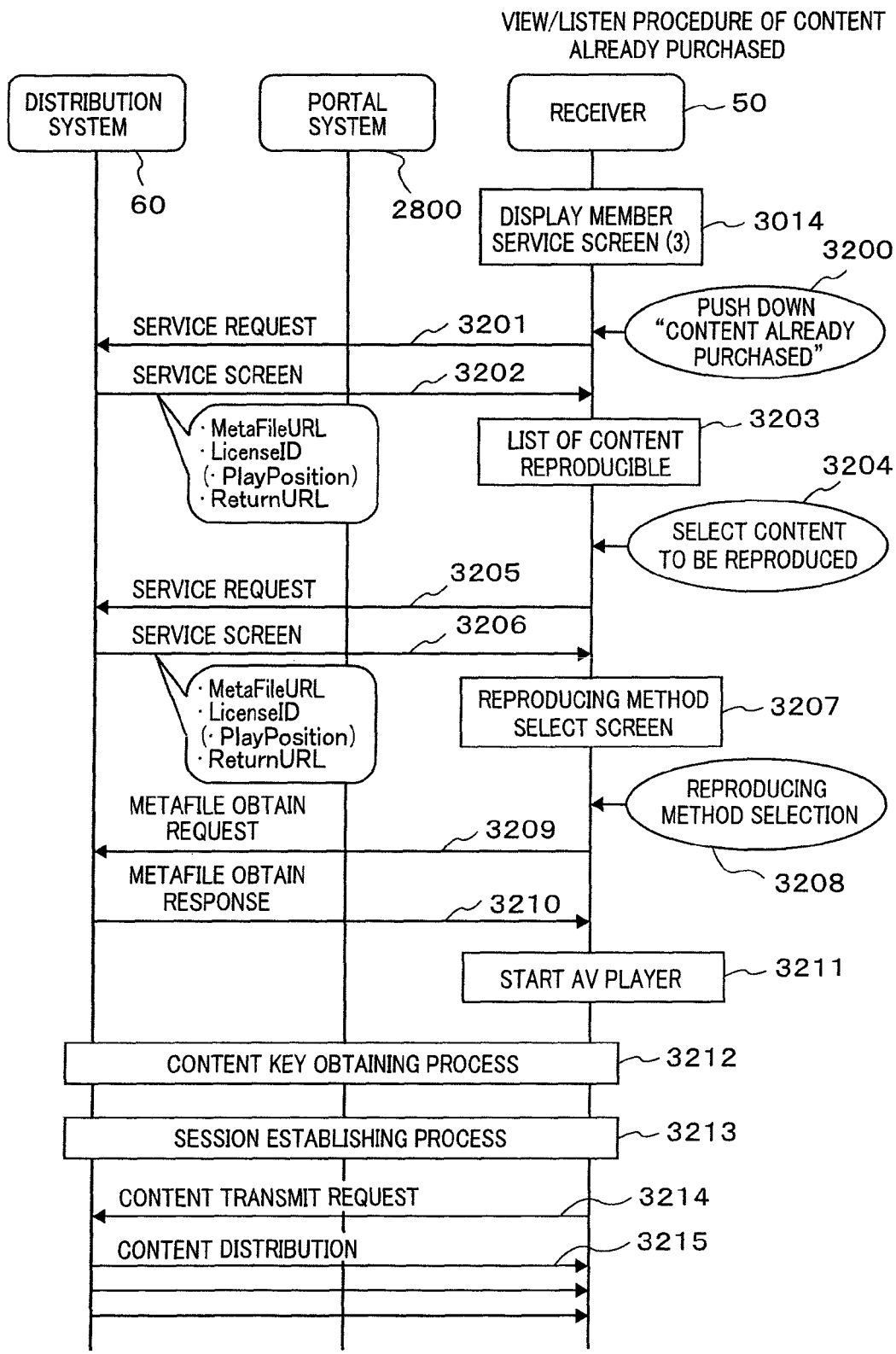
FIG. 32 shows an example of a flowchart for processing to view/listen the content already purchased.

FIG. 32 shows an example of a process flowchart for viewing/listening the content, which the receiver 50 already purchased from the content distribution system.

If the user selects "content already purchased" 3502 on the screen 3500, which the browser 51 of the receiver 50 displays on the monitor 2805 (S3200), the browser 51 issues the request to obtain the service necessary for displaying a list screen of the content(s), which the receiver 50 has already purchased, to the Web server 61 of the distribution system 60, with using the URL included in the Web code of the screen 3500 (S3201).

Responding to this, the Web server 61 of the distribution system 60 obtains the content(s), which the receiver 50 has already purchased, and the license(s) thereof, from the customer management server 65, upon basis the member ID 2902 of the receiver 50. And it produces a page of the list of content(s), which is/are already purchased, to transmit it to the receiver 50.

Figure 37:
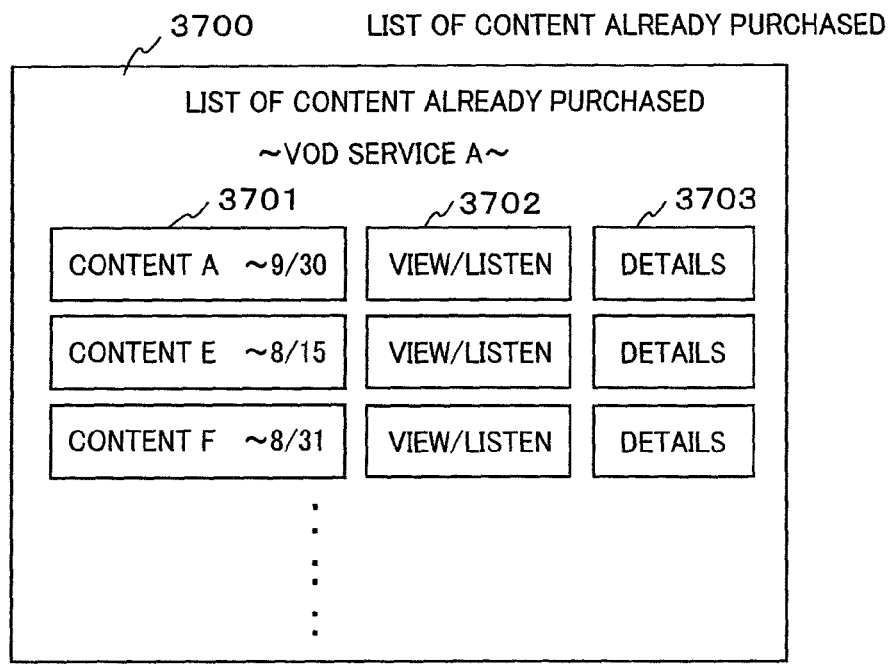
FIG. 37 shows an example of a list screen of the content already purchased.

FIG. 37 shows an example of a list screen of the content(s) already purchased, which is produces by the content distribution system. A screen 3700 is made up with the information (e.g., a content name, a viewable/listenable period, etc.) 3701 relating to the content(s), which is/are already purchased by the receiver 50, as well as, a button 3702 for displaying the detailed information relating to that content(s), and a button 3703 for instructing the viewing/listening. In a page of the list of the content(s), which is/are already purchased, in addition to the data for displaying the screen 3700 and the script for dealing with that data, there may be included, MetaFileURL, LicenseID, a reproduce position (PlayPosition), ReturnURL, therein. However, the reproducing position (PlayPosition) may be included only in the content, to which the user (or the receiver 50) has interrupted the view/listen, once, in a previous time (S3202).

The browser 51 of the receiver 50 receiving the page of the list of content(s) already purchased displays the screen 3700 on the external or built-in monitor 2805 (S3203).

When the user selects the content 3701 to be viewed/listened and pushes down the view/listen button 3703 on the screen 3700 (S3204), the browser 51 determines if that content is halfway viewed/listened or not, previously, with using the PlayPosition of the content selected, which is obtained in S3202, in accordance with the procedure described on the page of the list of the content(s), which is/are already purchased, such as, HTML or JavaScript, etc. And, it selects the URL described depending on a result of that determination, and issues the request to obtain service(s) to the Web server 61 indicated by that URL.

For example, if it is determined that the content is not viewed/listened yet, or all of the content was already viewed/listened (i.e., no PlayPosition is included, or the playPosition indicates the top of the content), the procedure is shifted to a process for starting the view/listen (i.e., S3209 hereinafter). On the other hand, if it is determined that the content was already viewed/listened halfway, the browser 51 transmits the service obtaining request to the Web server 61 with using the URL bound to the result of that determination (S3205).

The Web server 61 receiving the service obtaining request confirms the PlayPosition of the content within the receiver 50, and produces a page for selecting the method for viewing/listening, thereby to transmit it the receiver 50.

Figure 38:
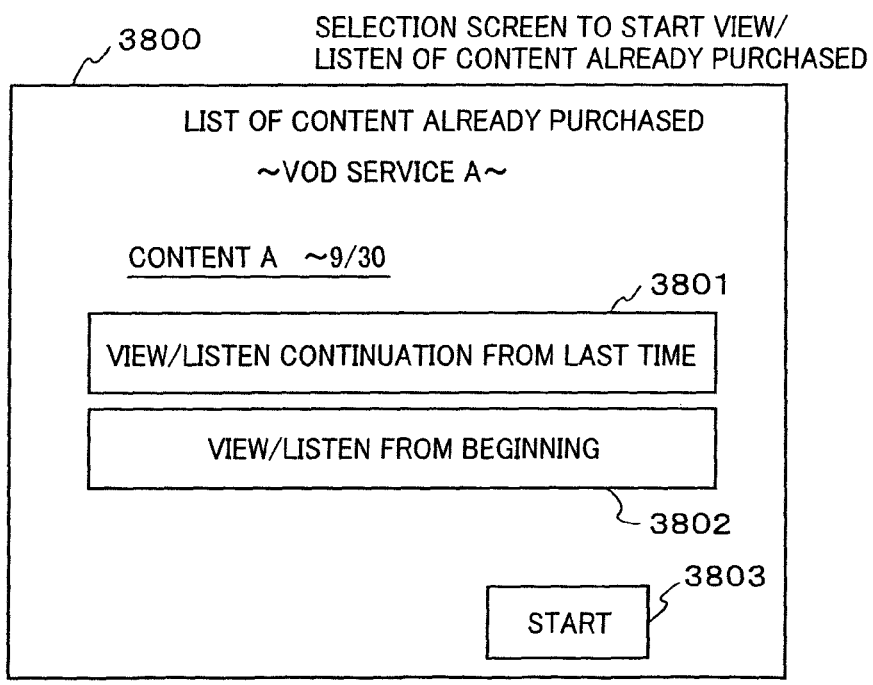
FIG. 38 shows an example of a selecting screen for starting view/listen of the content.

FIG. 38 shows an example of a screen for selection to start the view/listen of the content, which is produced by the content distribution system. A screen 3800 is made up with a method for reproducing the content 3701 to be viewed/listened, which the user selects, for example, "a method to view/listen continuation following from that when viewing/listening previously" 3801, "a method to view/listen the content from a top" 380, and a start button 3803 for instructing the start of viewing/listening. The page for selecting the method for viewing/listening includes the information, such as, MetaFileURL, LicenseID, PlayPosition, ReturnURL, etc., which are described in S3202, in addition to the data for displaying the screen 3800 and the script for dealing with that data (S3206).

The browser 51 of the receiver 50 receiving the page for selecting the method for viewing/listening displays the screen 3800 on the external or built-in monitor 2805 (S3207).

The user selects either one on the displayed screen 3800 (in the present embodiment, the "method to view/listen the content from a top" 3802), and pushes down a start button 3803 (S3208).

When an instruction is made by the user on a predetermined to start the view/listen on a predetermined content, the browser 51 records therein the MetaFileURL, LicenseID, PlayPosition, ReturnURL, etc., relating to the content selected, temporally. And, it transmits a request for obtaining the reproduction control metafile to the metafile server 62 of the distribution system 60 to become the MetaFileURL (S3209).

The metadata server 62 of the distribution system 60 receiving the reproduction control metafile obtaining request returns such a predetermined reproduction control metafile 200, as shown in FIG. 10, to the receiver 50 (S3210).

The browser 51 of the receiver 50 receiving the reproduction control metafile 200 records therein the substance of the reproduction control metafile 200, temporally, together with the MetaFileURL, LicenseID, PlayPosition, ReturnURL, etc., relating to each content, and starts the AV player 53, so as to inform all or part(s) of the substances of the reproduction control metafile 200 obtained, to that AV player (S3211). Herein, after the AV player starts, the browser 51 comes into the condition of being ended or residing as it is.

The AV player 53 transmits a key request (including the license ID and/or the DRM_ID 2904 within LLI 220) to the distribution system 60, in accordance with the license obtaining information (LLI) 220 of the reproduction control metafile 200.

The DRM server 64 receiving the key request confirms if the receiver 50 is able to view/listen the content or not, between the customer management server 65 with using the license ID 224 and the DRM_ID 2904. As a result, only the time when being determined to enable the view/listen, the DRM server 64 transmits the content key necessary for viewing/listening the content, to the receiver 50 (S3212).

The receiver 50 receiving the content key establishes a session (for the purpose of content distribution) between the content server 63, in accordance with the content characteristic property information (ERI) 210 of the reproduction control metafile 200 (S3213). Herein, the session means a logical connection necessary for executing HTTP/TCP or RTP/UDP streaming.

When succeeding to establish the session, the AV player 53 of the receiver 50 transmits a transmission request of the content (corresponds to "PLAY") on that session with using the URL indicating an address for obtaining the content selected, which is included in content title/reference address/file name 211 of the reproduction control metafile 200 (S3214).

The content server 63 of the distribution system 60 receiving the content transmission request transmits the content while encrypting it with using the content key to the receiver 50. The receiver 50 receiving the content encrypted decrypts the content with using content key within the decryptor 514, and after decrypting in the AV player 53, displays it on the external or built-in monitor 2805 through the video/audio I/F 531 (S3215).

With such steps as mentioned above, it is possible for the user to view/listen the content, which was already purchased, on the receiver 50.

<Procedure to End Content View/Listen>

Figure 33:
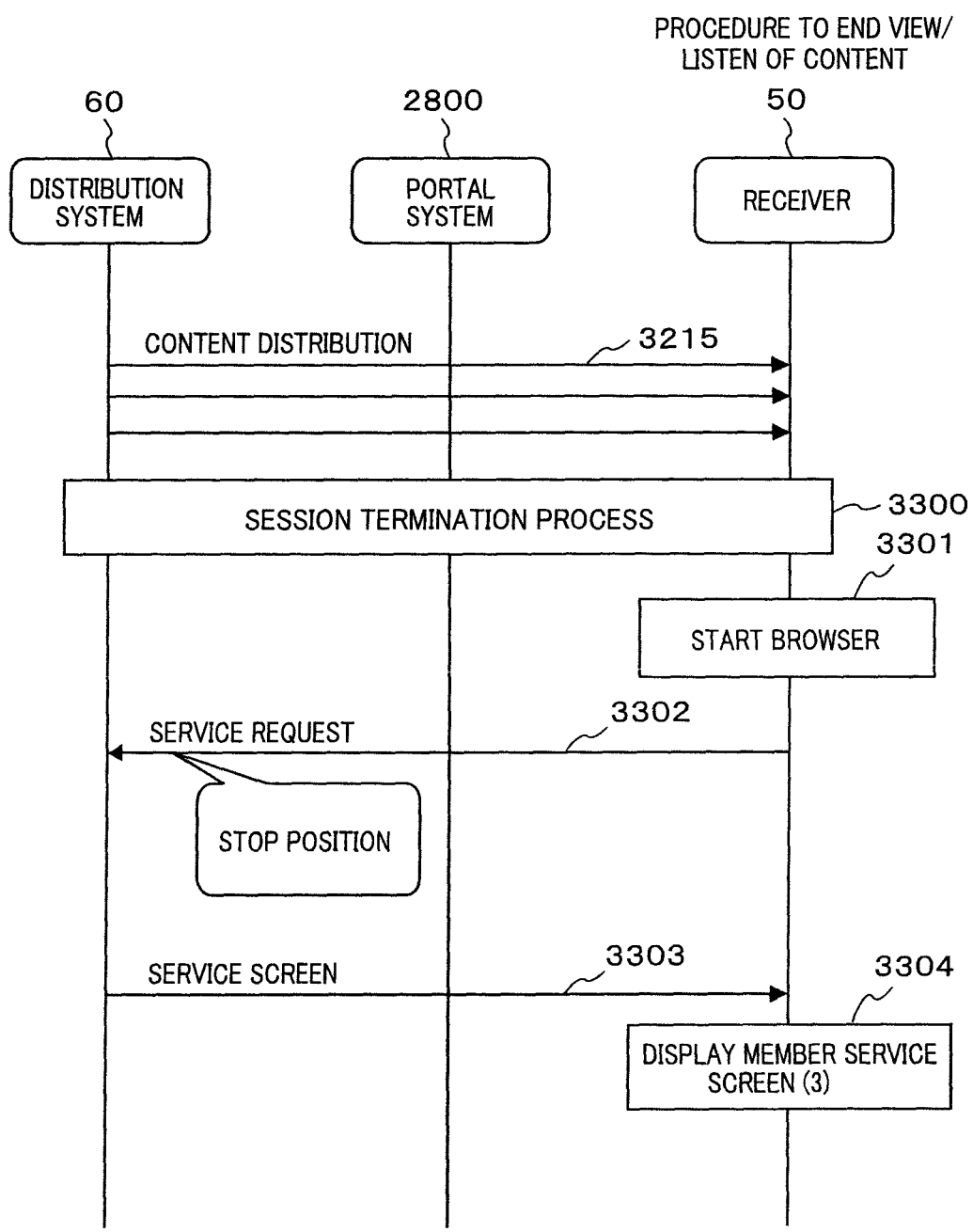
FIG. 33 shows an example of a flowchart for processing to end the content in the process of viewing/listening thereof.

FIG. 33 shows an example of a process flowchart for finishing or ending the content in the process of viewing/listening thereof.

When the content server 63 completes the content up to the end thereof, a termination process of the session is executed between the content server 63 and the AV player 53 of the receiver 50 (S3300).

When the termination is completed, the AV player 53 of the receiver 50, after staring up the browser 51 again, delivers a stop position to the browser 51, and ends (S3301).

The browser 51 accesses to the site of the Web server 61 of the distribution system 60, which is indicted by Return URL, attaching a condition of ending the AV player and the stop position therewith (S3302).

Responding to this, the Web server 61 produces a screen to display (for example, a screen 3500), and returns it to the receiver 50 (S3303). Herein, the Web server 61 may hold the end condition of the AV player and the stop position therein, so as to use the stop position as the Play Position when the view/listen is requested next time.

The browser 51 of the receiver 50 receiving the screen produced displays that screen 3500 on the external or built-in monitor 2805 (S3304).

In the procedure mentioned above, the explanation was given on the case where the content is viewed/listened up to the end thereof; however, the similar procedure can be applied even when the user interrupts the view/listen.

With the embodiment mentioned above, for the receiver 50, it is possible to purchase of view/listen the VOD services easily, which are provided by various service providers, and the portal system 2800 and the distribution system 600 can provide delicate or fine services, independently, by managing the device ID 2901 and the member ID 2902 of the receiver 50 with referring or associating to each other.

Embodiment 3

In the present embodiment, explanation will be given on a distribution system enabling to provide both contents, i.e., the existing 2D content and 3D content, and also a receiver for receiving the contents. In the present embodiment, the explanation will be given on the receiver, mainly, therefore being suitable to be implemented into the receiver; however, it should not be prevented from being applied into others than the receiver. Also, it is not always necessary to adopt all of the constituent elements of the embodiment, but they can be selected, appropriately.

In the system configuration, which will be explained in the present embodiment, there are applied the same configuration to that shown in FIG. 28, which was explained in the embodiment 2. Also, as the ID system for the customer information, which is managed by the portal system 2800 and the distribution system 60, is applied the same one shown in FIG. 29.

Herein, it is assumed that the metadata server 62 of the distribution system 60 includes the information for distinguishing that each content to be 2D content, or all thereof are 3D content, or 3D content is included partially, into all or any one of the data within the ECG metadata 410, for example the series metadata 410 or the content metadata 430, or the information within the reproduction control metafile 200, for example the video signal property information 214 of the content characteristic property information (ERI) 210.

And, it is also assumed that the information for determining if the content is the 3D content or not is included in the content, which is distributed by the content server 63 of the distribution system 60 as a compressed video/audio signal in the MPEG (moving Picture Experts Group) format or the H.264 format, etc. For example, there is a method of setting a 2D/3D distinction signal into user data of the picture layer of MPEG-2 Video, or a method of setting the 2D/3D distinction signal into a region, which is defined in advance in accordance with the format of the H.264.

Or, it is also possible to bring the authentication server 2804 of the portal system 2800 to be able to determine if that receiver has a function for dealing with the 3D content or not, if referring to the equipment list, also including if it mounts the 3D function or not therein, in addition to the manufacturer name and/or the model name mentioned above and if loading the streaming and/or the download or not, within the equipment list held therein. Or, it may hold a list describing the equipment(s), which can deal with the 3D content, therein, separated from the equipment list mentioned above.

Figure 45:
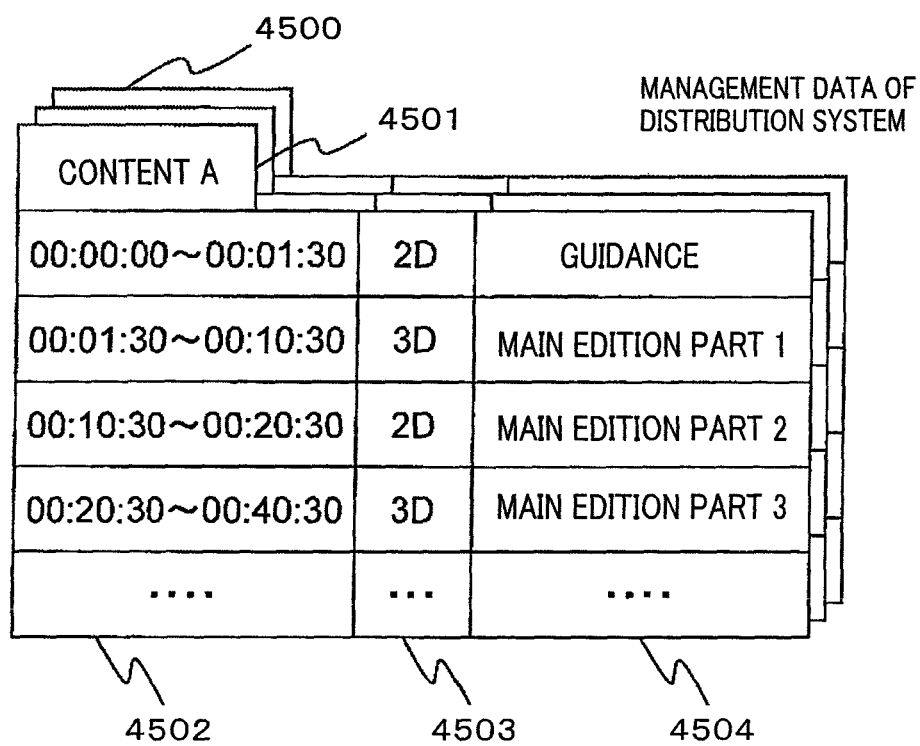
FIG. 45 shows an example of the configuration of position information data to be held/managed for the 3D content by the distribution system.
Figure 46:
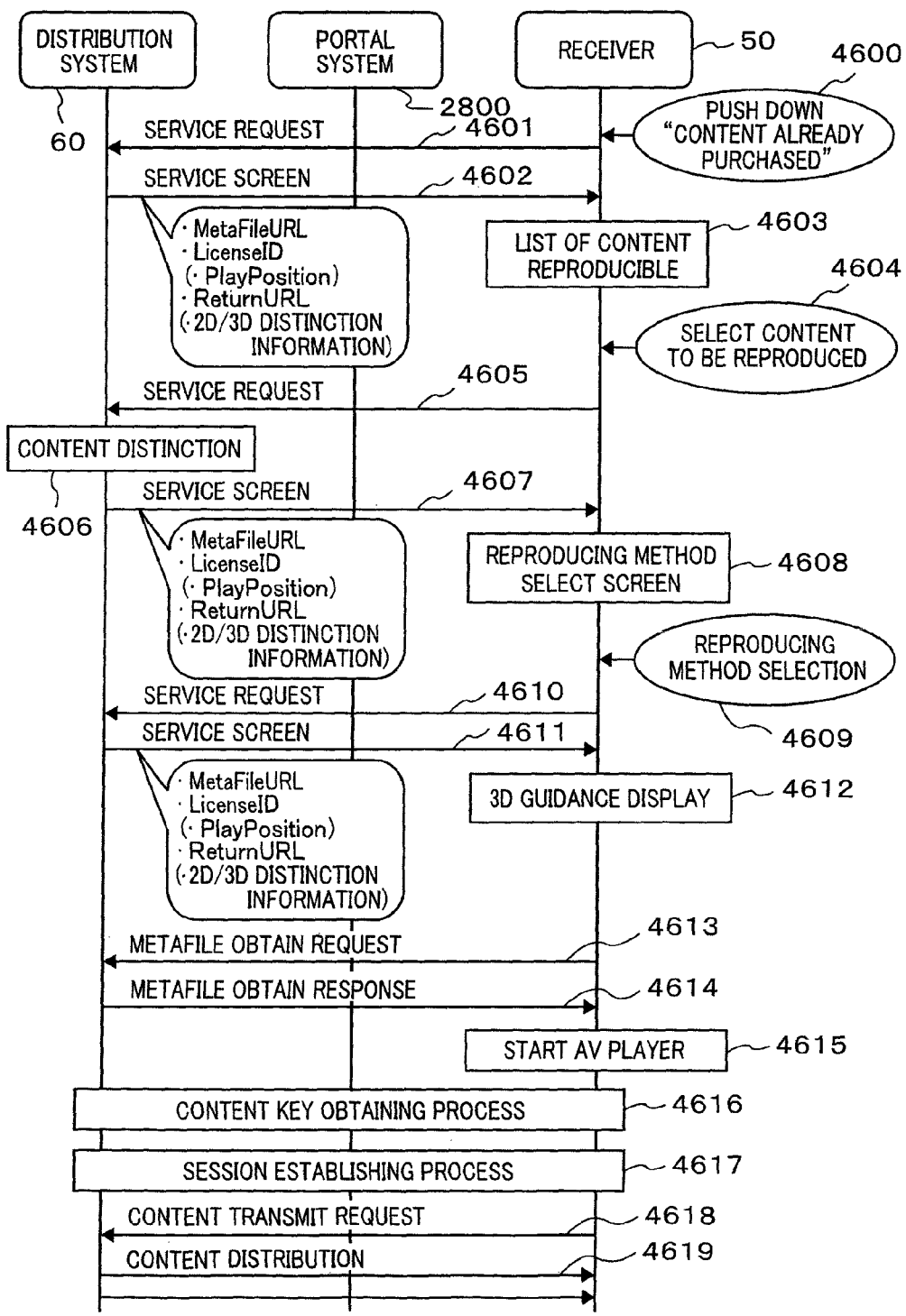
FIG. 46 shows an example of a flowchart for processing to view/listen the content already purchased.

Also, by referring to FIG. 45, explanation will be made on position information data 4500, on which the content server 63 of the distribution system 60 dealing with both 2D/3D. The position information data 4500 is configured with a 3D content name 4501, position information 4502, 2D/3D classification 4503, and additional information 4504.

The 3D content name 4501 is a name of the 3D content or the like, and it may be the information (for example, an ID of the product or content), which can identify the content, other than the name.

The position information 4502 is the information for indicating a position within the 3D content, which is indicted by the 3D content name 4501, and is presented by a unit of, such as, absolute time, relative time, bytes (Byte), frame number, etc.

The 2D/3D classification 4503 is the information for indicating if the position indicated by the position information 4502 is the 2D content or the 3D content. This may be a text or an identification number.

In the additional information 4504 may be described the details e.g., a guidance, a main edition, CM, etc.) of the position indicated by the position information.

The position information 4500 sets up the position information 4502 every time when the 2D content and the 3D content exchange therebetween, but in the place thereof, the position information 4500 may be set up by a unit of GOP or chapter of the content.

<Procedure to Access Distribution System 3D Content Enabled>

Figure 39:
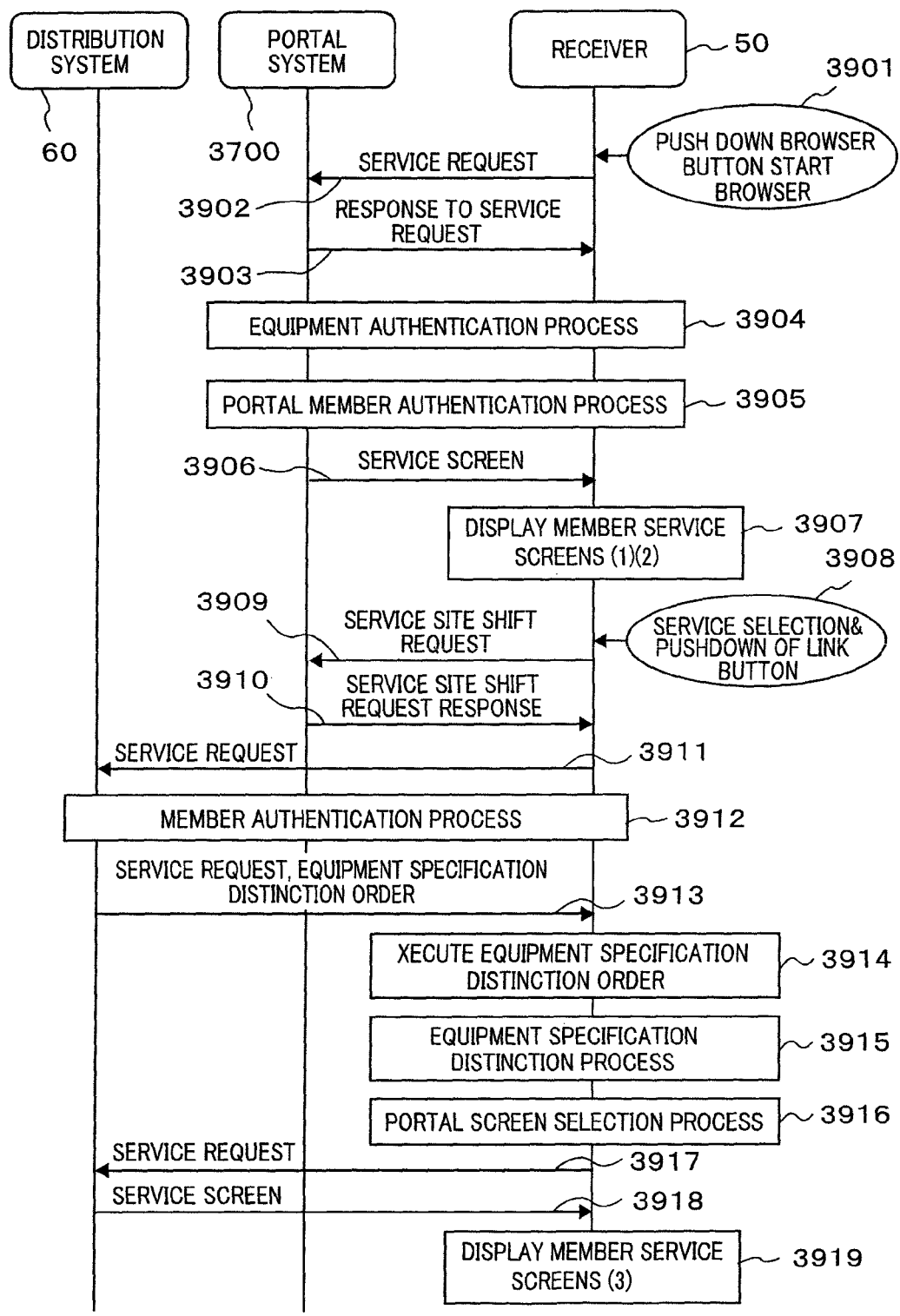
FIG. 39 shows an example of a flowchart for processing an access to the portal system and the content distribution system.

FIG. 39 shows an example of a process flow for the receiver 50 to accesses the site of the distribution system 60, which can distribute 2D/3D content.

In steps S3901 through S3903 are applied the steps being same to S3001 through S3003 shown in FIG. 30 mentioned above. Thus, when the user pushes down a "browser button" on the remote controller of the receiver 50, the receiver 50 starts the browser 51, so as to obtain the information (e.g., URL or script) for shifting to the site, which is provided for accessing to the portal server 2801 to execute the equipment authentication.

After S3903, the browser 51 of the receiver 50 accesses to the authentication server 2804 of the portal system 2800, and executes the predetermined equipment authentication process between both of them, with using the device ID 2901. Herein, in the equipment authentication request, which the receiver 50 issues towards the authentication server 2804, may includes the information relating to the receiver 50 (e.g., name of the manufacturer or the model, version information, 3D enabled or not, etc.), other than the device ID 2901.

The authentication server 2804 receiving the equipment authentication request determines on if the device ID 2901 of the receiver 50 is already registered or not, in the authentication server 2804, and if not registered, it decides that the authentication is failed, and transmits a result indicating that the authentication is failed and a redirect request (e.g., URL for producing an interruption screen, or URL for shifting into a new registration, etc.) to the portal server being accessible next time.

On the other hand, if the equipment can be decided proper or legal since the device ID 2901 is registered in the authentication server 2804, a result indicating that the equipment authentication is succeeded and a redirect request (may be attached with the information, such as, a result of the equipment authentication process and/or the device ID 2901, date/time when executing the equipment authentication, and/or an accesses condition, etc.) to the portal server 2801 accessible (S3904).

Herein, the authentication server 2804 can grasp if the receiver 50 can deal with the 3D content or not, by referring to the equipment list stored within the server, as well as, confirming the registration condition of the device ID 2901.

The receiver 50 succeeding the equipment authentication process 3904, similar to S3005 shown in FIG. 30, executes a portal member authentication process 3905 between the customer management server 2802 through the portal server 2801. And if acceding the portal member authentication process for the receiver 50, the portal server 2801 produces the member page (see the screen 3400 or 3402) for that member ID, to be transmitted to the receiver 50.

In that instance, if it is possible to grasp if the receiver 50 is capable or enabled with the 3D with using the device ID and the equipment list, which are managed by the authentication server 2804, the portal server 2801 may produce that member page, differently, in the substance thereof, i.e., the case of being enabled with 3D and the case of not being enabled with 3D (S3906).

The browser 51 of the receiver 50 receiving the member page, similar to S3007 shown in FIG. 30 mentioned above, displays the screen 3400 3402 on the external or built-in monitor 2805 (S3907).

When the user selects a link address to the distribution system 60, which she/he wishes to use, on the screen 3402 (S3908), similar to the S3009 through S3012 shown in FIG. 30 mentioned above, transmits the access request to the Web server 61 of the distribution system 60 with using the member ID 2909 as an argument. Responding to that, the Web server 61 requests a member authentication process to the customer management server 65 with using the member ID 2909. The customer management server 65 determines if the receiver 50 is a member or not, in accordance with a predetermined authentication procedure upon basis of the member ID 2909, and informs a result thereof to the Web server 61 (S3909 through S3912).

The Web server 61 receiving the member authentication result transmits an equipment specification distinction order, being the characteristic of the present invention, to the receiver 50, in order to deal with the case where the receiver 50 can deal with the 3D or the case where it cannot, respectively.

The equipment specification distinction order is assumed to be one of such a format, that the browser of the (existing) receiver not enabled with the 3D content can execute with using a script language, such as, the JavaScript, for example, and the receiver 50 determines by itself, if it is enabled with the 3D content or not, and includes such a substance therein, that selection can be made between a process to be executed when it can deal with the 3D content (for example, a process for jumping into a site for producing a list screen of the 2D/3D contents) and a process to be executed when it cannot deal with (for example, a process for jumping into a site for producing a list screen of only the 2D contents) (S3913).

The browser 51 of the receiver 50 receiving the equipment specification distinction order executes that equipment specification distinction order first, and obtains a result thereof (S3014). And, upon analysis of that result, it determines if it can deal with the 3D content by itself or not (S3915). For example, it determines the followings (1) to (3):

(1) The equipment itself was already enabled with the 3D content, and an attachment, such as, 3D glasses or the like, was already bought;

(2) Although the attachment, such as, 3D glasses, etc., was not bought yet, but it is the equipment, which can be enabled with reproduction of the 3D content, if buying it; and (3) It is the equipment, which cannot be enabled with production of the 3D content.

And, depending on the analysis result and the determination result, URL of the shift address is selected, which is described for each of the determination result included in the equipment specification distinction order (S3916). For example, if the determination result is (1) mentioned above, the URL is selected, to which an access be made when the 3D content (included in the equipment specification distinction order) can be deal with.

And, to the Web server 61 of the distribution server 60 is issued a service request (for example, a production/transmission request of the list screen of the 2D/3D contents, etc.) to the URL, which is selected in the S3916 for the Web server 61 of the distribution system 60 (S3917).

The Web server 61 receiving the service request produce the screens of a menu and a list of contents, which the receiver can deal, in accordance with the substance of that request, and transmits it to the receiver 50 (S3918). For example, when the service request indicates "being the equipment, which can deal with the 3D content" (in the case (1) mentioned above), a menu and a content list are produced, for dealing with both the 2D and the 3D. When "being the equipment, which cannot deal with the 3D content" (in the case (3) mentioned above), the menu and the content list are produced, but for dealing with only the 2D content.

In case when indicating "Although the attachment, such as, 3D glasses, etc., was not bought yet, but it is the equipment, which can be enabled with reproduction of the 3D content, if buying it (in the case (2) mentioned above), either the menu and list for both contents of the 2D and 3D, or the menu and list only for the 2D content may be produced, or may be executed a special process for this case. For example, it is possible to shift into a screen for purchasing the attachment, such as, the 3D glasses or the like, or to display a message that the 3D view/listen can be made if buying the 3D glasses, for the 3D content, on the content list of the 2D and the 3D.

The browser 51 of the receiver 50 receiving the screen displays that screen (e.g., the screen 3500 in the present embodiment) on the monitor 2805 (S3018).

Herein, in the explanation given in the above, the executing process and the selection of the display screen, etc., coping with the fact if the receiver 50 can deal with the 3D content or not, as the characteristic of the present invention, are executed in S3913 through S3917; however, they may be executed in anywhere (for example, in S3102 shown in FIG. 31, and in S3200 though S3202 shown in FIG. 32) as far as it is the timing for actually displaying the content list screen.

From the mentioned above, it is possible to select the screen to be displayed depending on the case where the receiver 50 can deal with the 3D content or the case where it cannot, as well as, the operation to be executed next, by the Web server 61 of the distribution system 60, which can distribute both the 2D/3D is 3D enabled/non-enabled, i.e., transmitting the equipment specification distinction order to the receiver 50, in the S3913, irrespective of the 3D enabled/non-enabled condition of the receiver 50. Also, with doing this, the receiver 50 can deal with the 3D content distributed by the distribution system 60, appropriately.

Herein, although the Web server 61 mentioned above transmits the equipment specification distinction order to all of the receivers 50 irrespective of being 3D enabled/non-enabled, while determining on if the 3D content can be deal with or not on the side of the receiver 50; however, as was described in S3906, on the side of Web server 61, it may be determined on, if the receiver 50 can deal with the 3D content or not (for example, a method of obtaining the information relating to the receiver from the portal system 2800, with using the member ID 2902, or a method of sharing the authentication server 2804, in common, between the customer management server 65 of the distribution system 60 and the customer management server 2802 of the portal system 2800, etc.), and thereby producing the menu and the content list for dealing with both contents of the 2D and 3D when the receiver 50 is enabled with the 3D, or the menu and the content list for dealing with only the 2D content when it is non-enabled with the 3D, to transmit them.

<Procedure to Buy 3D Content>

Next, explanation will be given on the processes until when the receiver 50 buys the 3D content from the distribution system 60, by referring to FIG. 31.

It is assumed that the browser 51 of the receiver 50 is in the condition of displaying a top screen (the screen 3500) of the distribution server 60 on the monitor 2805.

When the user selects "non-purchased content" 3501 on the screen 3500 (S3100), the browser 51 issues the request to obtain the service necessary for displaying a screen of the content(s), on which the receiver 50 has not purchased yet and can purchase, to the Web server 61 of the distribution system 60 (S3101).

Responding to this, the Web server 61 of the distribution system 60, since it can determine to which one of (1) to (3) mentioned above the receiver 50 corresponds in S3917 shown in FIG. 39, produces the contents list corresponding thereto, respectively, for example, obtaining the information of the 2D/3D contents being non-purchased and also purchasable, in the case where the receiver 50 corresponds to (1) and (2) mentioned above, and the information of only the 2D content being non-purchased and also purchasable, in the case where the receiver 50 corresponds to (3) mentioned above, to produce the content list screen with using those information, and thereby returning them to the receiver 50.

Figure 40:
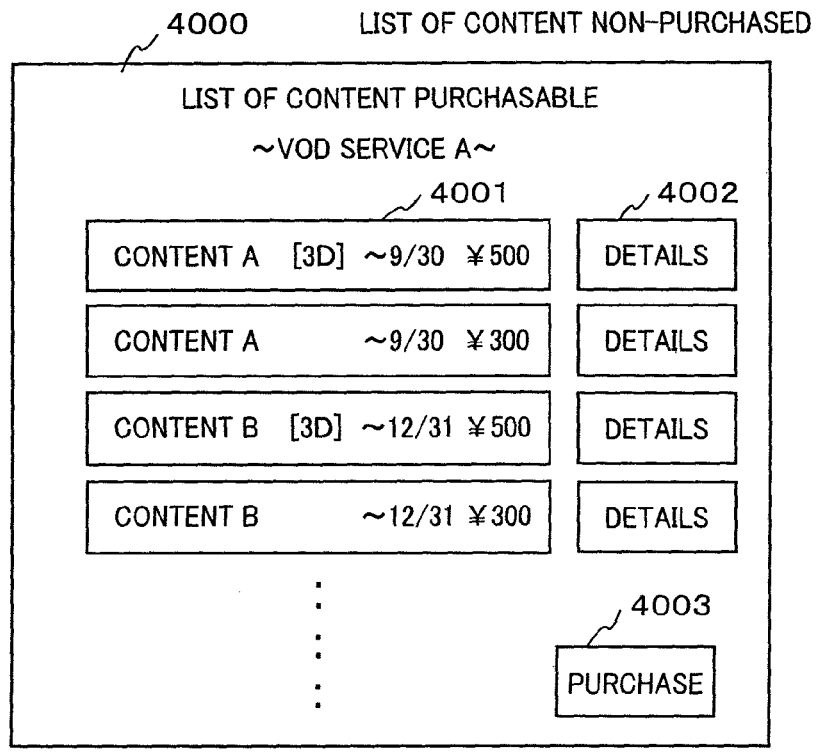
FIG. 40 shows an example of a list screen of the contend non-purchased.

FIG. 40 shows an example of a non-purchased content list screen, which the content distribution system produces. A screen 400 depicts an example of the screen to be displayed when the receiver 50 can deal with both contents of the 2D/3D, and is configured with information (e.g., a content name, a purchasable period, a purchase price, etc.) 4001 relating to the 2D/3D contents, which the receiver 50 can buy, a button 4002 for displaying the detailed information relating to that contents, and a button 4003 for instructing to purchase. On the content list screen are included data for displaying that screen 4000 and script for dealing with that data, a details button 4002 for the content, which is desired by the user on the screen, and/or URL for shifting when a purchase button 4003 is selected by the user, etc. (S3102).

The browser 51 of the receiver 50 obtaining the content information in S3102 displays the screen 4000 on the external or built-in monitor 2805 (S3103).

In S3104 through S3109 hereinafter may be applied the steps described in the embodiment 3.

<Procedure to Start 3D Content View/Listen>

Next, explanation will be given on the processes until when viewing/listening the content(s), which the receiver 50 has purchased already, by referring to FIG. 32.

First of all, it is assumed that the browser 51 of the receiver 50 is in the condition of displaying the top screen (e.g., the screen 3500) of the distribution system 60 on the monitor 2805, and that the user selects "already-purchased content" 3501 on that screen 3500 (S3200).

The browser 51 of the receiver 50 issues the request to obtain the service necessary for displaying a screen of the content(s), which the receiver 50 has already purchased, to the Web server 61 of the distribution server 60, with using the URL contained in the Web code of that screen 3500 (S3201).

Responding to this, the Web server 61 of the distribution system 60 obtains the content(s), which the receiver 50 has already purchased, and the information of the license, from the customer management server 65, upon basis of the member ID of the receiver 50. And, it produces a page of the list of the contents already purchased, and returns it to the receiver 50.

Figure 41:
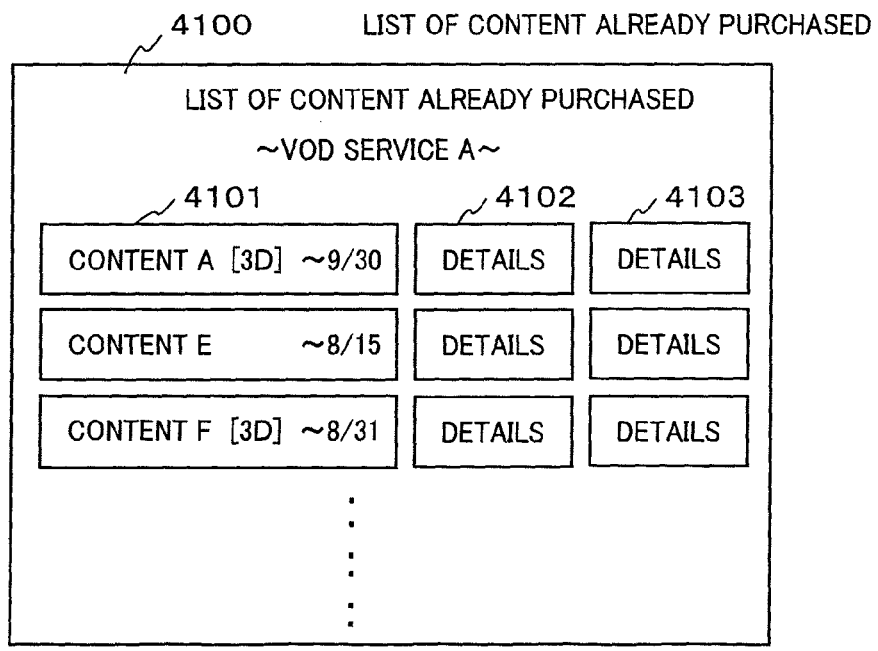
FIG. 41 shows an example of a list screen of the contend already purchased.

FIG. 41 shows an example of a list screen of the content(s) already purchased, which the content distribution system produces. A screen 4100 depicts an example of the screen for displaying both contents of the 2D/3D, and is configured with information (e.g., a content name, a viewable/listenable period, etc.) 4101 relating to the content(s), which the receiver 50 has already purchased, a button 4102 for displaying the detailed information relating to that content, and/or a button 4103 for instructing to view/listen. On a page of the list of the content(s) already purchased, in addition to data for displaying the screen 4100 and script for dealing with that data, it is assumed, there are included MetaFileURL about each content already purchased, LicenseID, and a reproduction start position PlayPosition, and ReturnURL.

However, the reproduction position (PlayPosition) may be included only in the content, to which the user (or the receiver 50) has interrupted the view/listen, once, in the previous time. Further, not described in FIG. 32, the 2D/3D distinction information may be included therein. With using the 2D/3D classification 4503 of the position information data 4500 and the content characteristic property information (ERI) 210 of the reproduction control metafile, this 2D/3D distinction information determines a value of the content characteristic property information (ERI) 210, when no PlayPosition is included or the PlayPosition indicates the top of content (may use a value of the 2D/3D classification 4503, but priority is given to the value of the content characteristic property information (ERI) 210 when the values of the content characteristic property information (ERI) 210 and the 2D/3D classification 4503 differ from), and determines a value of the 2D/3D classification 4503 for an interrupted position when the PlayPosition indicates the position other than the top thereof (S3202), i.e., the interrupted position.

The browser 51 of the receiver 50 receiving the page of the list of the content(s) already purchased display the screen 4100 on the external or built-in monitor 2805 (S3203).

When the user selects the content 4101 to be viewed/listened on the screen 4100 and pushes down the view/listen button 4103 (S3204), the browser 51 determines if that content was viewed/or listened halfway or not, previously, with using the PlayPosition of the content selected, in accordance with the procedure of HTML or JavaScript described on the page of the list of the content(s) already purchased. And, selecting the URL described depending on a result of that determination, it issues the service obtaining request to the access address of the Web server 61 indicated by the URL.

For example, when determining that the content is not yet viewed/listened, or all thereof are already viewed/listened (namely, when no PlayPosition is included, or the PlayPosition indicates the top of the content), it shifts into a process for starting the view/listen (e.g., S3209 hereinafter). On the other hand, when determining that the content is already viewed/listened halfway, the browser 51 transmits the service obtaining request to the Web server 61 with using the URL attached to a result of that determination (S3205).

The Web server 61 receiving the service obtaining request confirms the PlayPosition of the content within the receiver 50, and produces a page for selecting the method for viewing/listening (e.g., "view/listen from a beginning" or "view/listen continuation following from last time"), to be transmitted to the receiver 50. On that page are included, in addition to data for displaying the screen 3800 and script for dealing with that data, the information, such as, MetaFileURL, the LicenseID, the PlayPosition, the ReturnURL and/or the 2D/3D distinction information, etc., which are described in S3202, depending on the necessity thereof (S3206).

Herein, although the explanation was given that it shifts into S3209 when determining that the content is not viewed/listened yet in S3205 or all thereof is already viewed/listened, it is also possible that the browser 51 transmits a content view/listen request even in the case of a result of this determination, while the Web server 61 transmits a page including only the "view/listen from a beginning" 3802 in case where the PlayPosition of the content of the receiver 50 is not setup, or it indicates the top position of the content (namely, when the content is viewed/listened firstly, or when it comes to the end thereof when being viewed/listened previously).

The browser 51 of the receiver 50 receiving the page for selecting the method for viewing/listening displays the screen 3800 (S3207).

Though the user selects either one on the screen 3800 displayed, but according to the present embodiment, she/he selects the "view/listen from the beginning" 3802 and pushes down the start button 3803 (S3208).

In S3209 through S3213 are applied the similar processes explained in the embodiment 2, wherein the browser 51 of the receiver 50 obtains the reproduction control metafile 200 relating to the content selected from the metadata server 62 of the distribution system 60, to be record temporally together with the LicenseID and the PlayPosition, and it starts the AV player 53, so as to deliver the substance of the reproduction control metafile 200, as well as, the information, such as, the LicenseID, the PlayPosition, the 2D/3D distinction information, etc.

And, the AV player 53 obtains the content key necessary for content view/listen from the DRM server 64 of the distribution system in accordance with the license obtaining information 220 of the reproduction control metafile 200. And, in accordance with the content characteristic property information 210 of the reproduction control metafile 200, it executes the session establishing (i.e., a logical connection necessary for executing HTTP/TCP or RTP/UDP steaming) (for the content distribution) between the content server 63.

The AV player 53 of the receiver 50 succeeding to establish the session transmits the URL indicating an address for obtaining the content selected, which is included in the content title/reference address/file name 211 of the reproduction control metafile 200, and also a start request (corresponding to "PLAY") from the top position or the interrupted restarting position of that content with using the PlayPosition when reproducing the selected content from the way (S3214).

Figure 42:
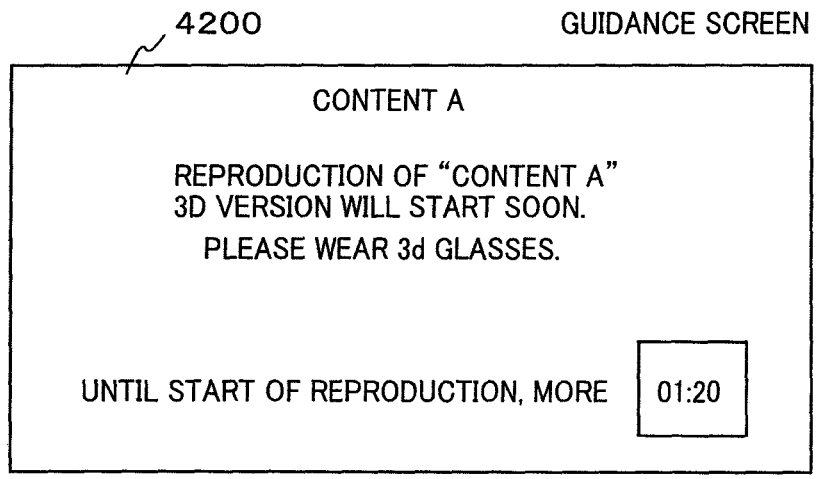
FIG. 42 shows an example of a guidance screen.

The content server 63 receiving the content transmission request transmits the content to the receiver, while encrypting it with using the content key, after transmitting such a guidance screen 4200 as shown in FIG. 42 only when the content to be transmitted is the 3D content. Namely, after transmitting (displaying) that screen 4200 as a part of the content for a predetermined time-period, the content server 63 starts the content transmission, automatically, even if the user/receiver 50 is not yet ready for viewing/listening the 3D (S3213).

Figure 43:
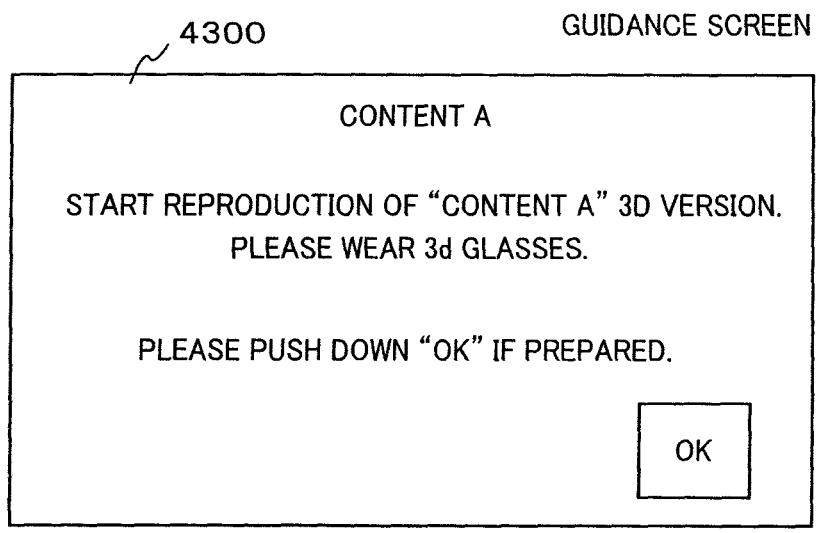
FIG. 43 shows an example of other guidance screen.

In the place of displaying the screen 4200, a screen 4300 shown in FIG. 43 may be displayed. In this case, the content server 63 produces that screen 4300 to transmit it to the receiver 50, but does not start the transmission of the content until when the user selects an "OK" button on the receiver 50 displaying that screen and the receiver 50 informs that to the content server 63. Or, when the Web server 61 transmits a page of the list of the already purchased content(s), in S3202, URL for obtaining the screen 4300 may be included therein, so that a service request be issued to that URL, being an accessing address of the Web server 61, before starting the AV player 53 in S3209, and thereby obtaining the screen 4300 from the Web server 61. In that case, the processes after S3209 will be executed, after the user selects the "OK" button on that screen.

From the steps mentioned above, when the user views/listens the 3D content, the screen for prompting her/him preparation (e.g., wearing the 3D glasses, etc.) necessary for viewing/listening the 3D content is transmitted from the content server 63, in advance. With doing this, as far as it is the receiver 50 enabling to view/listen the 3D content, it can be started on the viewing/listening, with the same operability, not depending on a manufacturer and/or a model thereof.

<Procedure to Interrupt 3D Content View/Listen>

Figure 44:
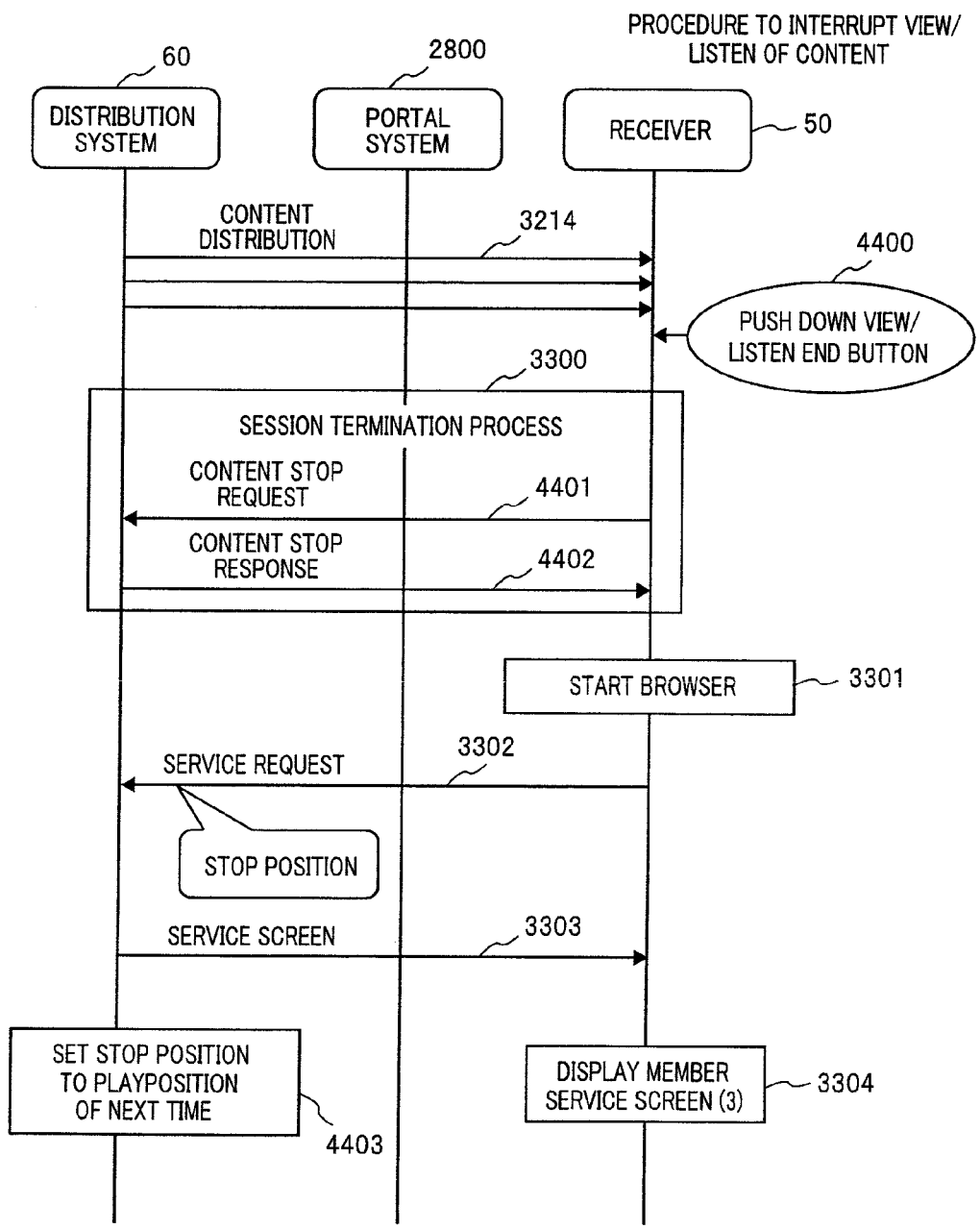
FIG. 44 shows an example of a flowchart for processing to interrupt the content in the process of viewing/listening thereof.

Next, explanation will be given on the procedure for the receiver 50 to interrupt the 3D content in the process of viewing/listening on the way thereof, by referring to FIG. 44.

Upon distribution of the content by the content server 63, if the user instructs a "stop" button on the remote controller of the receiver 50 or instructs the "stop" button during when a sub-window including operation buttons is displayed on the browser 51 (S4400), the AV player 53 of the receiver 50 issues a content stop request for stopping the transmission of content to the content server 63. The content stop request may include both or either one of a stop position (A) of the AV player 53 and an order to inquire the stop position to the content server 63 (S4401).

Responding to that, the content server 63 stops transmitting that content, and inform that fact. In that instance, it includes any one of the stop position (B) of that content, the stop position (A), which the receiver 50 informs in S4401, and/or the position (C) retuning back by an arbitrary time/position from the stop position (A) (for example, a top of GOP, a top of chapter including an interrupted position, etc.) (S4402).

The AV player 53 of the receiver 50 receiving a content stop response is ended, after restarting the browser 51. In that instance, the AV player 53 informs the stop position (A) of itself or the stop position, which is obtained from the content server 63 in S4402, to the browser 51 (S3301). The browser 51 restarting makes an access to the site of the Web server 61 of the distribution system 60, which is indicated by ReturnURL, by adding an ending condition of the AV player 53 and the stop position obtained from the AV player 53 in S3301 (S3302).

Responding to this, the Web server 61 produces a screen to be displayed (for example, the screen 3500), to be returned back to the receiver 50 (S3302), and holds the ending condition and/or the stop position of the AV player received therein, thereby setting up the stop position as the PlayPosition for when restarting the view/listen of the content next time (S4403).

The browser 51 of the receiver 50 producing the screen displays the screen 3500 on the external or built-in monitor 2805 (S3303).

Herein, after ending the viewing/listening of the 3D content (including the interruption), the receiver 50 may display a guidance screen (for example, "view/listen of 3D content will be ended", etc.) indicating to turn the screen display back to the 2D content display, depending on the necessity thereof.

<Procedure to Restart 3D Content View/Listen>

Next, explanation will be given on the processes, for the receiver 50 interrupting the viewing/listening of the 3D content in accordance with the steps mentioned above, to restart the viewing/listening of content, hereinafter.

Firstly, it is assumed that the browser 51 of the receiver 50 displays the top screen (e.g., the screen 3500) on the monitor 2805.

When the user selects the "content already purchased" 3502 on the screen 3500 (S4600), the browser 51 of the receiver 50 issues the request to obtain service necessary for displaying the screen of the list of the content(s), which the receiver 50 has already purchased, to the Web server 61 of the distribution system 60 (S4601).

Responding to this, the Web server 61 of the distribution system 60 obtains the content(s), which the receiver 50 has already purchased, and also the information of the license(s), from the customer management server 65. And, it produces a page of the list of the content(s) already purchased, thereby to return it back to the receiver 50. The page of the list of the content(s) already purchased is assumed to include MetaFileURL, LicenseID, PlayPosition, ReturnURL, etc., for each content already purchased, in addition to data for displaying the screen 4100 and script for dealing with that data. However, the PlayPosition may be included only in the content, to which the user (or the receiver 50) has interrupted the view/listen, once, in the previous time. Further, the 2D/3D distinction information may be included therein. With using the 2D/3D classification 4503 of the position information data 4500 and the content characteristic property information (ERI) 210 of the reproduction control metafile, this 2D/3D distinction information determines a value of the content characteristic property information (ERI) 210, when no PlayPosition is included or the PlayPosition indicates the top of content (may use a value of the 2D/3D classification 4503, but priority is given to the value of the content characteristic property information (ERI) 210 when the values of the content characteristic property information (ERI) 210 and the 2D/3D classification 4503 differ from), and determines a value of the 2D/3D classification 4503 of an interrupted position when the PlayPosition indicates the interrupted position other than the top thereof (S4602).

The browser 51 of the receiver 50 receiving the page of the list of the content(s) already purchased display the screen 4100 on the external or built-in monitor 2805 (S4603).

When the user selects the content 4101 to restart the view/listen on the screen 4100 and pushes down the view/listen button 4103 (S4604), the browser 51 obtains the URL as an address for accessing relating to the content selected, in accordance with the procedure of HTML or JavaScript described on the page of the list of the content(s) already purchased, and issues the service obtaining request to the access address of the Web server 61 indicated by the URL (S4605).

The Web server 61 receiving the service obtaining request determines (a) if the content is the 3D content or not, and (b) if the PlayPosition of the content is of the 3D content or not, relating to the content(s) selected by the receiver 50 (S4606). Regarding to (a), it is also possible to apply a method for determining from the 2D/3D distinction information included in the reproduction control metafile 200, which is obtained from the metadata server 62, or a method for determining from the 2D/3D classification 4503 of the position information data 4500 relating to the content which is obtained from the content server 63, or both methods (giving priority to the value of the 2D/3D classification 4503 differ in the values thereof).

Regarding to (b), there is a method for determining, by obtaining the position information data 4500 relating to the content from the content server 63, to extract the position where the PlayPosition is included among the position information within the position information data 4500, and further confirming the value of the 2D/3D classification 4503 corresponding to that position.

The Web server 61 produces a page for selecting the method for viewing/listening (e.g., "view/listen from the beginning" or "view/listen continuation following from last time"), with using the results of (a) and (b) in S4606, and transmits it to the receiver 50. On that page are included data for displaying the screen 3800 and the script for dealing with that data. In that script, thee is described an order to shift into S4613, necessarily, responding to the "view/listen from the beginning" 3802. Also, if the results of (a) and (b) determine the 2D content, or if the result of (a) determines the 3D content while the result of (b) the 2D content, there is described an order to shift into S4613 responding to the "view/listen continuation following from last time" 3801.

If the results of (a) and (b) determine the 3D content, there is described an order to shift into S4610 in the "view/listen continuation from last time" 3801. In addition to the substances mentioned above, on that page, there is described the information including, such as, the MetaFileURL, the LicenseID, the PlayPosition, the ReturnURL, the 2D/3D distinction information, etc., for example, which are described in S4602, depending on the necessity thereof (S4607).

Herein, even in case of determining that the content is not yet viewed/listened in S4605, or all thereof are already viewed/listened, the service obtaining request is issued to the Web server 61; however, on the page of the list of the content(s) already purchased, which is obtained in S4602, there may be included the script for shifting into S4610, when the PlayPosition is not included or it indicates the top position thereof.

The browser 51 receiving that page displays the screen 3800 on the monitor (S4608).

When the user selects the "view/listen from the beginning" 3802 on the screen 3800 and pushes down the start button 3803, shifting into S4613 is done, in accordance with the script included on the selection page of S4607.

When the user selects the "view/listen continuation following from last time" 3801 and pushes down the start button 3803 (S4609), the browser 51 of the receiver 50 shifts into S4613 if the content selected is the 2D content, or if it is the 3D content, it transmits the service obtaining request to the Web server 61 with using the URL associated with the "view/listen continuation following from last time" 3801 described on the page for selecting the method for viewing/listening, in accordance with the script included in the selection page of S4607. In this instance, the PlayPosition obtained in S4606 may be included within the service obtaining request (S4609).

The Web server 61 receiving the service obtaining request produces data for displaying the screen 4300 and the Web code including the information, such as, URL for restarting from the interrupted position, MetaFileURL, LicenseID, PlayPosition, ReturnURL, 2D/3D distinction information, etc., and transmits those to the receiver 50 (S4611).

The browser 51 of the receiver 50 displays the screen 4300 received from the Web server 61 on the external or built-in monitor 2805 (S4612).

When the user selects the "OK" button on the screen 4300, in S4613 through S4617, the same processes will be executed to those in S3209 through S3213 in FIG. 32 mentioned above. Thus, the reproduction control metafile 200 is obtained from the metadata server 62 of the distribution system 60, so as to obtain the content key necessary for viewing/listening the content from the DRM server 64 in accordance with the substance thereof, and thereby establishes the session between the content server 63.

The AV player 53 of the receiver 50 succeeding to establish the session transmits a request for restarting the view/listen from the interrupted position of the content, on the session, with using the URL at the address for obtaining the content, which is included in the content title/reference address/file name 211 of the reproduction control metafile 200 (S4618).

The content server 63 receiving the view/listen restart request from the interrupted position of the content transmits the content continuing from the interrupted position while encrypting it, to the receiver 50, with using the content key. The receiver 50 receiving the content encrypted decrypts the content by the decryptor 514 with using the content key, and after being decrypted in the AV player 53, the content is displayed on the external or built-in monitor 2805 through the video/audio output I/F 531 (S4619).

With such processes as mentioned above, for the distribution system 60 enabling to distribute both contents 2D/3D, by holding the position information data 4500 for all of the contents or only for the 3D content, it is possible to transmit the content from the restart position, after determining if the position for restarting the view/listen of the content is of the 2D content or the 3D content with using the position information data 4500 on the side of the distributor system 60, when the user views/listens the 3D content and when she/he restarts the 3D content in the process of viewing/listening after interrupting it once, and producing the guidance screen for prompting the user to make preparation (e.g., wearing the 3D glasses, etc.) necessary for viewing/listening the 3D content, in advance, before starting the transmission of content, when determining that the position for starting the view/listen is of the 3D content, and thereby displaying it on the side of the receiver 50.

Also, when determining the restart position is of the 2D content, it is possible to transmit the content from the restart position without displaying the guidance screen. With this, the receiver 50 has no necessity of determining if the content to be received is the 3D content or not, and therefore is able to start the view/listen with the same operability, irrespective of the manufacturer and/or the model thereof, as far as it is the receiver 50 enabling the view/listen of the 3D content. The existing receiver 50 not enabled with the 3D can shifts into a view/listen screen from the restart position, as it is, without conducting a special display.

Embodiment 4

In the embodiment 3 is shown the example of producing the screen for prompting the user to make the necessary preparation for viewing/listening the 3D content, in advance, before starting the distribution of content, by determining if the position for restating the distribution of content is of the 2D content or the 3D content on the side of the distribution system 60, when the user interrupts the 3D content in the process of viewing/listening on the receiver 50, once, and restart it.

In the present embodiment, explanation will be given on a case where the receiver 50 informs the interrupted position of the content and the information of being the 3D content or not, to the distribution system 60, when interrupting the view/listen of content, and obtains those information from the distribution system 60 when restarting the content. The system configuration to be used for explaining the present embodiment uses the same one, which was shown in the embodiment 3.

<Procedure to Interrupt 3D Content View/Listen>

Figure 47:
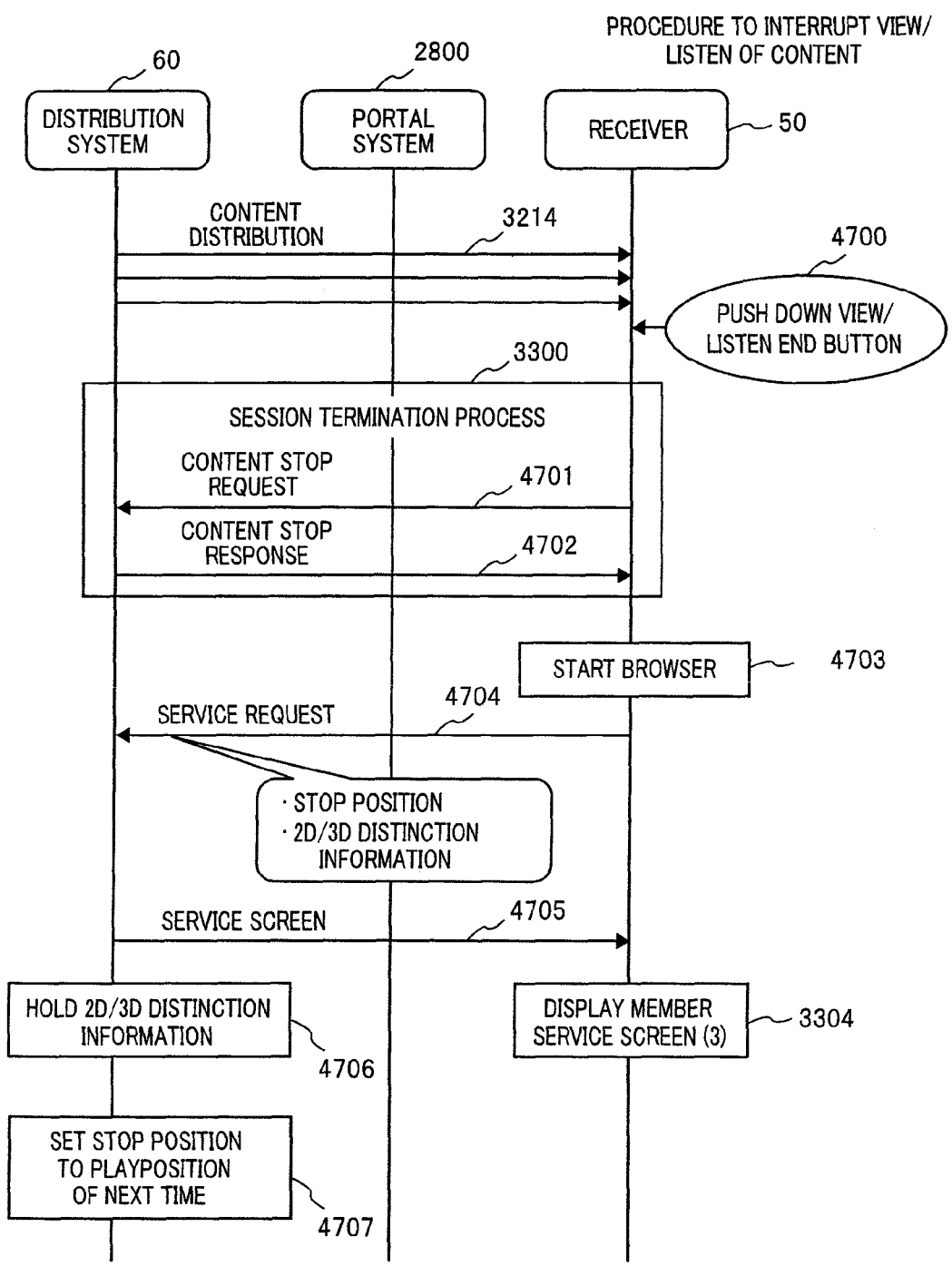
FIG. 47 shows an example of a flowchart for processing to interrupt the content in the process of viewing/listening thereof.

First of all, explanation will be given on the processes for the receiver 50 to interrupt the content in the process of viewing/listening on the way thereof, by referring to FIG. 47.

During when the content server 63 distributes the content, if the user instructs the "stop" button on the remote controller of the receiver 50 or instructs the "stop" button when displaying the sub-window including the operation buttons on the browser 51 (S4700), the AV player 53 of the receiver 50 issues a content stop request for stopping the transmission of content to the content server 63. In this content stop request may be included both or either one of a stop position (A) of the AV player 53 and an order inquiring the stop position to the content server 63 (S4701).

Responding to this, the content server 63 stops the transmission of the content and informs that fact. In that instance, there is included either one of the stop position (B) of the content, or the stop position (A) informed by the receiver 50 in S4401, or a position (C) turned back ahead by an arbitrary time/position from the stop position (A) (for example, the top of GOP, the head of the chapter including the interrupted position, etc.) (S4702).

The AV player 53 of the receiver 50 receiving the content stop response ends, after restarting the browser 51. In that instance, the AV player 53 informs the stop position information of either one of the stop position (A) of itself or the stop position, which is obtained from the content server 63 in S4402, and the 2D/3D distinction information for distinguishing if the stop position is of the 2D content or the 3D content, to the browser 51.

Herein, the AV player 53 distinguishes if being the 2D content or the 3D content, with using the method for extracting the 2D/3D distinction signal at the stop position included in the 3D content, which was described in the embodiment 3, the method for obtaining the 2D/3D distinction information included in ECG from the ECG processor unit 52, or the method for obtaining the 2D/3D distinction information included in the reproduction control metafile 200, which is obtained from the browser 51 when the view/listen is started, etc. (S4703).

The browser 51 restarting accesses to the side of the Web server 61 of the distribution system 60, which is indicted by the ReturnURL attaching the end condition and the stop position information of the AV player 53, which is obtained from the AV player 53 in S4703, and the 2D/3D distinction information thereto (S4704).

Responding to this, the Web server 61 produces the screen to display (for example, the screen 3500), and returns it to the receiver 50 (S4705).

Thereafter, the Web server 61 analyzes the substance received from the AV player 53 of the receiver 50, and holds it together with the end condition of the AV player and/or the stop position of the AV player when the 2D/3D distinction information is included (S4706), thereby setting up the stop position as the PlayPosition when restarting the view/listen of the content next time (S4707).

The browser 51 of the receiver 50 receiving the screen produced display the screen 3500 on the external or built-in monitor 2805 (S3303).

Herein, the receiver 50, after interrupting the view/listen of the 3D content, may display the guidance for indicating that the screen display will be retuned back to the display of 2D content (for example, "end view/listen of 3D content", etc.), depending on the necessity thereof.

<Procedure to Restart 3D Content View/Listen>

Next, explanation will be made about the processes for restarting the view/listen of the 3D content, which the receiver 50 interrupts in accordance with the steps mentioned above, by referring to FIG. 48.

Firstly, it is assumed that the browser 51 of the receiver 50 displays the top screen (e.g., the screen 3500) of the distribution system 60 on the monitor 2805.

When the user selects the "content already purchased" 3502 on the screen 3500 (S4800), the browser 51 of the receiver 50 issues the request to obtain the service necessary for displaying the screen of the list of the content(s), which the receiver 50 has already purchased, to the Web server 61 of the distribution system 60 (S4801).

Responding to this, the Web server 61 of the distribution system 60 obtains the content(s), which the receiver 50 has already purchased and the information of the license(s) thereof, from the customer management server 65, upon basis of the member ID 2902 of the receiver 50. And, it produces a page of the list of the content(s) already purchased, and returns it back to the receiver 50. In addition to data for displaying the screen 4100 and the script for dealing with that data, the page of the list of the content(s) already purchased includes MetaFileURL, LicenseID, PlayPosition, ReturnURL, etc., for each content that is already purchased.

However, the PlayPosition may be included only into the content, to which the user (or the receiver 50) has interrupted to view/listen, once, in the previous time. Further, the 2D/3D distinction information may be included therein. This 2D/3D distinction information sets up the content characteristic property information (ERI) 210 when no PlayPosition is included or the PlayPosition indicates the top of the content, while when the PlayPosition indicates the interrupted position other than the head, and if there is the 2D/3D distinction information held in S4706 in FIG. 47 mentioned above, it includes that information therein (S4802).

The browser 51 of the receiver 50 receiving the page of the list of the content already purchased display the screen 4100 on the external or built-in monitor 2805 (S4803).

When the user selects the content 4101 to be restarted the view/listen thereof on the screen 4100 and pushes down the view/listen button 4103 (S4804), the browser 51 obtains the URL as the accessing address relating to the content selected, in accordance with the process of, such as, HTML or JavaScript, etc., which is describe on the page of the list of the content already purchased, and issues the service obtaining request to the accessing address of the Web server 61, which is indicated by that URL (S4805).

The Web server 61, receiving the service obtaining request, produces the page for selecting the method for viewing/listening, and issues the service (e.g., "view/listen from the beginning" or "view/listen continuation following from last time") with using the PlayPosition and the 2D/3D distinction information mentioned above, and transmits it to the receiver 50. On that page are included data for displaying the screen 3800 and the script for dealing with that data. In that script, there is described an order to shift into S4612, necessarily, for the "view/listen from the beginning" 3802. Also, when no 2D/3D distinction information is held therein, or when the 2D/3D distinction information indicates the 2D content, there is described an order to shift into S4612 for the "view/listen continuation following from last time" 3801.

When the 2D/3D distinction information held therein indicates the 3D content, there is described an order to shift into S4609 for the "view/listen continuation following from last time" 3801. In addition to the substances mentioned above, on that page are included the information, such as, the MetaFileURL, the LicenseID, the PlayPosition, the ReturnURL, the 2D/3D distinction information, etc. (S4806).

Herein, in S4805, although the service obtaining request is issued to the Web server 61, even if it is determined that the content is not viewed/listened yet, or that all thereof is already viewed/listened; however, there may be included the script for shifting into S4812 when the PlayPosition is included or it indicates the head position of the content on the page of the list of the content already purchased, which is obtained in S4802.

The browser 51 receiving that page displays the screen 3800 on the monitor (S4807).

When the user selects the "view/listen from the beginning" 3802 on the screen 3800 and instructs the start button 3803, it shifts into S4809 in accordance with the script included on the selection page of S4806.

When the user selects the "view/listen continuation following from last time" 3801 on the screen 3800 and instructs the start button 3803 (S4808), the browser 51 of the receiver 50 shifts into S4809 when the content selected is the 2D content, in accordance with the script described on the selection page of S4806, while it transmits the service obtaining request to the Web server 61 with using the URL associated with the "view/listen continuation following from last time" 3801, which is described on the page for selecting the method for viewing/listening when it is the 3D content. In this instance, within the service obtaining request may be included the PlayPosition, which is obtained in S4606.

The Web server 61 receiving the service obtaining request produces the Web code including the information, such as, data for displaying the screen 4300, URL for restarting from the interrupted position, MetaFileURL, LicenseID, PlayPosition, ReturnURL, 2D/3D distinction information, etc., and transmits those to the receiver 50 (S4810).

The browser 51 of the receiver 50 displays the screen 4300 received from the Web server 61 on the external or built-in monitor 2805 (S4811).

When the user selects the "OK" button on the screen 4300, the browser 51 records the MetaFileURL, the LicenseID, the PlayPosition, and the ReturnURL relating to the content selected, temporally. And, it transmits a request for obtaining the reproduction control metafile to the metadata server 62 of the distribution system 60, as the MetaFileURL (S4812).

The metadata server 62 of the distribution system, receiving the reproduction control metafile obtain request, returns such the predetermined reproduction control metafile 200, as is shown in FIG. 10 (S4813).

The browser 51 of the receiver 50 receiving the reproduction control metafile 200 records the substance of the reproduction control metafile 200 therein, temporally, together with the MetaFileURL, the LicenseID, the PlayPosition, the ReturnURL and the 2D/3D distinction information relating to each content, and starts the AV player 53, to as to inform all or part(s) of the reproduction control metafile 200, as well as, the LicenseID, the PlayPosition and the 2D/3D distinction information (S4814). Herein, after starting the AV player 53, the browser 51 comes into the condition of being ended or residing as it is.

The AV player 53 determines if the content to be viewed/listened is the 3D or not, with using the 2D/3D distinction information obtained from the browser 51, and executes a preparation necessary for the receiver 50 when it is the 3D content (e.g., setup of the decoders 522 and 524 for viewing/listening the 3D content, etc.). And, it transmits a key request (including the licenseID 224 and/or the DRM_ID 2904) to the DRM server 64 of the distribution system 60, in accordance with the license obtaining information (LLI) 220 of the reproduction control metafile 200.

The DRM server 64 receiving the key request confirms if the receiver 50 is able to view/listen the content, between the customer management server 65, with using the licenseID 224 and/or the DRM_ID 2904. As a result thereof, only when determining to be viewable/listenable, the DRM server 64 transmits the content key necessary for viewing/listening the content to the receiver 50 (S4815).

The receiver 50 receiving the content key executes (for the purpose of content distribution) the session establishing between the content server 63, in accordance with the content characteristic property information (ERI) 210 of the reproduction control metafile 200 (S4816). Herein, the session means a logical connection necessary for executing HTTP/TCP or RTP/UD streaming.

When succeeding the session establishing, the AV player 53 of the receiver 50 transmits a request for restarting view/listen from the interrupted position of the content on the session, with using the URL of the address for obtaining the content, which is included in the content title/reference address/file name 211 of the reproduction control metafile 200 (S4817).

The content server 63 receiving the view/listen restart request from the interrupted position of the content transmits the content from the interrupted position of the content while encrypting the content, with using the content key, to the receiver 50. The receiver 50 receiving the encrypted content decrypts that content, with using the content key, within the decryptor 514, and also displays it on the external or built-in monitor 2801 through the video/audio output I/F 531 (S4818).

Figure 48:
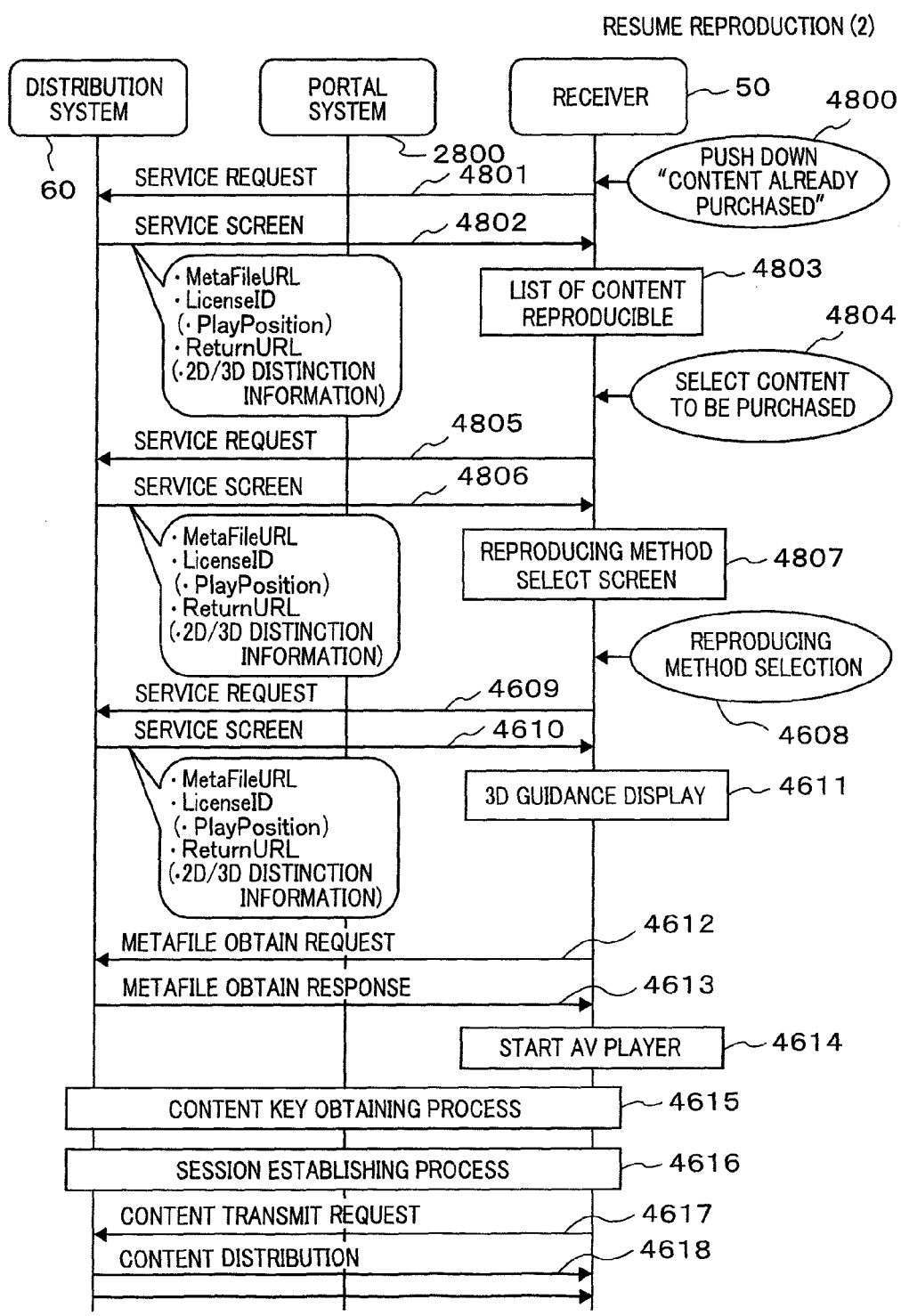
FIG. 48 shows an example of a flowchart for processing to view/listen the content already purchased.

Herein, in this FIG. 48, although the Web server 61 produces the screen 4300 for prompting the preparation necessary for viewing/listening the 3D content (e.g., wearing the 3D glasses) to the user, and also transmits it to the receiver 50, so that the receiver 50 displays it; however, after selection of the "view/listen continuation following from last time" 3801 in S4808, the browser 51 may produces the guidance screen 4300 by itself only when it is the 3D content, by referring to the 2D/3D distinction information obtained from the Web server 61 in S4806, so as to display it on the monitor 2805 (in that instance, steps S4809-S4810 are not executed).

With such procedure as was mentioned above, the receiver 50, which can deal with the 3D content, informs the 2D/3D distinction information indicative of if the interrupted position of the content (namely, the position where the view/listen is restarted) it that of the 2D content or the 3D content, when interrupting the content to be viewed/listened, once, to the distribution system 60, which can distribute both contents the 2D/3D, to be held therein. With doing this, when restarting to view/listen the content, it is possible for the distribution 60 to determine if the content to be restarted is the 3D content or not, with using the 2D/3D distinction information held therein, when restarting the view/listen of the content, and thereby to produce the guidance screen necessary for the case of the 3D content, to be displayed on the receiver 50. Or, it is possible to obtain the 2D/3D distinction information held within the distribution system 60, for the receiver 50, when restarting the view/listen of the content, and thereby to display the guidance screen on itself.

Embodiment 5

In the embodiment 4 is shown the example, wherein the receiver 50 informs the 2D/3D distinction information indicative of if the view/listen restart position, as well as, the interrupted position of the content, to the distribution system 60, when the user interrupts the 3D content in the process of viewing/listening, once, on the receiver 50, while with using this information, the distribution system 60 produces/displays the guidance screen for prompting the user to make the preparation necessary for viewing/listening the 3D content, when restarting the distribution of content.

In the present embodiment, explanation will be given on an example where the 2D/3D distinction information is managed by the receiver 50 when the content is interrupted in the process of viewing/listening thereof. As the system configuration, which will be explained in the present embodiment, there is applies the same one shown in the embodiment 3 and 4.

<Procedure to Interrupt 3D Content View/Listen>

Figure 49:
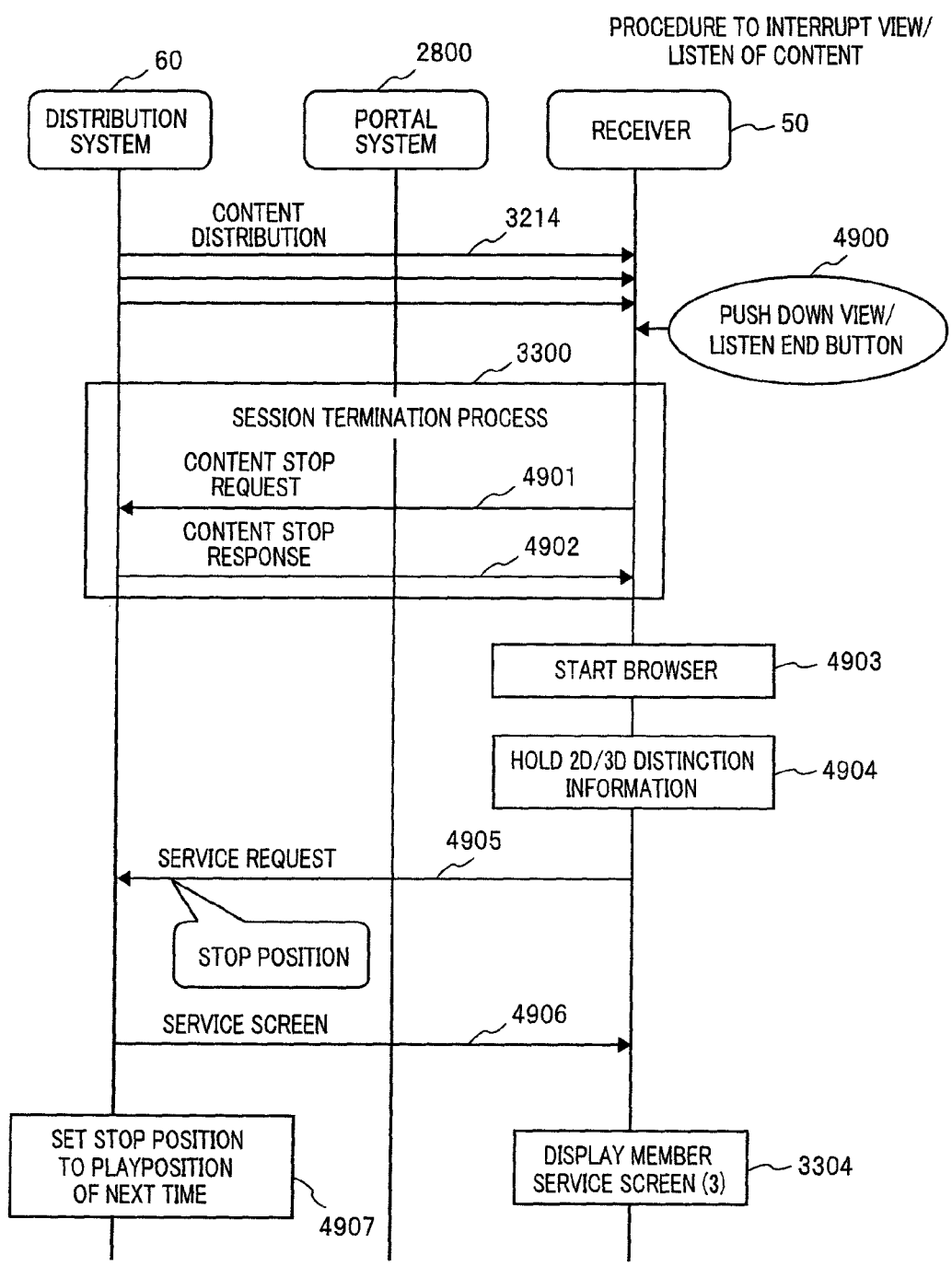
FIG. 49 shows an example of a flowchart for processing to interrupt the content in the process of viewing/listening thereof.

First of all, explanation will be given on the processes, in which the receiver 50 interrupts the 3D content in the process of viewing/listening on the way thereof, by referring to FIG. 49.

Under the condition where the content server 63 distributes the content, if the user instructs the "stop" button through the remote controller of the receiver 50, or instructs the "stop" button when it displays the sub-window including the operation buttons on the browser 51 (S4900), the AV player 53 of the receiver 50 issues the content stop request for stopping the transmission of content to the content server 63. In the content stop request may be included both or either one of the stop position (A) of the AV player 53 and/or an order for inquiring the stop position to the content server 63 (S4901).

Responding to this, the content server 63 stops the transmission of content and informs that fact. In that instance, there is included either one of the stop position (B) of the content, or the stop position (A), which the receiver 50 informs in S4401, or the position (C), turned back ahead by an arbitrary time/position from the stop position (A) (for example, the top of GOP, the head of the chapter including the interrupted position, etc.) (S4902).

The AV player 53 of the receiver 50 receiving the content stop response ends, after restarting the browser 51. In that instance, the AV player 53 informs the stop position information of either one of the stop position (A) of itself or the stop position, which is obtained from the content server 63 in S4402, and the 2D/3D distinction information for distinguishing if the stop position is of the 2D content or the 3D content, to the browser 51.

Herein, the AV player 53 distinguishes if being the 2D content or the 3D content, with using the method for extracting the 2D/3D distinction signal at the stop position included in the 3D content, which was described in the embodiment 3, the method for obtaining the 2D/3D distinction information included in ECG from the ECG processor unit 52, or the method for obtaining the 2D/3D distinction information included in the reproduction control metafile 200, which is obtained from the browser 51 when the view/listen is started, etc. (S4903).

The browser 61 restarting analyzes the substance obtained from the AV player 53 in S4703, and stores it, together with the information (for example, a content name, a content ID, a product ID, etc.) if the 2D/3D distinction information is included (S4904). In this instance, there may be stored the stop position information together with.

Thereafter, it accesses to the site of the Web server 61 of the distribution system 60, which is indicated by ReturnURL attaching the end condition and the stop position information of the AV player 53 (S4905).

Responding to this, the Web server 61 produces the screen to display (for example, the screen 3500), and returns it to the receiver 50 (S4906).

Thereafter, the Web server 61 sets up the stop position, as the PlayPosition when restarting the view/listen of the content next time (S4907).

The browser 51 of the receiver 50 receiving the screen produced displays the screen 3500 on the external or built-in monitor 2805 (S3303).

Herein, the receiver 50, after interrupting the view/listen of the 3D content, may display the guidance for indicating that the screen display will be retuned back to the display of 2D content (for example, "end view/listen of 3D content", etc.), depending on the necessity thereof.

<Procedure to Restart 3D Content View/Listen>

Figure 50:
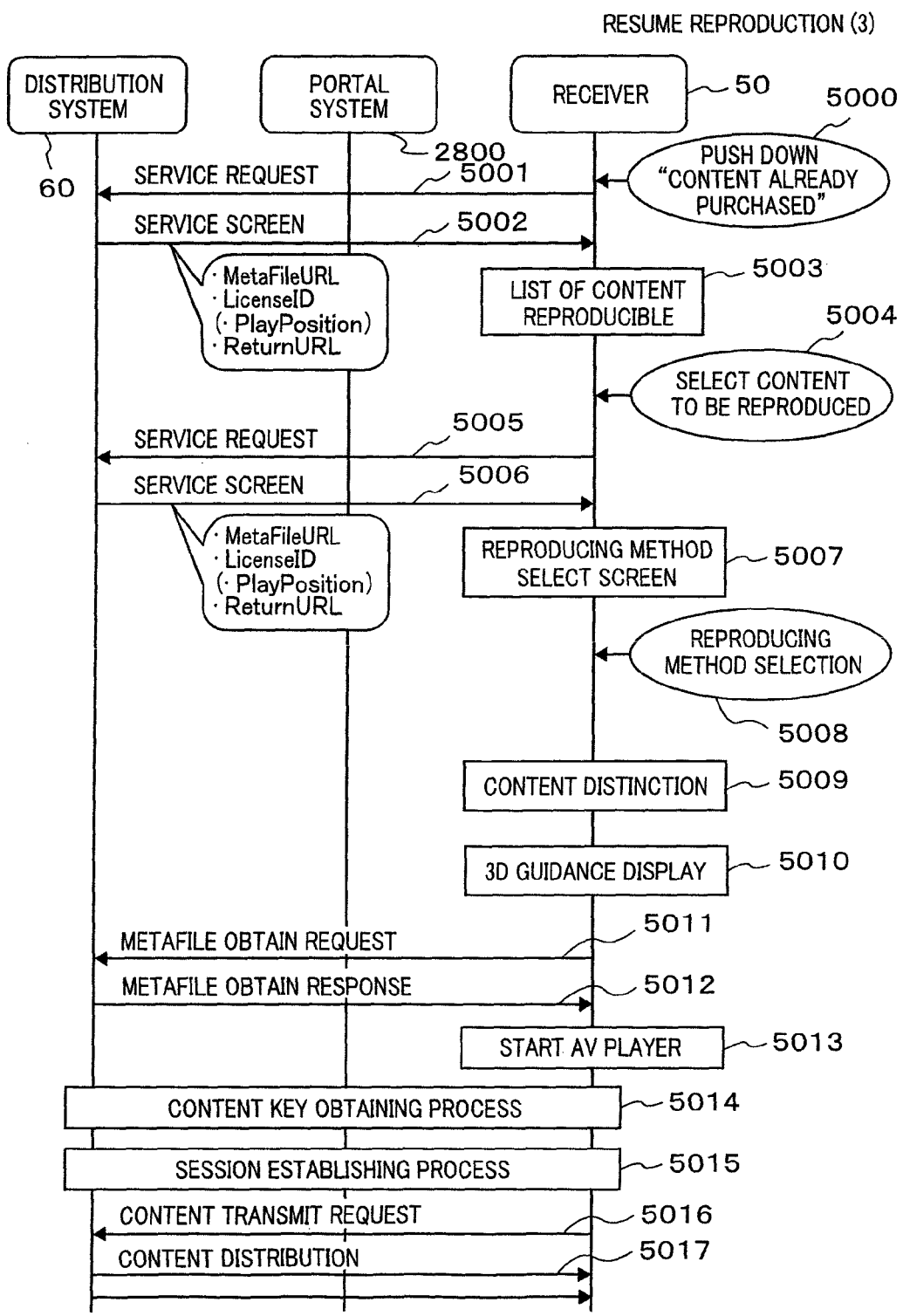
FIG. 50 shows an example of a flowchart for processing to view/listen the content already purchased.

FIG. 50 is a view for explaining the processes to restart the view/listen of the 3D content, which the receiver 50 interrupts on the way thereof.

Firstly, it is assumed that the browser 51 of the receiver 50 display the top screen of the distribution system 60 (e.g., the screen 3500) on the monitor 2805.

When the user selects the "content already purchased" 3502 on the screen 3500 (S5000), the browser 51 of the receiver 50 issues the request to obtain the service necessary for displaying the screen of the list of the content(s), which the receiver 50 has already purchased, to the Web server 61 of the distribution system 60 (S5001).

Responding to this, the Web server 61 of the distribution system 60 obtains the content(s), which the receiver 50 has already purchased and the information of the license(s) thereof, from the customer management server 65, upon basis of the member ID 2902 of the receiver 50. And, it produces a page of the list of the content(s) already purchased, and returns it back to the receiver 50. In addition to data for displaying the screen 4100 and the script for dealing with that data, the page of the list of the content(s) already purchased includes MetaFileURL, LicenseID, PlayPosition, ReturnURL, etc., for each content that is already purchased. However, the PlayPosition may be included only into the content, to which the user (or the receiver 50) has interrupted to view/listen, once, in the previous time (S5002).

The browser 51 of the receiver 50 receiving the page of the list of the content already purchased display the screen 4100 on the external or built-in monitor 2805 (S5003).

When the user selects the content 4101 to be restarted the view/listen thereof on the screen 4100 and pushes down the view/listen button 4103 (S5004), the browser 51 obtains the URL as the accessing address relating to the content selected, in accordance with the process of, such as, HTML or JavaScript, etc., which is describe on the page of the list of the content already purchased, and issues the service obtaining request to the accessing address of the Web server 61, which is indicated by that URL (S5005).

The Web server 61, receiving the service obtaining request, produces the page for selecting the method for viewing/listening, and issues the service (e.g., "view/listen from the beginning" or "view/listen continuation following from last time"), and transmits it to the receiver 50. On that page are included data for displaying the screen 3800 and the script for dealing with that data. In that script, there is described the URL for obtaining the selection content and an order to shift into S5011. In addition thereto, on that page are included the MetaFileURL, the LicenseID, the PlayPosition, the ReturnURL, etc., which are described in S5002, depending on the necessity thereof (S5006).

Herein, in S4805, although the service obtaining request is issued to the Web server 61, even if it is determined that the content is not viewed/listened yet, or that all thereof is already viewed/listened; however, there may be included the script for shifting into S5011 when the PlayPosition indicates the head position of the content on the page of the list of the content already purchased, which is obtained in S5002. The browser 51 receiving that page displays the screen 3800 on the monitor (S5007).

When the user selects the "view/listen from the beginning" 3802 on the screen 3800 and instructs the start button 3803, it shifts into S5011 in accordance with the script included on the selection page of S5006.

When the user selects the "view/listen continuation following from last time" 3801 on the screen 3800 and instructs the start button 3803 (S5008), the browser 51 of the receiver 50 determines if it holds the 2D/3D distinction information relating to the content selected (i.e., the information held in S4904 mentioned above) or not, and if determining to hold that, it reads out the substance thereof.

And, from those information, determination is made on if the content selected is the 2D content or the 3D content (S5009). In more details, if there is no 2D/3D distinction information or the substance of the 2D/3D distinction information read out indicates the 2D content, the process is shifted into S5011 in accordance with the script included in the selection page of S5006.

On the other hand, if the substance of the 2D/3D distinction information read out indicates the 3D content, the browser 51 produces the guidance screen for prompting the user to make preparation (e.g., wearing the 3D glasses, etc.) necessary for viewing/listening the 3D content, so as to display it on the monitor (S5010).

When the user selects the "OK" button on the screen 4300, the browser 51 records MetaFileURL, LicenseID, PlayPosition, ReturnURL relating to the content selected, temporally. And, it transmits for obtaining the reproduction control metafile to the metadata server 62 of the distribution system 60 to be the MetaFileURL (S5011).

The metadata server 62 of the distribution system 60 receiving the reproduction control metafile obtaining request returns such predetermined reproduction control metafile 200, as shown in FIG. 10, back to the receiver 50 (S5012).

The browser 51 of the receiver 50 receiving the reproduction control metafile 200 records the substance of the reproduction control metafile 200, together with the MetaFileURL, the LicenseID, the PlayPosition, the ReturnURL and the 2D/3D distinction information relating to each content, temporally, and starts the AV player 53, so as to inform the substance of all or part(s) of the reproduction control metafile 200 obtained, as well as, the LicenseID, the PlayPosition and/or the 2D/3D distinction information (S5013). Herein, after starting the AV player 53, the browser 51 comes into the condition of being ended or residing as it is.

The AV player 53 determines if the content to be viewed/listened is the 3D or not, with using the 2D/3D distinction information obtained from the browser 51, and executes a preparation necessary for the receiver 50 when it is the 3D content (e.g., setup of the decoders 522 and 524 for viewing/listening the 3D content, etc.). And, it transmits a key request (including the licenseID 224 and/or the DRM_ID 2904) to the DRM server 64 of the distribution system 60, in accordance with the license obtaining information (LLI) 220 of the reproduction control metafile 200.

The DRM server 64 receiving the key request confirms if the receiver 50 is able to view/listen the content, between the customer management server 65, with using the licenseID 224 and/or the DRM_ID 2904. As a result thereof, only when determining to be viewable/listenable, the DRM server 64 transmits the content key necessary for viewing/listening the content to the receiver 50 (S5014).

The receiver 50 receiving the content key executes (for the purpose of content distribution) the session establishing between the content server 63, in accordance with the content characteristic property information (ERI) 210 of the reproduction control metafile 200 (S5015). Herein, the session means a logical connection necessary for executing HTTP/TCP or RTP/UD streaming.

When succeeding the session establishing, the AV player 53 of the receiver 50 transmits a request for restarting view/listen from the interrupted position of the content on the session, with using the URL of the address for obtaining the content, which is included in the content title/reference address/file name 211 of the reproduction control metafile 200 (S5016).

The content server 63 receiving the view/listen restart request from the interrupted position of the content transmits the content from the interrupted position of the content while encrypting the content, with using the content key, to the receiver 50. The receiver 50 receiving the encrypted content decrypts that content, with using the content key, within the decryptor 514, and also displays it on the external or built-in monitor 2801 through the video/audio output I/F 531 (S5017).

Herein, in this FIG. 50, although the receiver 50 produces the screen 4300 for prompting the preparation necessary for viewing/listening the 3D content (e.g., wearing the 3D glasses) to the user, and display it; however, such information being the 3D content, as is described in the embodiment 4, is included in the service obtaining request to be transmitted to the Web server 61 in S4809, in the place of executing S5010, only when the result of execution of S5009 is the 3D content. And, the Web server 61 may produces the screen 4300 and display it on the receiver 50, by referring to that information, similar to that in S4810.

With such processes as mentioned above, the receiver 50 enabling to deal with the 3D content holds the 2D/3D distinction information indicating if the interrupted position of the content (thus, the view/listen restarting position) is that of the 2D content or the 3D content, when interrupting the view/listen of the content, once. With doing this, it is possible to determine if the content to be restarted is the 3D content or not, when restarting the view/listen of the content, with using the 2D/3D distinction information held therein and also to produce the guidance screen necessary only when dealing with the 3D content to be displayed. Also, within the distribution system 60, there is no necessity of holding/determining if the content to be restarted is the 2D or the 3D, nor producing the screen for prompting the preparation to the user.

However, the present invention should not be limited to the embodiments mentioned above, but may includes various variations thereof. For example, the embodiments mentioned above are explained in details thereof, for easily explaining the present invention; therefore, the present invention should not be limited to comprise all constituent elements therein, necessarily. Also, a part of the constituent elements of a certain embodiment may be replaced with the constituent element of other embodiment, or to the constituent elements of a certain embodiment may be added the constituent element(s) of the other embodiment. Also, in a part of the constituent elements of each embodiment, it is possible to make addition/deletion/replacement of other constituent element(s).

Also, with each constituent element, function, processing unit, processing means, etc., mentioned above, a part or all thereof may be achieved with hardware, such as, by designing it with an integrated circuit, etc. Also, each constituent element or function, etc., mentioned above may be achieved in the form of software, wherein a processor interprets programs for achieving the respective functions and executes them. The information of the programs, tables or files, etc., for achieving each function may be located in a recording device, such as, a memory, a hard disc, a SSD (Solid State Drive), etc., or a recoding medium, such as, an IC card, a SD card, a DVD, etc.

Also, control lines and/or information lines are shown, which can be considered to be necessary for the explanation, but all of the control lines and the information lines, which are necessary for a product, are not shown, necessarily. Actually, it can be considered that almost of all constituent elements are connected, mutually, with each other.

What is claimed is:

1. A receiver, enabling to receive 2D content and 3D content from a content provider via a network, comprising:
   a content list obtaining unit, which is configured to obtain a list screen of content receivable by said receiver from said content provider;
   a content obtaining unit, which is configured to obtain said 2D content or said 3D content from said content provider;
   a display unit, which is configured to display said list screen of the content and a reproduced screen of the content on an external or built-in monitor; and
   a function determining unit, which is configured to determine a function for viewing/listening the 3D content and the 2D content, equipped in said receiver, wherein
   said content list obtaining unit determines if the 3D content is visible/listenable or not, on said receiver itself, and obtains a content list of only the 2D content or both the 2D content and the 3D content, in accordance with a result of determination, from said content provider, and
   said display unit display the content list, which is obtained through said content list obtaining unit, on said monitor.

2. The receiver, as described in the claim 1, wherein
   said content list obtaining unit
   obtains information including a first process, to be executed when said receiver is enabled to view/listen the 3D content, and a second process to be executed when said receiver is not enabled to view/listen the 3D content, from said content provider,
   determines if the 3D content can be viewed/listened on the receiver itself with using said function determining unit, and
   selects said first process or said second process in accordance with a result of said determination, and thereby executes it.

3. The receiver, as described in the claim 1, wherein
   when receiving a reproduction start instruction of the 3D content on the list screen of the content displayed by said display unit,
   said content obtaining unit
   obtains the content, including a guidance screen to prompt preparation necessary for viewing/listening said 3D content at a top thereof, from said content provider, and display a reproduction screen of said content on said display unit.

4. The receiver, as described in the claim 3, wherein
   when interrupting to view/listen the 3D content, being received from said content provided by said content obtaining unit, said content obtaining unit informs an interrupted position or a first restarting position for restarting to view/listen of said content to said content distributor, and when restarting to view/listen said content, said content obtaining unit obtains the content inserting the guidance screen to prompt preparation necessary for viewing/listening said 3D content at the top of content starting from a second restarting position, which is determined by said content distributor, by referring to said interrupted position, or said first restarting position, or said interrupted position or said first restarting position, from said content distributor, and displays the reproduced screen of said content on said display unit.

5. The receiver, as described in the claim 3, wherein when interrupting to view/listen the 3D content, being received from said content provided by said content obtaining unit, said content obtaining unit informs an interrupted position or a first restarting position for restarting to view/listen of said content and information indicating if the content, being viewed/listened presently, is the 3D content or not, to said content distributor, and when restarting to view/listen said content, said content obtaining unit obtains the content inserting the guidance screen to prompt preparation necessary for viewing/listening said 3D content at the top of content starting from a second restarting position, which is determined by said content distributor, by referring to said interrupted position, or said first restarting position, or said interrupted position or said first restarting position, from said content distributor, and displays the reproduced screen of said content on said display unit.

6. The receiver, as described in the claim 3, wherein when interrupting to view/listen the 3D content, being received from said content provided by said content obtaining unit, said content obtaining unit informs an interrupted position or a first restarting position for restarting to view/listen of said content and information indicating if the content, being viewed/listened presently, is the 3D content or not, to said content distributor, and when restarting to view/listen said content, said content obtaining unit obtains the information indicating if said content is the 3D content or not from said content distributor, and produces the guidance screen to prompt preparation necessary for viewing/listening said 3D content only when said content is the 3D content, thereby displaying said guidance screen with using said displaying unit, and thereafter, obtains the content starting from a second restarting position, which is determined by said content distributor, by referring to said interrupted position, or said first restarting position, or said interrupted position or said first restarting position, from said content distributor.

7. The receiver, as described in the claim 1, wherein said content obtaining unit obtains information including a first URL for accessing to a predetermined content distributor when said receiver is enabled to view/listen the 3D content and a second URL for accessing to a predetermined content distributor when said receiver is not enabled to view/listen the 3D content, from said content distributor, determines if the 3D content can be viewed/listened on the receiver itself with using said function determining unit, and accesses to said predetermined content distributor by selecting said first process or said second process in accordance with a result of said determination.

8. The receiver, as described in the claim 1, wherein when receiving a reproduction start instruction of the 3D content on the list screen of the content displayed by said display unit, said content obtaining unit obtains a guidance screen to prompt preparation necessary for viewing/listening said 3D content from said content distributor before reproducing said content, thereby displaying said guidance screen with using said displaying unit, and thereafter obtains said content from said content distributor.

9. The receiver, as described in the claim 1, further comprising a guidance producing unit, which is configured to produce a guidance screen to prompt preparation necessary for viewing/listening said 3D content, wherein when receiving a reproduction start instruction of the 3D content on the list screen of the content displayed by said display unit, said content obtaining unit produces the guidance screen to prompt preparation necessary for viewing/listening said 3D content before issuing a content distributing request to said content distributor, and displays said guidance screen by said display unit.

10. The receiver, as described in the claim 9, wherein when interrupting to view/listen the 3D content, being received from said content provided by said content obtaining unit, said content obtaining unit informs an interrupted position or a first restarting position for restarting to view/listen of said content, and to said content distributor, and information indicating if the content, being viewed/listened presently, is the 3D content or not, to said content distributor, and when restarting to view/listen said content, said content obtaining unit obtains the information indicating if said content is the 3D content or not from said content distributor, and produces the guidance screen to prompt preparation necessary for viewing/listening said 3D content only when said content is the 3D content, thereby displaying said guidance screen with using said displaying unit, and thereafter, obtains the content starting from a second restarting position, which is determined by said content distributor, by referring to said interrupted position, or said first restarting position, or said interrupted position or said first restarting position, from said content distributor.

11. The receiver, as described in the claim 9, wherein when interrupting to view/listen the 3D content, being received from said content provided by said content obtaining unit, said content obtaining unit holds the interrupted position of said content and information indicating if the content, being viewed/listened presently, is the 3D content or not, and informs said interrupted position or a first reproducing position for restarting to view/listen, to said content distributor, and when restarting to view/listen said content, said content obtaining unit determines if said content is the 3D content or not from said information held therein, and produces said guidance screen only when said content is the 3D content, thereby displaying said guidance screen with using said display unit, and thereafter, obtains the content starting from a second restarting position, which is determined by said content distributor, by referring to said interrupted position, or said first restarting position, or said interrupted position or said first restarting position, from said content distributor.

* * * * *